(12) United States Patent
Su et al.

(10) Patent No.: US 11,963,192 B2
(45) Date of Patent: *Apr. 16, 2024

(54) METHOD, EQUIPMENT FOR RECEIVING SCHEDULING INFORMATION, TERMINAL, BASE STATION AND METHOD FOR TRANSMITTING INFORMATION

(71) Applicant: SAMSUNG ELECTRONICS CO., LTD., Suwon-si (KR)

(72) Inventors: Di Su, Beijing (CN); Miao Zhou, Beijing (CN); Feifei Sun, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,367

(22) Filed: Apr. 22, 2022

(65) Prior Publication Data

US 2022/0248449 A1 Aug. 4, 2022

Related U.S. Application Data

(63) Continuation of application No. 16/635,983, filed as application No. PCT/KR2018/008766 on Aug. 1, 2018, now Pat. No. 11,317,431.

(30) Foreign Application Priority Data

Aug. 2, 2017 (CN) .......................... 201710653505.1
Sep. 26, 2017 (CN) .......................... 201710882265.2

(Continued)

(51) Int. Cl.
*H04W 72/23* (2023.01)
*H04L 1/1829* (2023.01)

(52) U.S. Cl.
CPC .......... *H04W 72/23* (2023.01); *H04L 1/1854* (2013.01)

(58) Field of Classification Search
CPC ............................ H04L 1/1854; H04W 72/23
(Continued)

(56) References Cited

U.S. PATENT DOCUMENTS 11,317,431 B2 * 4/2022 Su .................... H04L 1/1822
2014/0092789 A1 4/2014 Lei et al.
(Continued)

FOREIGN PATENT DOCUMENTS

CN 103107872 A 5/2013
CN 103178942 A 6/2013
(Continued)

OTHER PUBLICATIONS

China National Intellectual Property Administration, "The First Office Action," dated Mar. 26, 2023, in connection with Chinese Patent Application No. 201810142603.3, 15 pages.

(Continued)

*Primary Examiner* — Peter G Solinsky

(57) ABSTRACT

The present invention discloses a method for receiving scheduling information, comprising steps of: receiving Downlink Control Information (DCI); and determining, according to a mapping relationship between configured transmission resources used for a Physical Uplink Shared Channel (PUSCH) and scheduling information in the DCI, scheduling information corresponding to the PUSCH in the DCI. Compared with the prior art, in the present invention, the scheduling information in the DCI is determined by the mapping relationship between the configured transmission resources used for transmitting the PUSCH by a UE and the scheduling information in the DCI, so that a base station can schedule all UEs for which there is a mapping relationship (Continued)

between PUSCH configured transmission resources and the scheduling information in DCI by sending only one piece of DCI. The scheduling overhead is reduced, the resource waste is reduced, and the efficiency of scheduling terminals by a communication system is significantly improved.

11 Claims, 27 Drawing Sheets

(30) Foreign Application Priority Data

| Nov. 16, 2017 | (CN) | ......................... | 201711140615.4 |
| Nov. 27, 2017 | (CN) | ......................... | 201711208124.9 |
| Jan. 16, 2018 | (CN) | ......................... | 201810040728.5 |
| Feb. 11, 2018 | (CN) | ......................... | 201810142603.3 |

(58) Field of Classification Search
USPC ........................................................ 370/330
See application file for complete search history.

(56) References Cited

U.S. PATENT DOCUMENTS

| 2014/0254542 | A1 | 9/2014 | Liu et al. |
| 2016/0323852 | A1 | 11/2016 | Golitschek Edler Von Elbwart et al. |
| 2016/0337089 | A1 | 11/2016 | Chen et al. |
| 2016/0338110 | A1 | 11/2016 | Wang et al. |
| 2017/0099664 | A1 | 4/2017 | Lunttila et al. |
| 2017/0105197 | A1 | 4/2017 | Olsson et al. |
| 2017/0118747 | A1 | 4/2017 | Rico Alvarino et al. |
| 2017/0303248 | A1 | 10/2017 | Chatterjee et al. |
| 2018/0069593 | A1 | 3/2018 | Yi |
| 2018/0220373 | A1 | 8/2018 | Arzelier et al. |
| 2018/0279299 | A1 | 9/2018 | Park et al. |
| 2018/0332566 | A1 | 11/2018 | You et al. |
| 2019/0230707 | A1 | 7/2019 | Bergljung et al. |
| 2019/0372719 | A1 | 12/2019 | Talarico et al. |
| 2020/0014498 | A1 | 1/2020 | Bergman et al. |
| 2020/0068608 | A1 | 2/2020 | Ye et al. |
| 2020/0092858 | A1 | 3/2020 | Ye et al. |
| 2020/0100316 | A1 | 3/2020 | Liu et al. |
| 2020/0128579 | A1 | 4/2020 | Talarico et al. |
| 2020/0196281 | A1 | 6/2020 | Bergman et al. |
| 2020/0383113 | A1 | 12/2020 | Yang et al. |
| 2021/0274556 | A1 | 9/2021 | Park et al. |

FOREIGN PATENT DOCUMENTS

| CN | 104054364 A | 9/2014 |
| CN | 104767595 A | 7/2015 |
| CN | 104780549 A | 7/2015 |
| EP | 3606218 A1 | 2/2020 |
| WO | 2014082195 A1 | 6/2014 |
| WO | 2017045499 A1 | 3/2017 |
| WO | 2017157270 A1 | 9/2017 |

OTHER PUBLICATIONS

China National Intellectual Property Administration, "The First Office Action," dated Apr. 28, 2023, in connection with Chinese Patent Application No. 201810040728.5, 23 pages.
Intel Corporation, "PUSCH spectral efficiency increase for efeMTC", R1-1704697, 3GPP TSG RAN WG1 Meeting #88bis, Spokane, USA, Apr. 3-7, 2017, 4 pages.
Qualcomm Inc. et al., "Clarification on ambiguous DCI information between UE-specific search space and common search space for DCI formats 0 and 1A", R1-112845, 3GPP TSG-RAN1 Meeting #66, Athens, Greece, Aug. 22-26, 2011, 4 pages.
European Patent Office, "Communication pursuant to Article 94(3) EPC," dated Sep. 28, 2022, in connection with European Patent Application No. 18841342.1, 9 pages.
International Search Report dated Dec. 13, 2018 in connection with International Patent Application No. PCT/KR2018/008766, 4 pages.
Written Opinion of the International Searching Authority dated Dec. 13, 2018 in connection with International Patent Application No. PCT/KR2018/008766, 6 pages.
Samsung, "DL/UL Time Resource Allocation", 3GPP TSG RAN WG1 NR Ad-Hoc#2, Jun. 27-30, 2017, R1-1710719, 4 pages.
Supplementary European Search Report in connection with European Application No. 18841342.1 dated Jan. 14, 2021, 13 pages.
Intel Corporation, "PUSCH spectral efficiency increase for efeMTC," R1-1707318, 3GPP TSG RAN WG1 Meeting #89, Hangzhou, P.R. China, May 15-19, 2017, 13 pages.
Intellectual Property India, "Examination report under sections 12 & 13 of the Patents Act" dated Mar. 4, 2022, in connection with Indian Patent Application No. 202027004619, 6 pages.
Office Action dated Dec. 9, 2023, in connection with Chinese Patent Application No. 201810142603.3, 15 pages.
Office Action dated Jan. 5, 2024, in connection with Chinese Patent Application No. 201810040728.5, 19 pages.
ZTE, "Discussion on increased PUSCH spectral efficiency for MTC", 3GPP TSG RAN WG1 Meeting #89, R1-1707093, Hangzhou, China, May 15-19, 2017, 5 pages.

\* cited by examiner

FIG. 5

| #00 | #01 | #02 | #03 |
|-----|-----|-----|-----|
| #10 | #11 | #12 | #13 |
| #20 | #21 | #22 | #23 |
| #30 | #31 | #32 | #33 |

METHOD, EQUIPMENT FOR RECEIVING SCHEDULING INFORMATION, TERMINAL, BASE STATION AND METHOD FOR TRANSMITTING INFORMATION

CROSS-REFERENCE TO RELATED APPLICATIONS

This application is a continuation of application Ser. No. 16/635,983, now U.S. Pat. No. 11,317,431 issued Apr. 26, 2022, which is a 371 of International Application No. PCT/KR2018/008766, filed Aug. 1, 2018, which claims priority to Chinese Patent Application No. 201710653505.1, filed Aug. 2, 2017, Chinese Patent Application No. 201710882265.2, filed Sep. 26, 2017, Chinese Patent Application No. 201711140615.4, filed Nov. 16, 2017, Chinese Patent Application No. 201711208124.9, filed Nov. 27, 2017, Chinese Patent Application No. 201810040728.5, filed Jan. 16, 2018, and Chinese Patent Application No. 201810142603.3, filed Feb. 11, 2018, the disclosures of which are herein incorporated by reference in their entireties.

1. FIELD

The present invention relates to the technical field of wireless communication, and in particular to a method and equipment for receiving scheduling information, and a terminal, a base station, and a method for transmitting information.

2. DESCRIPTION OF RELATED ART

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In current Machine Type Communication (MTC) technologies, a system supports scheduling of Early Termination Signals (ETSs) for a User Equipment (UE) by Downlink Control Information (DCI), that is, a base station transmits ETSs to the User Equipment (UE) by the DCI on a Physical Downlink Control Channel (PDCCH) to schedule time-frequency resources for the Physical Uplink Shared Channel (PUSCH) used by the UE. If the ETSs are transmitted by uplink Hybrid Automatic Retransmission Request Acknowledgement (HARQ-ACK) feedback, one piece of DCI can indicate ACK information of only one UE/HARQ process, that is, the MTC technologies only support scheduling of ETSs for one UE in one piece of DCI. The length of a scheduling signaling is the same as that in the DCI format 6-0A/B. In this way, the extra information overhead is too large, and great resource waste will be caused when there are multiple UEs to be fed back.

The Long Term Evolution (LTE) technology supports transmit power control and scheduling for multiple UEs in one piece of DCI by DCI transmission scheduling information in the DCI format 3/3A. However, in the legacy DCI in the DCI format 3/3A, a mapping relationship between the UE and a Transmit Power Control (TPC) command field is configured by a higher-layer signaling, it is less flexible and it is not applicable to an application scenario where the UE is required to flexibly perform Acknowledgement (ACK) feedback for each uplink transmission or downlink control channel monitoring. Therefore, this cannot be utilized in the MTC system.

In view of this, it is necessary to provide a method and equipment for receiving scheduling information, which can solve the technical problems described above.

In addition, enhanced Machine Type Communication (eMTC), a technology type for the Internet of Things (IoT) applications, was first released in Release 13 of 3GPP protocol and mainly applied to IoT applications deployed in LTE systems.

Compared with the business of traditional radio communication, the IoT applications for eMTC technology are characterized by less data volume, infrequent service requests, lower delay sensitivity and deeper coverage. For example, intelligent meter reading, automatic alarm, Monitoring and logistics tracking and other types of applications.

Compared with LTE terminals, eMTC terminals are more likely to be in deep coverage scenarios, such as basements or underground tube wells, and eMTC has introduced several mechanisms and techniques to enhance coverage. One of the most fundamental coverage enhancement techniques is to reduce the transmission bandwidth to enhance the power spectral density, as well as the introduction of repeat transmitting mechanism.

In terms of improving the power spectral density, eMTC reduces the transmission bandwidth to 1080 kHz only, and an eMTC narrowband consists of 6 contiguous Physical Resource Blocks (PRBs) in the LTE system. The entire physical channel scheduling of eMTCs takes the eMTC narrowband as a unit. The number of the narrowband and the positions of the eMTCs deployed in-band both can be different, for example, when the LTE system bandwidth is 3 MHz, the number of eMTC narrowband in-band is 2; when the LTE system bandwidth is 20 MHz, the number of eMTC narrowband in-band is 16.

In coverage enhancement, in the eMTC technology, the terminal selects the coverage enhancement mode (CE Mode) of the random access channel according to the DL measurement. The base station acquires the coverage enhancement mode (CE mode) of the terminal based on the coverage enhancement level (CE level) of the random access channel selected by the terminal, and performs the transmission of the uplink (UL) and downlink (DL) traffic channels according to the CE mode of the terminal. The CE mode of the terminal is classified into mode A (CE Mode A) and mode B (CE Mode B). Wherein, the CE mode A is used for supporting a normal coverage scenario, that is, only the no-repetition transmission or transmission of a small repetition number supporting the UL and DL control channel and the service channel; the CE mode B is used for supporting the deep coverage scenario, that is, supporting the UL and DL control channel to transmit with a great repetition number.

In different CE modes, the format of UL and DL scheduling grant information read by the terminal is slightly different. In Release 14, the UL scheduling grant information of the CE mode B is DCI format 6-0B, and the content contained is as shown in Table 1:

TABLE 1

| Content | Bit number |
| --- | --- |
| DCI format 6-0B or format 6-1B indication identifier | 1 |
| Resource block assignment-narrowband index indication | 1 (LTE bandwidth 3 MHz) 2 (LTE bandwidth 5 MHz) 3 (LTE bandwidth 10 MHz) 4 (LTE bandwidth 15 MHz) 4 (LTE bandwidth 20 MHz) |
| Resource block assignment-PRB index indication | 3 |
| Modulation and coding scheme (MCS) | 4 |
| Repetition number | 3 |
| Number of HARQ process number | 1 |
| Indication of newly transmitted data | 1 |
| Repetition number of DCI subframe | 2 |

Wherein, the DCI format 6-0B indicates a narrowband index used for Physical Uplink Share Channel (PUSCH) transmission and a PRB index in a narrowband in a resource block assignment message. For the user equipment in the CE mode B, the base station schedules the UL shared channel to use a single PRB or 2 PRBs transmission in the narrowband to reduce the UL power spectral density and improve the coverage capability.

The next generation of machine communication system provides higher requirements on the coverage enhancement. A new CE mode emerges as the times require, but how the terminal and base station transmit data in the new CE mode becomes a key issue.

The next generation of machine communication system provides higher requirements on the coverage enhancement. A new CE mode emerges as the times require, but how the terminal and the base station transmit data in the new CE mode becomes a key issue.

SUMMARY

The objective of the present invention is to provide a method and equipment for receiving scheduling information, by which multiple UEs can be scheduled by one piece of DCI, to overcome the deficiencies of the prior art.

The embodiment of the present invention provides a base station. Compared with the prior art, in the embodiment of the present invention, the terminal determines whether the base station supports the first scheduling mode according to the configuration information of the first scheduling mode transmitted by the base station, and if the base station supports the first scheduling mode, the terminal transmits a request message and/or capability message to the base station to request the base station to configure a first scheduling mode for the terminal or to report a scheduling mode supported by the terminal. When the base station receives the request message and/or capability message transmitted by the terminal and determines that the terminal scheduling mode is the first scheduling mode, the base station transmits the scheduling information under the first scheduling mode to the terminal, and the terminal transmits or receives data according to the scheduling information under the first scheduling mode. That is, in the embodiments of the present invention, a new scheduling mode, that is, a first scheduling mode, appears in the embodiments of the present invention. When both the terminal and the base station support the first scheduling mode, the base station can transmit the scheduling information under the first scheduling mode to the terminal so that the terminal and the base station can transmit or receive data in the new scheduling mode.

The terminal and the base station provided in the embodiments of the present invention can implement the above method embodiments. For a specific function implementation, please refer to the explanation in the method embodiments, and details are not described herein again.

BRIEF DESCRIPTION OF THE DRAWINGS

To describe the technical solutions in the embodiments of the present invention more clearly, the accompanying drawings to be used in the description of the embodiments will be briefly described below. Apparently, the accompanying drawings described hereinafter are some of the embodiments of the present invention, and those skilled in the art can obtain other drawings according to these drawings without paying any creative effort.

FIG. 5 is a schematic view of a first correspondence between the minimum scheduling units in a time-frequency resource region and UE/HARQ processes according to Embodiment 5 of the present invention;

DETAILED DESCRIPTION

Figure 1:
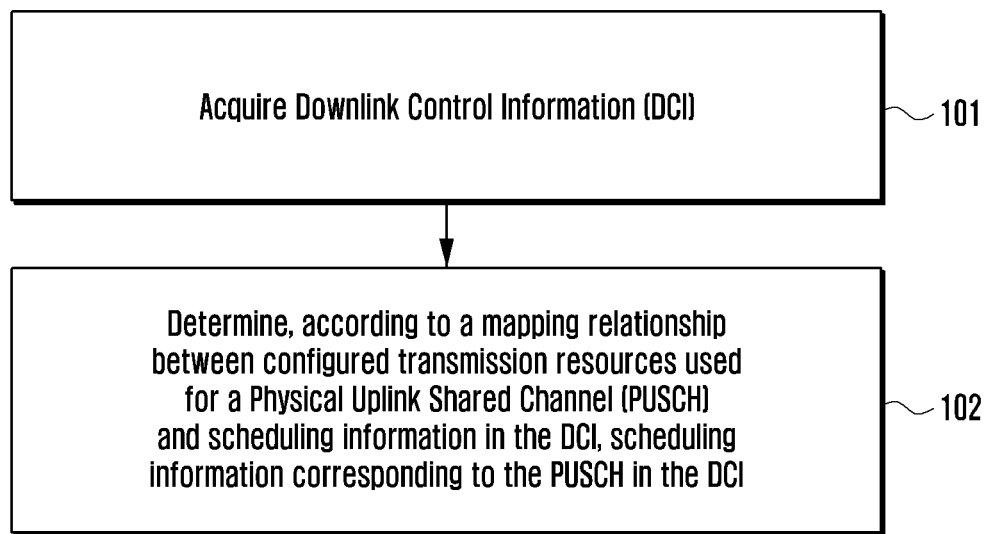
FIG. 1 is a flowchart of a method for receiving scheduling information according to the present invention.

The objective of the present invention is to provide a method and equipment for receiving scheduling information, by which multiple UEs can be scheduled by one piece of DCI, to overcome the deficiencies of the prior art.

For this purpose, the present invention provides a method for receiving scheduling information, comprising the following steps of:

receiving Downlink Control Information (DCI); and determining, according to a mapping relationship between configured transmission resources used for a Physical Uplink Shared Channel (PUSCH) and scheduling information in the DCI, scheduling information corresponding to the PUSCH in the DCI.

Preferably, the step of receiving DCI comprises: receiving the DCI containing scheduling information for one or multiple UEs.

Preferably, the step of receiving DCI comprises: receiving the DCI by a Radio Network Temporary Identifier (RNTI) allocated by a base station.

Preferably, the step of receiving DCI comprises: performing Cyclic Redundancy Check (CRC) descrambling on a Physical Downlink Control Channel (PDCCH) candidate by the Radio Network Temporary Identifier (RNTI) allocated by the base station, and decoding the PDCCH successfully to acquire the DCI.

Preferably, the step of receiving DCI comprises: receiving DCI with a high priority in a priority order. The priority order is used for determining priority of two types of DCI, and the two types of DCI comprise DCI for which one DCI message carries scheduling information for one UE and DCI for which one DCI message carries scheduling information for multiple UEs.

Preferably, the configured transmission resources comprise at least one of time-frequency resources, codewords and Demodulation Reference Signals (DMRSs).

Preferably, the step of determining, according to a mapping relationship between configured transmission resources used for a Physical Uplink Shared Channel (PUSCH) and scheduling information in the DCI, scheduling information corresponding to the PUSCH in the DCI comprises:

determining, according to a relative position of a time-frequency resource position used for the PUSCH in a first time-frequency resource region, scheduling information corresponding to the PUSCH in the DCI.

Preferably, the first time-frequency resource region is determined by the time-frequency resource position for the received DCI, or content of the received DCI, or configuration of the base station and/or agreed in specification.

Preferably, the step of determining, according to a relative position of a time-frequency resource position used for the PUSCH in a first time-frequency resource region, scheduling information corresponding to the PUSCH in the DCI comprises:

dividing the time-frequency resource region into several minimum scheduling units;

determining a mapping relationship between a minimum scheduling unit corresponding to the time-frequency resource position used for transmitting the PUSCH and scheduling information in the DCI; and determining, according to the mapping relationship, scheduling information corresponding to the PUSCH in the DCI.

Preferably, the step of determining a mapping relationship between a minimum scheduling unit corresponding to the time-frequency resource position used for transmitting the PUSCH and scheduling information in the DCI comprises: numbering the minimum scheduling units in order, and determining a mapping relationship between the number of the minimum scheduling unit corresponding to the time-frequency resource position used for transmitting the PUSCH and scheduling information in the DCI.

Preferably, the step of determining, according to the mapping relationship, scheduling information corresponding to the PUSCH in the DCI comprises: determining a scheduling field in the DCI according to the mapping relationship and acquiring scheduling information within the scheduling field.

Preferably, the scheduling information comprises at least one of the following information: Acknowledgement (ACK) information indicating the decoded state of the PUSCH, NACK information indicating the decoded state of the PDSCH and indication information indicative of terminating monitoring of the Physical Downlink Control Channel (PDCCH).

Preferably, after the step of determining, according to a mapping relationship between configured transmission resources used for a Physical Uplink Shared Channel (PUSCH) and scheduling information in the DCI, scheduling information corresponding to the PUSCH in the DCI, the method further comprises: executing, if the determined scheduling information is Acknowledgement (ACK), at least one of the following operations:

terminating an on-going PUSCH transmission corresponding to the Acknowledgement (ACK) information;
clearing UL grants corresponding to the PUSCH;
releasing the remaining part of transmission resources for the PUSCH;
clearing buffer of Hybrid Automatic Retransmission Request (HARQ) processes corresponding to the PUSCH; and
terminating monitoring of the Physical Downlink Control Channel (PDCCH).

Preferably, after the step of determining, according to a mapping relationship between configured transmission resources used for a Physical Uplink Shared Channel (PUSCH) and scheduling information in the DCI, scheduling information corresponding to the PUSCH in the DCI, the method further comprises: executing, if the determined scheduling information is Acknowledgement (ACK), at least one of the following operations within a predefined time window or at a predefined time point:

terminating the on-going PUSCH transmission corresponding to the Acknowledgement (ACK) information;
clearing the UL grants corresponding to the PUSCH;
releasing the remaining part of the transmission resources for the PUSCH;
clearing the buffer of the Hybrid Automatic Retransmission Request (HARQ) processes corresponding to the PUSCH; and
terminating monitoring of the Physical Downlink Control Channel (PDCCH).

For this purpose, the present invention further provides a user equipment, comprising:
a downlink control information acquisition module configured to acquire Downlink Control Information (DCI); and
a scheduling information determination module configured to determine, according to a mapping relationship between configured transmission resources used for a Physical Uplink Shared Channel (PUSCH) and scheduling information in the DCI, scheduling information corresponding to the PUSCH in the DCI.

For this purpose, the present invention further provides a method for sending scheduling information, comprising the following steps of:
receiving and trying to decode Physical Uplink Shared Channels (PUSCHs) of several UEs in a first uplink time-frequency resource region;
generating, according to the decoded state of the PUSCHs of the several UEs, scheduling information corresponding to the PUSCHs of the several UEs;
generating, according to a mapping relationship, Downlink Control Information (DCI) containing the scheduling information for the PUSCHs of the several UEs, the mapping relationship being used for mapping configured transmission resources used for the PUSCHs of the several UEs to a corresponding scheduling field in the DCI respectively; and sending the DCI.

Compared with the prior art, the present invention has but is not limited to the following technical effects: the scheduling information in the DCI is determined by the mapping relationship between the configured transmission resources used for transmitting the PUSCH by a UE and the scheduling information in the DCI, so that a base station can schedule all UEs for which there is a mapping relationship between PUSCH configured transmission resources and the scheduling information in DCI by sending only one piece of DCI, therefore the scheduling overhead is reduced, the resource waste is reduced, and the efficiency of scheduling terminals by a communication system is significantly improved.

In order to overcome the above technical problem or at least partially solve the above technical problem, the following technical solutions are proposed:

According to one aspect, an embodiment of the present invention provides a method for transmitting data, which is applied to a terminal, including:
deciding, whether a base station supports a first scheduling mode, according to configuration information of the first scheduling mode transmitted by the base station;
Wherein, the frequency scheduling granularity employed by the first scheduling mode is a subcarrier level scheduling.
If the base station supports the first scheduling mode, the terminal transmits a request message and/or capability message to the base station, wherein, the request message is used for requesting the base station to configure the first scheduling mode for the terminal, wherein, the capability message is used for reporting a scheduling mode supported by the terminal; and
the terminal receives the scheduling information under the first scheduling mode transmitted by the base station, and transmits or receives data according to the scheduling information under the first scheduling mode.

According to another aspect, an embodiment of the present invention further provides another method for transmitting data, which is applied to a base station, including:
When the base station supports the first scheduling mode, broadcasting a configuration message of a first scheduling mode;
receiving a request message and/or capability message transmitted by a terminal, wherein, the request message is used for requesting the base station to configure the terminal for the first scheduling mode, wherein, the capability message is used for reporting a scheduling mode supported by the terminal;
if the terminal scheduling mode is the first scheduling mode, the base station transmits the scheduling information under the first scheduling mode to the terminal, so that the terminal transmits or receives data according to the scheduling information under the first scheduling mode.

According to still another aspect, an embodiment of the present invention provides a terminal, including:
a deciding module, for deciding, according to configuration information of a first scheduling mode transmitted by a base station, whether the base station supports the first scheduling mode;
a first transmitting module, for transmitting a request message and/or a capability message to the base station when the base station supports the first scheduling mode, wherein, the request message is used for requesting the base station to configure the first scheduling mode for the terminal, and the capability message is used for reporting a scheduling mode supported by the terminal;

a first receiving module, for receiving scheduling information of a first scheduling mode transmitted by the base station; and a data transmitting module, for transmitting or receiving data according to the scheduling information under the first scheduling mode which is received by the first receiving module.

According to still another aspect, an embodiment of the present invention provides a base station, including:

a broadcasting module, for broadcasting a configuration message in a first scheduling mode when the base station supports the first scheduling mode;

a second receiving module, for receiving a request message and/or capability message transmitted by a terminal, wherein, the request message is used for requesting the base station, to configure the first scheduling mode for the terminal, and the capability message is used for reporting a scheduling mode supported by the terminal; and second transmitting module, for transmitting scheduling information of a first scheduling mode to the terminal when the terminal scheduling mode is the first scheduling mode, so that the terminal transmits or receives data according to the scheduling information under the first scheduling mode.

The present invention provides a terminal, a base station and a method for transmitting data. Compared with the prior art, the terminal of the present invention decides whether the base station supports the first scheduling mode according to the configuration information of the first scheduling mode transmitted by the base station. If the base station supports the first scheduling mode, the terminal transmits a request message and/or capability message to the base station so as to request the base station to configure a first scheduling mode for the terminal or to report a scheduling mode supported by the terminal. When the base station receives the request message and/or capability message transmitted by the terminal and determines that the scheduling mode of the terminal is the first scheduling mode, the base station transmits the scheduling information under the first scheduling mode to the terminal, and the terminal transmits or receives data according to the scheduling information under the first scheduling mode. That is, in the present invention, compared with the prior art, a new scheduling mode is the first scheduling mode. When both the terminal and the base station support the first scheduling mode, the base station can transmit the scheduling information under the first scheduling mode to the terminal. Therefore, the terminal and the base station can transmit or receive data in the new scheduling mode.

Additional aspects and advantages of the invention will be set forth in part in the description which follows, and in part will be obvious from the description below, or may be learned by practice of the invention.

Embodiments of the present invention will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the embodiments of the present invention and should not be regarded as any limitations thereto.

It should be understood by one person of ordinary skill in the art that singular forms "a", "an", "the", and "said" may be intended to include plural forms as well, unless otherwise stated. It should be further understood that terms "comprise/ comprising" used in this specification specify the presence of the stated features, integers, steps, operations, elements and/or components, but not exclusive of the presence or addition of one or more other features, integers, steps, operations, elements, components, and/or combinations thereof. It should be understood that, when a component is referred to as being "connected to" or "coupled to" another component, it can be directly connected or coupled to other elements or provided with intervening elements therebetween. In addition, "connected to" or "coupled to" as used herein can comprise wireless connection or coupling. As used herein, the term "and/or" comprises all or any of one or more associated listed items or combinations thereof.

It should be understood by one person of ordinary skill in the art that, unless otherwise defined, all terms (including technical and scientific terms) used herein have the same meaning as commonly understood by one person of ordinary skill in the art to which the embodiments of the present invention belong. It should be further understood that terms, such as those defined in commonly used dictionaries, should be interpreted as having a meaning that is consistent with their meanings in the context of the prior art and will not be interpreted in an idealized or overly formal sense unless expressly so defined herein.

It should be understood by one person of ordinary skill in the art that the term "terminal" and "terminal equipment" as used herein compasses not only devices with a wireless signal receiver having no emission capability but also devices with receiving and emitting hardware capable of carrying out bidirectional communication over a bidirectional communication link. Such devices can comprise cellular or other communication devices with a single-line display or multi-line display or without a multi-line display; Personal Communication Systems (PCSs) with combined functionalities of speech, data processing, facsimile and/or data communication; Personal Digital Assistants (PDAs), which may include RF receivers, pagers, internet networks/ intranet accesses, web browsers, notepads, calendars and/or Global Positioning System (GPS) receivers; and/or conventional laptop and/or palmtop computers or other devices having and/or including a RF receiver. The "terminal" and "terminal equipment" as used herein can be portable, transportable, mountable in transportations (air, sea and/or land transportations), or suitable and/or configured to run locally and/or distributed in other places in the earth and/or space for running. The "terminal" or "terminal equipment" as used herein may be a communication terminal, an internet terminal, a music/video player terminal. For example, it can be a PDA, a Mobile Internet Device (MID) and/or a mobile phone with a music/video playback function, or can be equipment such as a smart TV and a set-top box.

The embodiments of the present invention provide a method for transmitting scheduling information, so that multiple UEs can be scheduled by one piece of DCI, and this scheduling mechanism can correspond to real-time transmission conditions at any given time point, with low extra overhead and great flexibility. In addition, in typical scenarios such as grant-free uplink transmission where a base station configures a same resource pool for multiple UEs and the UEs select transmission resources in a competitive way, this mechanism can provide an efficient and reliable scheduling way for such scenarios.

Referring to FIG. 1, a method for receiving scheduling information according to the embodiments of the present invention comprises the following steps:

step 101: receiving Downlink Control Information (DCI); and step 102: determining, according to a mapping relationship between configured transmission resources used for a Physical Uplink Shared Channel (PUSCH) and scheduling information in the DCI, scheduling information corresponding to the PUSCH in the DCI.

A method for sending scheduling information according to the embodiments of the present invention comprises the following steps:

step 201: receiving and trying to decode Physical Uplink Shared Channels (PUSCHs) of several UEs in a first uplink time-frequency resource region;

step 202: generating, according to the decoded state of the PUSCHs of the several UEs, scheduling information corresponding to the PUSCHs of the several UEs;

step 203: generating, according to a mapping relationship, Downlink Control Information (DCI) containing the scheduling information for the PUSCHs of the several UEs, the mapping relationship being used for mapping configured transmission resources used for the PUSCHs of the several UEs to a corresponding scheduling field in the DCI respectively; and step 204: sending the DCI.

The method for receiving scheduling information according to the embodiments of the present invention specifically will be specifically described below.

I. UEs perform uplink data transmission on PUSCHs, and a base station receives PUSCH transmissions for the UEs and schedules UEs by DCI. Specifically, the base station performs HARQ-ACK feedback for the UL PUSCH transmissions for the UEs by the DCI according to the received state (received successfully/received unsuccessfully) of the PUSCH transmissions for the UEs.

The UEs decide subsequent actions according to the content of the DCI upon receiving the DCI from the base station. For example, the UEs receive the DCI from the base station, acquire an ACK feedback message and then execute at least one of the following operations: terminating an on-going PUSCH transmission corresponding to the ACK information; clearing configured corresponding uplink grants; releasing the remaining part of PUSCH transmission resources scheduled from the base station; clearing buffer of HARQ processes; and terminating monitoring of a Physical Downlink Control Channel (PDCCH) (the PDCCH may be an MPDCCH, an EPDCCH and an NPDCCH).

II. When the base station schedules UEs by the DCI, it is supported that one piece of DCI carries scheduling information for one UE (in the specification, for ease of description, it is called single DCI for short), one piece of DCI carries scheduling information for multiple UEs (in the specification, for ease of description, it is called group DCI for short), and both the single DCI and the group DCI can be used.

(I) When both the single DCI and the group DCI are used, there is a certain priority relation between the two types of DCI. When the UEs receive the types of DCI simultaneously and the two types of DCI indicate different uplink scheduling information, the UEs always give priority to the result of a certain type of DCI, or the UEs determine the priority of DCI according to the number of scheduled objects based on DCI (single DCI/group DCI) or the DCI format or carried content (for example, it is used for sending A/N feedback (ACK/NACK feedback) or for sending UL grants for scheduling, etc.). The priority relation may be pre-configured or configured by a higher layer.

1. In addition, two possible priority relations are considered: data transmission scheduling messages>other single DCI>other group DCI; or, data transmission scheduling messages>single DCI carrying NACK>group DCI carrying ACK>single DCI carrying ACK>group DCI carrying NACK. Specifically, if a UE receive the ACK information in the group DCI while retransmission is scheduled in the single DCI (for example, retransmission is indicated by a New Data Indicator (NDI)), the UE performs retransmission according to scheduling information in the single DCI. When the base station needs resources occupied by the current uplink transmission for the UE and requires the UE to release the uplink resources, the base station may indicate ACK information by the group DCI, so that the UE terminates the current uplink transmission, but the UE will not clear the HARQ buffer. In this case, the base station may not decode the uplink transmission successfully. When there are uplink resources by which the UE may be scheduled to continue the uplink transmission later, the base station may retrigger the HARQ buffer to perform retransmission by the single DCI.

(II) When a given UE does not obtain any type of DCI after meeting a preset condition (for example, a timer is started after the completion of UL transmission and an ACK/NACK message has not been received after the timer expires), the UE uses a preset processing result (for example, it is considered as ACK or NACK). For example, it is assumed as ACK (the UE sends an ACK message to the higher layer and clears the HARQ buffer), or it is assumed as NACK and retransmission is performed according to a predefined rule, for example, retransmission can be performed in a same frequency-domain resource position 4 milliseconds later.

III. For the single DCI in Item II, specifically, when the base station transmits HARQ-ACK, as an ETS for the UE, by the single DCI, the legacy DCI format is utilized, for example, format 6-0A/B in the eMTC. Types of actions to be terminated by carrying the ETS comprise: terminating PUSCH transmission, or terminating PDCCH monitoring or terminating the both.

(I) It is indicated to carry the ETS in at least one of the following ways:

1. using a value, which has not been used at present, in a certain field in the legacy DCI format;

2. changing the definition of a part of fields in the legacy DCI format; and 3. setting all other fields in the legacy DCI format as a predetermined value, for example, all "1" or all "0".

(II) When the base station needs to terminate the PUSCH transmission for the UE by the single DCI, it can be implemented by one or more of the following solutions:

1. terminating one specific HARQ process by the value of one specific field;

2. terminating all HARQ processes by the value of one specific field; and 3. terminating one or more of multiple HARQ processes by a bitmap, for example, it can be implemented by changing a part of fields in the DCI format.

(III) In the single DCI, the PUSCH transmission for the UE is terminated by using the value of one specific field, and/or the PDCCH monitoring for the UE is terminated by using the value of one specific field, and/or the PUSCH transmission and the PDCCH monitoring for the UE are terminated by using the value of one specific field.

IV. For the group DCI in Item II, the base station generates the group DCI according to a specific UL time-frequency resource region and the group DCI is used for scheduling all or a part of UEs that perform transmission in the time-frequency resource region.

(I) The base station configures one or more group-RNTIs for the UEs by a higher-layer signaling, and the UEs decode the given group DCI by their own group-RNTIs. If the given group DCI is decoded successfully, it is considered that there is scheduling content for the UEs in the DCI.

(II) there may be relevance between the group-RNTI and configured transmission resources corresponding to the group DCI. For example, several configured transmission resources are preset, and a mapping relationship between several group-RNTIs and several configured transmission resources is preset. The UEs acquire the configured transmission resources corresponding to the group DCI according to the group-RNTI used for decoding the group DCI successfully.

V. The specific UL time-frequency resource region in Item IV may be determined in one or more of the following ways.

(I) The specific UL time-frequency resource region is determined according to a mapping relationship predefined or configured by a higher layer and based on transmitting time-frequency resources for the group DCI. For example, the UEs receive and successfully decode the group DCI in a subframe n (the subframe may be a timeslot, a resource unit or a minimum scheduling time unit), and it is determined according to the mapping relationship configured by the higher layer that the specific UL time-frequency resource region corresponding to the group DCI is located in a subframe n−4.

(II) The specific UL time-frequency resource region is carried in the group DCI directly or indirectly. For example, the number of a Physical Resource Block (PRB) in a starting frequency-domain position of the specific UL time-frequency resource region corresponding to the group DCI is indicated by a message field in the group DCI.

(III) The specific UL time-frequency resource region is configured by the base station and/or pre-appointed by a protocol. For example, several configured transmission resources are preset and numbered in order. In addition, the number of the corresponding specific UL time-frequency resource region is carried in the group DCI, or the UEs select the number of the corresponding specific UL time-frequency resource region according to the configured RNTI.

VI. In order to distinguish all or a part of UEs scheduled by the group DCI in Item IV, a mapping relationship between the UEs and scheduling content in the group DCI is established.

(I) Configured transmission resources for the UEs are defined by any one of the following ways or any combination thereof, that is, the configured transmission resources may comprise any one of time-frequency resources, codewords or pilot signals or a combination thereof.

1. Based on time-frequency resources: the specific UL time-frequency resource region in Item IV is divided into several minimum scheduling units which are numbered in order of resource positions, so that the minimum scheduling units corresponding to time-frequency resource positions for PUSCH transmission by the UEs are configured transmission resources.

(1) There may be multiple UEs (these UEs are distinguished again in combination with other methods) that perform transmission on a minimum scheduling unit. One UE may perform transmission on multiple minimum scheduling units, and the number of the first minimum scheduling unit in the starting position is determined as configured transmission resources.

(2) As a method for dividing into minimum scheduling units, a predefined division method is used, or the method for dividing into minimum scheduling units is calculated according to a part of parameters predefined/configured by a higher layer/carried in the DCI. For example, it is predefined that the time-frequency resource size of the minimum scheduling units is one subframe in the time domain and one PRB in the frequency domain. For example, within a successive frequency-domain range, it is configured by the higher layer that the size of the minimum scheduling units in the frequency domain is three subcarriers, and it is predefined that the size of the minimum scheduling units in the time domain is one subframe.

2. Based on codewords: if different UEs perform transmission on the same time-frequency resources by different codewords and the supported number of codewords is limited, the codewords are numbered in order and the number of codewords used by the UEs is transmission configuration resource. Specifically, different codewords may be different spreading codes, different scrambling codes, different interleaved codes and different resource element mapping patterns, etc.

3. Based on pilot signals: configured transmission resources are determined according to a prefined order of Demodulation Reference Signals (DMRSs) (for example, different sequences and/or different DMRS positions).The pilot signals used by the UEs are used as configured transmission resources.

4. In addition, when the system supports to configure multiple group-RNTIs, configuring different group-RNTIs for different UEs may be used as an approach to distinguish the UEs.

(II) Parameter content related to configured transmission resources for the UEs is directly or indirectly carried in the group DCI, or a mapping relationship between DCI fields and parameters related to configured transmission resources for the UEs is predefined.

1. Mapping Based on a Bitmap

Several scheduling fields corresponding to transmission resource configurations are established in the group DCI according to all transmission resource configurations within a first time-frequency resource region. Specifically, any one of the following ways or a combination thereof is included.

(1) Several scheduling fields having a mapping relationship with all minimum scheduling units divided in Item (I) are established in the group DCI, and scheduling content for the UEs that perform transmission on the corresponding minimum scheduling units is carried in each scheduling field.

(2) If different UEs perform PUSCH transmission by different codewords, each codeword corresponds to a scheduling field in one group DCI and carries scheduling content for the UEs mapped to the corresponding codeword.

(3) If different UEs perform PUSCH transmission by different pilot signals (for example, DMRSs in different sequences, DMRSs in different time-frequency resource positions), each pilot signal corresponds to a scheduling field in one group DCI and carries scheduling content for the UEs mapped to the corresponding pilot signal.

(4) Specifically, when the scheduling content is UL A/N feedback, the A/N feedback result of all configured transmission resources (for example, each pilot signal used by each codeword in each minimum scheduling unit) in Item (I) is carried by a bitmap.

2. Mapping Based on RNTIs (1) When the system supports to configure multiple group-RNTIs, group-RNTIs configured for the UEs and group-RNTIs used for scrambling the DCI may be used for determining whether there is relevance between scheduling fields in the DCI and identifiers of the UEs.

(2) And/or, the system configures group-RNTIs for the UEs and also the number of the UEs in the group. There is a mapping relationship between the number of the UEs and one or more scheduling fields in the group DCI, and the UEs select scheduling fields used for acquiring scheduling information from the group DCI according to the configured number.

3. Mapping between scheduling fields and configured transmission resources for the UEs (1) Several scheduling fields having a mapping relationship with a part of UEs to be scheduled are established in the group DCI, and scheduling content for the corresponding UEs and transmission resource configuration of the UEs are carried in each scheduling field.

(2) There is a mapping relationship between the scheduling fields in the group DCI and a part of configured transmission resources for the UEs, and scheduling content and the remaining configured transmission resources without mapping relationship are carried in each scheduling field. For example, several scheduling fields are established in the group DCI for each minimum scheduling unit, and scheduling content and codewords and pilot signals used by a part of UEs to be scheduled are carried in each scheduling field.

VII. The base station may send only one of ACK and NACK states. For example, when the base station performs ACK/NACK feedback, if the base station performs scheduling only for ACK and the UEs fail to receive an ACK message sent by the base station within a search space configured by the base station in during the PUSCH transmission, it is considered that the on-going PUSCH transmission is in the NACK state. On the contrary, if the base station performs scheduling only for NACK and the UEs fail to receive an NACK message sent by the base station within the search space configured by the base station during the PUSCH transmission, it is considered that the on-going PUSCH transmission is in the ACK state.

(I) The scheduling content is omitted in the group DCI and only several fields used for determining configured transmission resources for the UEs are carried. When the purpose of using the group DCI by the base station is to perform A/N feedback, if the base station performs scheduling only for ACK, the UEs consider that they receive the ACK after acquiring the fields corresponding to their configured transmission resources in the DCI; and if the base station performs scheduling only for NACK, the UEs consider that they receive the NACK after acquiring the fields corresponding to their configured transmission resources in the DCI.

VIII. The UEs decode the group DCI by their own group-RNTIs. If the DCI can be decoded successfully, scheduling field positions related to the UEs are determined according to a mapping relationship between identifiers of the UEs predefined/configured by a higher layer and the scheduling fields in the DCI, thus to decode the scheduling content for the UEs.

IX. If the UEs decode the group DCI and obtain the ACK feedback result corresponding to a HARQ process form the group DCI, the subsequent actions of the UEs comprise:

(I) when the ACK feedback result is used as an ETS, executing at least one of the following operations:
  1. terminating an on-going PUSCH transmission corresponding to the ACK information;
  2. clearing UL grants configured by the base station;
  3. releasing the remaining part of PUSCH transmission resources scheduled form the base station;
  4. clearing buffer of HARQ processes; and
  5. terminating monitoring of a Physical Downlink Control Channel (PDCCH).

Preferably, the UEs perform subsequent actions (for example, one or more of the operations 1 to 5) according to a priority order or action selection configuration predefined/configured by a higher layer within a predefined time window or at a predefined time point.

X. If the UEs decode the single DCI or the group DCI and obtain the NACK feedback result from the single DCI or the group DCI, the UEs continue performing unfinished transmission; or, if primary PUSCH transmission/the current retransmission is completed, the UEs trigger new PUSCH retransmission.

XI. In addition, it is configured in the group DCI that the UEs terminate the PDCCH monitoring. The UEs can automatically terminate the PDCCH monitoring after obtaining the ACK feedback result in all on-going HARQ processes, or the group DCI may carry fields used for configuring whether to terminate the PDCCH monitoring in each scheduling field.

XII. Before and/or after the base station sends the single DCI or the group DCI for carrying the A/N feedback result to the UEs, the monitoring of the UEs is kept within a time window of a predefined length, to confirm whether the UEs receive the A/N feedback result correctly. If the UEs receive the A/N feedback result correctly, the base station may continue the subsequent scheduling, or otherwise:

(1) if the base station sends an ACK and the UEs fail to receive the feedback result correctly, the base station is triggered to send the ACK to the UEs again by the single/group DCI, or, the base station carries the real-time A/N feedback result again when generating the group DCI for performing UL feedback next time;

(II) if the base station sends an NACK and the UEs fail to receive the feedback result correctly, the base station sends the NACK again by the single DCI or schedules the UEs directly for corresponding retransmission.

XIII. Content of the group DCI comprises the following optional fields:

(I) subframe index and PRB index, configured to determine the number of a starting and/or ending subframe/(sub-)PRB within the first time-frequency resource region;

(II) subframe length and PRB length, configured to determine the length of the first time-frequency resource region in both time domain and frequency domain;

(III) time-domain granularity and frequency-domain granularity, configured to determine the number of (sub-)physical resource blocks of each minimum scheduling unit in the time domain/frequency domain when the first time-frequency resource region is divided into minimum scheduling units; for example, when the time-domain granularity is 1 and the frequency-domain granularity is 1, if the frequency-domain configuration is in PRB level, the minimum scheduling unit is one PRB in the LTE system; if the frequency-domain configuration is in sub-PRB level, the minimum scheduling unit is one sub-PRB in the LTE system; for example, when values of the time-domain granularity and the frequency-domain granularity are greater than 1, the minimum scheduling unit is several PRBs or sub-PRBs which are successive in the time domain and/or frequency domain in the LTE system;

(IV) time-domain number and frequency-domain number, configured to determine the number of a region corresponding to the group DCI when the first time-frequency resource region is divided into several regions;

(V) (time-domain or frequency-domain) resource granularity division pattern, configured to determine the type of pattern that the group DCI specifically uses when several time-domain and/or frequency-domain division patterns are predefined for the specific uplink time-frequency resources;

(VI) sub-PRB identifier, configured to determine whether frequency-domain indication information for the group DCI is specific to the PRB level or the sub-PRB level; and (VII) scheduling content, e.g., scheduling content 1, scheduling content 2, wherein scheduling functions of scheduling fields are the same or different, and the type of the scheduling function or the length of the field needs to be indicated additionally in each field when the scheduling functions are different.

XIV. The group DCI is sent, as a downlink control signaling, in a search space of the downlink control channel, and the possible search space comprises a currently-defined Common Search Space (CSS) and a UE-specific Search Space (USS), or a new group CSS is otherwise defined and the group DCI is sent therein.

(I) When the group DCI is sent in the USS, it is sent in USSs of all UEs having a relevance with scheduling information in the group DCI, and a same piece of DCI may be sent in different USSs for multiple times.

(II) When the currently-defined CSS is used, some resource positions used for or only for sending the group DCI are preset in the CSS, and the transmission of the group DCI is not supported in other positions.

(III) When the additionally-defined group CSS is used, a newly-defined group DCI search space is introduced in the system. The search space is configured for a set of UEs by the base station, and UEs in the set are activated to listen to the group DCI search space according to preset conditions.

(IV) The UEs keep monitoring of all USSs and CSSs configured for them by the base station, and distinguish the group DCI from other DCI by the type of the search space/the position of the search space/RNTIs used by the DCI. When there is collision between search spaces, it is supported to use priority of search spaces predefined/configured by a higher layer.

In the steps, the PUSCH transmission or the PDCCH monitoring is terminated early by feeding back the DCI by HARQ-ACK. Another method is to introduce a signal sequence specifically used for early termination in the system. The sequence of early termination signals may utilize Go-To-Sleep (GTS) signals in the MTC system, including: early termination of the PUSCH receiving and the PDCCH monitoring for the UEs is additionally added to a function of a go-to-sleep indication sent by the GTS signals in the legacy system, that is, the UEs execute early termination when receiving the GTS signals in the legacy system; and/or, a sequence is used as early termination signals in the system and the design of the sequence is the same as the design of the sequence of GTS signals, that is, the UEs determine that the sequence includes early termination signals or go-to-sleep signals according to the position of the resource receiving the sequence. Or, a set of sequences additionally defined is used as the sequence of early termination signals.

The sequence of early termination signals is transmitted by a mechanism similar to the DCI and is sent by the base station in the USSs and/or CSSs for the UEs. The USSs and/or CSSs are new search spaces specifically used for this type of sequences, or USSs or CSSs configured for the UEs as defined in the legacy system.

Embodiment 1

A UE1, a UE2 and a UE3 initiate uplink transmission to the base station and listen to PDCCH search spaces configured for them by the base station, respectively.

The base station sends two pieces of DCI to the UE1, one is single DCI used for transmitting an ACK feedback message for the UE1 and the other one is group DCI used for transmitting an NACK feedback message about time-frequency resource positions used by the UE1 for UL transmission.

The UE1 receives the two pieces of DCI during monitoring, and considers that UL transmission is success according to the priority of the single DCI being higher than that of the group DCI among priorities configured by a higher layer.

The base station sends two pieces of DCI to the UE2, one is single DCI used for transmitting a UL grant scheduling message for the UE2 and the other one is group DCI used for transmitting an NACK feedback message about time-frequency resource positions used by the UE2 for UL transmission.

The UE2 receives the two pieces of DCI during monitoring and executes a scheduling instruction carried in the UL grant according to the priority of UL grant scheduling being higher than that of A/N feedback among the predefined priorities.

The base station receives uplink data from the UE3 successfully and does not send the DCI for feedback to the UE3.

A timer is started after the UE3 completes the UL transmission. After the timer expires, the UE3 considers that the UL transmission is successful and will not start retransmission if it does not receive the single DCI or the group DCI sent to the UE3 by the base station.

Embodiment 2

In an MTC ETS scenario, a base station 1 sends the single DCI in the DCI format 6-0A/B to the UE1 to carry the A/N feedback message.

When the UE1 is in a Coverage Enhancement (CE) mode A, the resource allocation field in the legacy DCI format 6-0A has at least 11 and at most 176 unused values according to the configured maximum PUSCH bandwidth and system bandwidth. If the resource allocation field has M unused values in the legacy DCI format 6-0A for the UE1, the UE1 executes at least one of the following actions: defining any 8 of values as early termination of transmission of 8 UL HARQ processes for the UE1; defining any one of values as early termination of transmission of all UL HARQ processes for the UE1; defining any one of values as early termination of PDCCH monitoring for the UE1; defining any 8 of values as early termination of 8 UL HARQ processes and PDCCH monitoring for the UE1; and defining any one of values as early termination of PDCCH monitoring and transmission of all HARQ processes for the UE1. In addition, any number of values may be defined as early termination of transmission of any number of HARQ processes.

Specifically, it is assumed that the maximum PUSCH transmission bandwidth for the UE1 is 1.4 MHz and the system bandwidth is 1.4 MHz, and that the resource allocation field in the DCI format 6-0A has 11 unused values, the $N^{th}$ value is defined as early termination of a HARQ process #N and PDCCH monitoring corresponding to the UE1 in order, where N is an integer between 1 and 8; the ninth value is defined as early termination of all HARQ processes corresponding to the UE1; the tenth value is defined as early termination of PDCCH monitoring corresponding to the UE1; and the eleventh value is defined as early termination of all HARQ processes and PDCCH monitoring corresponding to the UE1.

When the UE1 is in a Coverage Enhancement (CE) mode B, 11 Modulation and Coding Scheme (MC S) indexes are supported, and there are 5 unused values in the MCS field, as shown in Table 2. Values may be set in at least one of the following ways: defining any 2 of values as early termination of transmission of 2 UL HARQ processes for the UE1; defining any one of values as early termination of transmission of all UL HARQ processes for the UE1; defining any one of values as early termination of PDCCH monitoring for the UE1; defining any 2 of values as early termination of 2 UL HARQ processes and PDCCH monitoring for the UE1; and defining any one of values as early termination of transmission of PDCCH monitoring and transmission of all HARQ processes for the UE1. In addition, any number of values may be defined as early termination of transmission of any number of HARQ processes.

TABLE 2

PUSCH MCS mapping table in CE mode B

| MCS index | Modulation order | Transport Block Size (TBS) index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | Unused values in CE mode B | |
| 12 | | |
| 13 | | |
| 14 | | |
| 15 | | |

Specifically, the MCS indexes 11 and 12 are defined as early termination of HARQ processes #0 and #1 corresponding to the UE1 in order, the MCS index 13 is defined as early termination of all HARQ processes corresponding to the UE1, the MCS index 14 is defined as early termination of PDCCH monitoring corresponding to the UE1, and the MCS index 15 is defined as early termination of all HARQ processes and PDCCH monitoring corresponding to the UE1, as shown in Table 3.

TABLE 3

PUSCH MCS mapping table in CE mode B, used for indicating MTC ETS

| MCS index | Modulation order | Transport block size index (TBS) |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | ACK feedback of UL HARQ process #0 (which may be regarded as early termination signals for the HARQ process #0) | |
| 12 | ACK feedback of UL HARQ process #1 (which may be regarded as early termination sigials for the HARQ process #1) | |
| 13 | ACK feedback of all UL HARQ processes (which may be regarded as early termination signals for all HARQ processes) | |
| 14 | Early termination signals for PDCCH monitoring | |
| 15 | Early termination signals for all HARQ procees and PDCCH monitoring | |

In the MTC ETS scenario, a base station 2 sends the single DCI in the DCI format 6-0A/B to the UE2 to carry the A/N feedback message. As described above, the resource allocation field or MCS field in the DCI in the CE mode A or mode B has at least 5 unused values. Values may be set in at least one of the following ways: defining any one of values as early termination of transmission of all UL HARQ processes for the UE2; defining any one of values as early termination of PDCCH monitoring for the UE2; defining any one of values as early termination of PDCCH monitoring and transmission of all UL HARQ processes for the UE2; defining any one of values as early termination of transmission of a specific UL HARQ process for the UE2, and utilizing the HARQ process number field to indicate the number of the specific HARQ process; and defining any one of values as early termination of transmission of a specific UL HARQ process and PDCCH monitoring for the UE2, and utilizing the HARQ process number field to indicate the number of the specific HARQ process.

In the MTC ETS scenario, a base station 3 sends the single DCI in the DCI format 6-0A/B to the UE3 to carry the A/N feedback message, and changes the meaning of any X-bit fields to correspond to X HARQ processes by a bitmap, respectively. The A/N feedback result is represented by 0 and 1.X is 8 in the CE mode A and is 2 in the CE mode B, and the specific positions of X-bit fields are predefined by the UE. The single DCI may be distinguished from the legacy DCI format 6-0A/B by different RNTIs.

Embodiment 3

The UEs which support to carry the feedback message as the ETS by the group DCI should acquire configuration information of the group DCI from the base station in advance. The configuration information of the group DCI may be acquired by a higher-layer message. The configuration information contains at least one or more group-RNTIs and may additionally contain the number of the UEs corresponding to each group-RNTI.

Figure 2:
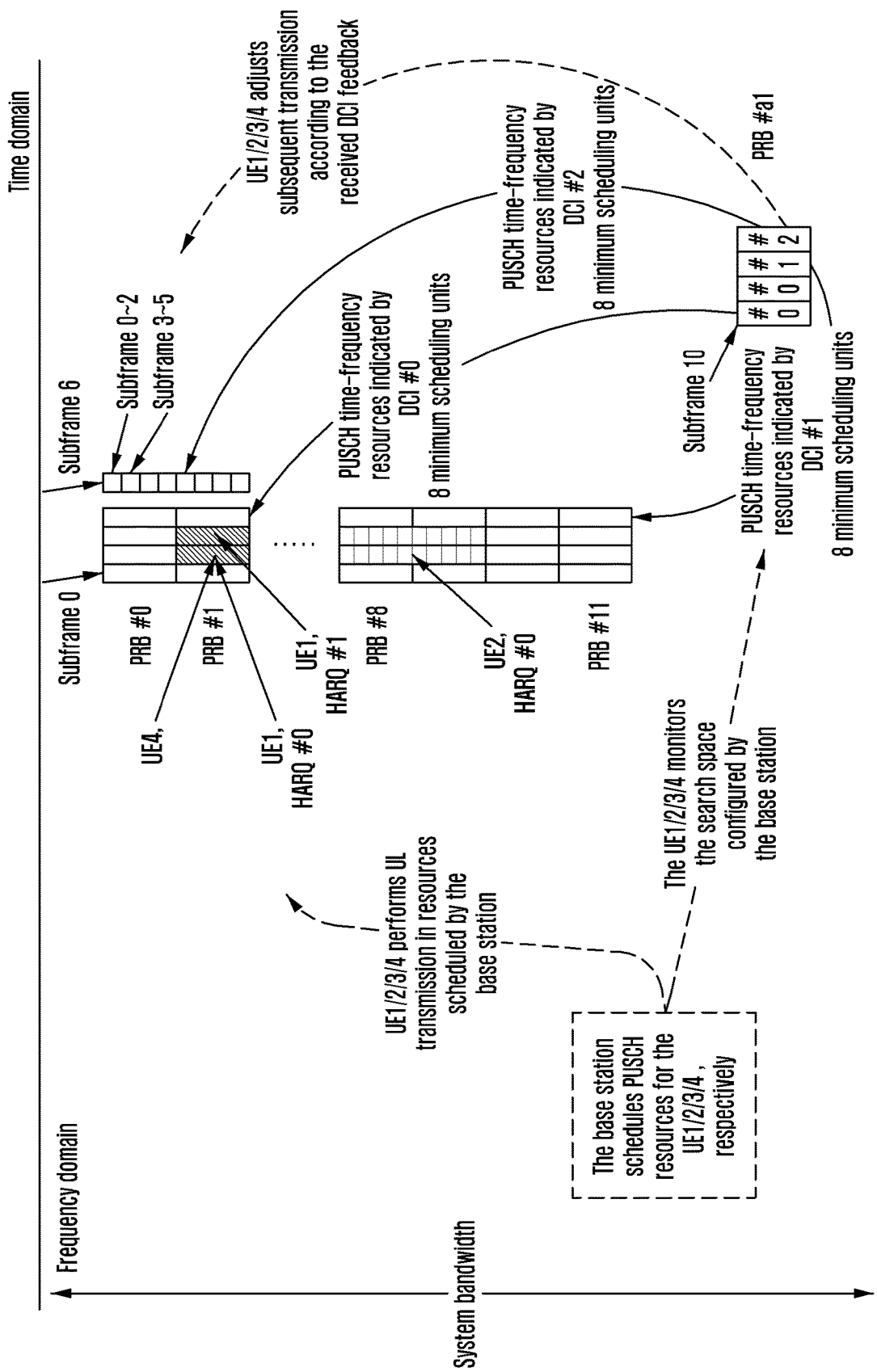
FIG. 2 is a schematic view of time-frequency resources in a process of receiving scheduling information according to Embodiment 3 of the present invention.

Referring to FIG. 2, the UEs perform continuous or intermittent data transmission on PUSCH time-frequency resources configured for them by the base station, keep monitoring of PDCCHs configured as search spaces, perform blind detection on possible listened DCI signals, and try to perform CRC decoding based on the configured group-RNTI. When more than one group-RNTI is configured, the group-RNTIs are tried one by one. For Full Duplex-Frequency Division Duplex (FD-FDD) UEs, if the configured resource positions for PUSCH transmission and PDCCH monitoring are superposed in the time domain, the UEs perform PUSCH transmission and PDCCH monitoring within the configured UL and DL resource regions simultaneously; for Half Duplex-Frequency Division Duplex (HD-FDD) UEs, if the configured resource positions for PUSCH transmission and PDCCH monitoring are superposed in the time domain, it is not supported in the superposed region to perform PUSCH transmission and PDCCH monitoring within the configured UL and DL resource regions simultaneously, and therefore the UEs select one with a higher priority from UL transmission and DL monitoring according to the preset priorities, for example, always preferentially perform PUSCH transmission; and for Time Division Duplex (TDD) UEs, since DL resources and UL resources in various TDD configurations are not superposed in the time domain, UL PUSCH transmission resources and DL PDCCH monitoring resources configured for the TDD UEs by the base station are not superposed in the time domain.

If the UEs decode the listened DCI successfully by a configured group-RNTI, the UEs read the A/N feedback information sent to the UEs by the base station from the DCI. The UEs may determine how to read the A/N information in the DCI by any combinations of the following: content of a message field carried in the DCI, time-frequency resource positions used for DCI transmission, the group-RNTI used for decoding the DCI, parameters and a mapping relationship which are pre-configured or configured by a higher layer.

For example, the UE1 receives and successfully decodes the group DCI #0. The UE1 determines, according to the time-domain resource position for the group DCI #0 being a subframe [t1=10, t2=11] and by the preset parameters k1=10 and k2=7, that the PUSCH time-domain resource region indicated by the group DCI #0 is a subframe [t1−k1, t1−k2], i.e., a subframe [0, 3]; the UE1 determines, according to the frequency-domain resource position for the group DCI #0 being a PRB [#a1, #a2] and by the preset mapping relationship, that the PUSCH frequency-domain resource region indicated by the group DCI #0 is a PRB [#b1=0, #b2=1]; and the UE1 determines, according to the pre-configured time-domain PUSCH resource granularity and a mapping relationship between the pre-configured frequency-domain PUSCH resource positions and the supported frequency-domain PUSCH resource granularity, that the frequency-domain resource granularity supported on a PRB [#0, #1] is one PRB, thereby determining that the PUSCH resource granularity (which is called one minimum scheduling unit) of the time-frequency resource region indicated by the group DCI #0 is one subframe in the time domain and one RB in the frequency domain, where there are total 8 minimum scheduling units within the time-frequency resource region. The UE1 determines, according to the position of PUSCH transmission resources used for the UE1 in the time-frequency resource region being a subframe [1, 2] and a PRB #1 and according to a predefined mapping order where the time domain is prior to the frequency domain, that the PUSCH transmission resources used for the UE1 are located at the sixth to the seventh successive minimum scheduling units in the time-frequency resource region. When obtaining the A/N feedback message from the group DCI #0, the UE1 reads the content of the sixth to the seventh bits in a bitmap with an 8-bit A/N field carried in the group DCI #0. It is assumed that the UE1 performs transmission of the UL HARQ process #0 in the subframe 1 and the PRB #1, and performs transmission of the UL HARQ process #1 in the subframe 2 and the PRB #1, the sixth bit in the bitmap with the A/N field carried in the group DCI #0 is the A/N feedback result for the HARQ process #0, and the seventh bit is the A/N feedback result for the HARQ process #1.

For example, the UE2 receives and successfully decodes the group DCI #1. According to the time-domain resource position for the group DCI #1 being a subframe t3=12 and according to the number of the minimum scheduling unit division type carried in the group DCI #1, the UE2 finds corresponding parameters k3=12 and k4=9 in a predefined minimum scheduling unit division type table and determines that the PUSCH time-domain resource region indicated by the group DCI #1 is a subframe [t3−k3, t3−k4], i.e., a subframe [0, 3], the indicated PUSCH frequency-domain resource region is a PRB [#b3=8, #b4=11], and the PUSCH resource granularity (which is called one minimum scheduling unit) is one subframe in the time domain and two PRBs in the frequency domain, where there are total 8 minimum scheduling units within the time-frequency resource region. The UE2 determines, according to the position of PUSCH transmission resources used for the UE2 in the time-frequency resource region being a subframe [1, 2] and a PRB [#8, #9] and according to a predefined mapping order where the time domain is prior to the frequency domain, that the PUSCH transmission resources used for the UE2 are located at the second to the third successive minimum scheduling units in the time-frequency resource region. When obtaining the A/N feedback message from the group DCI #1, the UE2 reads the content of the second to the third bits in the bitmap with an A/N field carried in the group DCI #1. It is assumed that the UE2 performs transmission of the UL HARQ process #0 in the subframe [1, 2] and the PRB [#8, #9], the second and the third bits in the bitmap with an 8-bit A/N field carried in the group DCI #0 are the A/N feedback result for the HARQ process #0, and the decoded A/N feedback value should be the same. Otherwise, it is considered as an error. For example, the UE considers the DCI decoding as false detection, the processing way is equivalent to a case where no A/N feedback is received, and the default A/N state when no feedback is received is used.

For example, the UE3 receives and successfully decodes the group DCI #2. The UE3 determines, according to the time-domain resource position for the group DCI #2 being a subframe t5=13 and by the preset parameter k5=7, that the PUSCH time-domain resource region indicated by the group DCI #2 is a subframe t5−k5, i.e., a subframe 6; the UE3 determines, according to the group-RNTI used for decoding the group DCI #2 and by a preset mapping relationship, that the PUSCH frequency-domain resource region indicated by the group DCI #2 is a PRB [#b1=0, #b2=1]; the UE3 determines, according to the sub-PRB identifier carried in the group DCI #2, that the frequency-domain parameter in the group DCI #2 is in the sub-PRB level; the UE3 determines, according to the frequency-domain minimum scheduling unit division granularity carried in the group DCI #2 being 3 subcarriers, that the PUSCH resource granularity (which is called one minimum scheduling unit) in the time-frequency resource region indicated by the group DCI

2 is one subframe in the time domain and three subcarriers in the frequency domain, where there are total 8 minimum scheduling units within the time-frequency resource region. The UE3 determines, according to the position of PUSCH transmission resources used for the UE3 in the time-frequency resource region being a subframe 6 and a subcarrier [#3, #5] of the PRB #0 and according to a predefined mapping order where the time domain is prior to the frequency domain, that the PUSCH transmission resources used for the UE3 are located at the second minimum scheduling unit in the time-frequency resource region. When obtaining the A/N feedback message from the group DCI #2, the UE3 reads the content of the second bit in a bitmap with an 8-bit A/N field carried in the group DCI #2.

For example, the UE4 performs PUSCH transmission in the subframe 1 and the PRB #1, and the PUSCH transmission resources for the UE4 are superposed with part of PUSCH transmission resources for the UE1 and distinguished by different DMRSs. The UE1 and the UE4 are configured with different group-RNTIs. The UE4 receives the group DCI #0/1/2 which cannot be decoded successfully even by all group-RNTIs configured for the UE4. Therefore, the UE4 considers that it does not receive the A/N feedback message sent by the base station.

The UEs determine subsequent actions according to the A/N state after obtaining the A/N feedback information sent to the UEs by the base station from the group DCI. If the UEs obtain the ACK feedback from the group DCI, the UEs terminate transmission of a UL HARQ process corresponding to the ACK feedback in the next subframe after decoding the group DCI, and release corresponding remaining PUSCH resources. In addition, the UEs terminate the PDCCH monitoring after all on-going UL HARQ processes are transmitted or the ACK feedback is obtained. If the UEs obtain the NACK feedback from the group DCI, the UEs continue the unfinished PUSCH transmission, or the UEs trigger PUSCH retransmission by the NACK.

It is to be noted that, it may be understood by those skilled in the art that the method according to the embodiments of the present invention, i.e., by the UEs, determining the specific time-frequency resource region first and then determining scheduling information corresponding to the DCI according to a relative position of the time-frequency resource position used for the PUSCH in the specific time-frequency resource region, may be applied to the single DCI. The difference lies in that the DCI only carries scheduling information for one UE. Please refer to the previous description for other details.

Embodiment 4

It is supported to determine frequency-domain resources in the following ways:

{the frequency-domain starting PRB index, the length of the PRB/the frequency-domain ending PRB index, the frequency-domain minimum scheduling unit division granularity/number/pattern};

or, frequency-domain indexes, possibly any combinations of parameters in the following set: {the length of the PRB, the frequency-domain minimum scheduling unit granularity, the frequency-domain minimum scheduling unit number, the minimum scheduling unit division pattern}.

In addition, it is supported to use frequency-domain resources in the PRB level and the sub-PRB level. The frequency-domain resources can be distinguished by sub-PRB identifiers; or they can be distinguished by RNTIs, that is, some of specific RNTIs are bound to only the PRB level/sub-PRB level; or, they can be distinguished by the frequency-domain position, that is, some of specific sub-bandwidths in the transmission bandwidth are bound to only the sub-PRB level. Further, when the sub-PRB level is used, only a limited number of sub-PRB granularities may be supported and the frequency-domain resources can be distinguished by RNTIs or frequency-domain positions as well. When the sub-PRB level is used, it is supported to use all frequency-domain parameters in the sub-PRB level, and also supported to use some frequency-domain parameters pre-configured/configured by a higher-layer signaling in the sub-PRB level and other frequency-domain parameters in the PRB level.

It is supported to determine time-domain resources in the following ways:

{the time-domain starting subframe index (the difference from the DCI transmission subframe (transmission interval) can be used), the length of the subframe/the time-domain ending subframe index, the time-domain minimum scheduling unit division granularity/number/pattern};

or, time-domain indexes, possibly any combinations of parameters in the following set: {the length of the subframe, the time-domain minimum scheduling unit granularity, the time-domain minimum scheduling unit number, the minimum scheduling unit division pattern}.

It is supported to configure time-frequency parameters in the following ways: predefined/pre-configured, configured by a higher-layer signaling, carried explicitly or implicitly in the DCI, mapped according to RNTIs used by the group DCI, mapped according to the time-frequency position of the DCI.

Any given RNTIs used by the group DCI may correspond to predefined frequency-domain and/or time-domain resource positions, or, any one of given group-RNTIs may correspond to a mapping relationship between each bit of the A/N feedback field in the group DCI and the specific frequency-domain position.

Any given RNTIs used by the group DCI may correspond to one UE or a set of multiple UEs, that is, given RNTIs will be configured for one or more specific UEs.

One or more group-RNTIs are defined, any one of given group-RNTIs may be pre-configured or configured by a higher-layer signaling to map to several successive or non-successive frequency-domain subchannels, and each subchannel corresponds to each bit of the A/N feedback field in the DCI in order.

The parameters can be predefined or configured by a higher layer.

Figure 3:
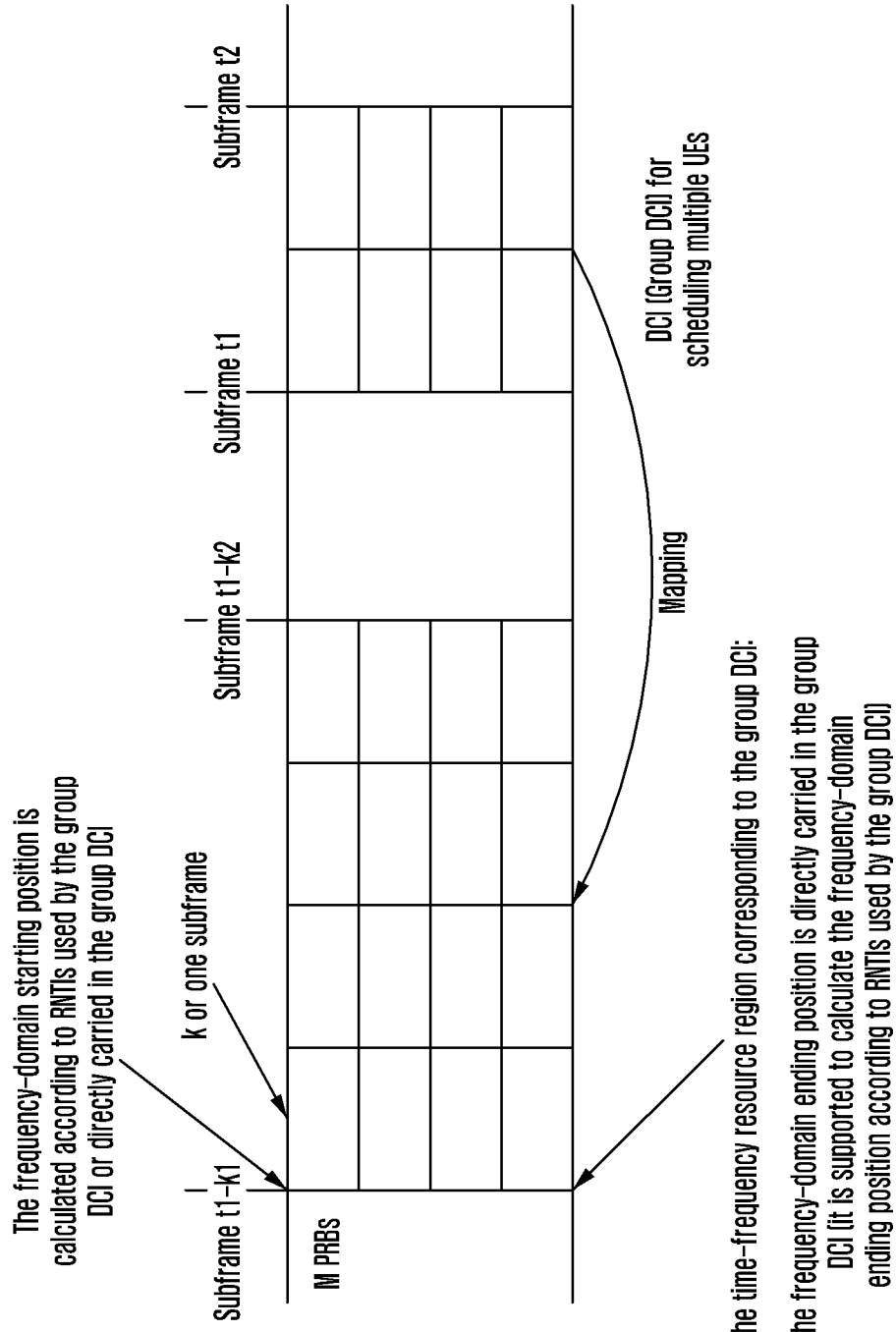
FIG. 3 is a schematic view of a first correspondence between the DCI and the scheduled time-frequency resources according to Embodiment 4 of the present invention.

Referring to FIG. 3, for example, the base station transmits the group DCI in a subframe [t1, t2] for the UL A/N feedback. According to a predefined mapping relationship, the time-frequency resource position corresponding to the group DCI is from a subframe t1−k1 to a subframe t1−k2 in the time domain and n*M PRBs in the transmission bandwidth in the frequency domain. k1, k2, n and M are predefined values, where M is the frequency-domain minimum scheduling unit division granularity, the time-domain minimum scheduling unit division granularity is k or is predefined as 1, and the frequency-domain starting position is calculated according to indexes of group-RNTIs used by the group DCI. Or, values of k1, k2, n and M are directly carried in the DCI. Or, k1 and k2 are predefined values, the time-domain minimum scheduling unit division granularity is predefined as 1, the frequency-domain starting/ending position and the frequency-domain minimum scheduling unit division granularity are directly carried in the DCI, and the carrying way is to provide the number in a predefined minimum scheduling unit division pattern table. t1=t2 and k1=k2 are supported.

Figure 4:
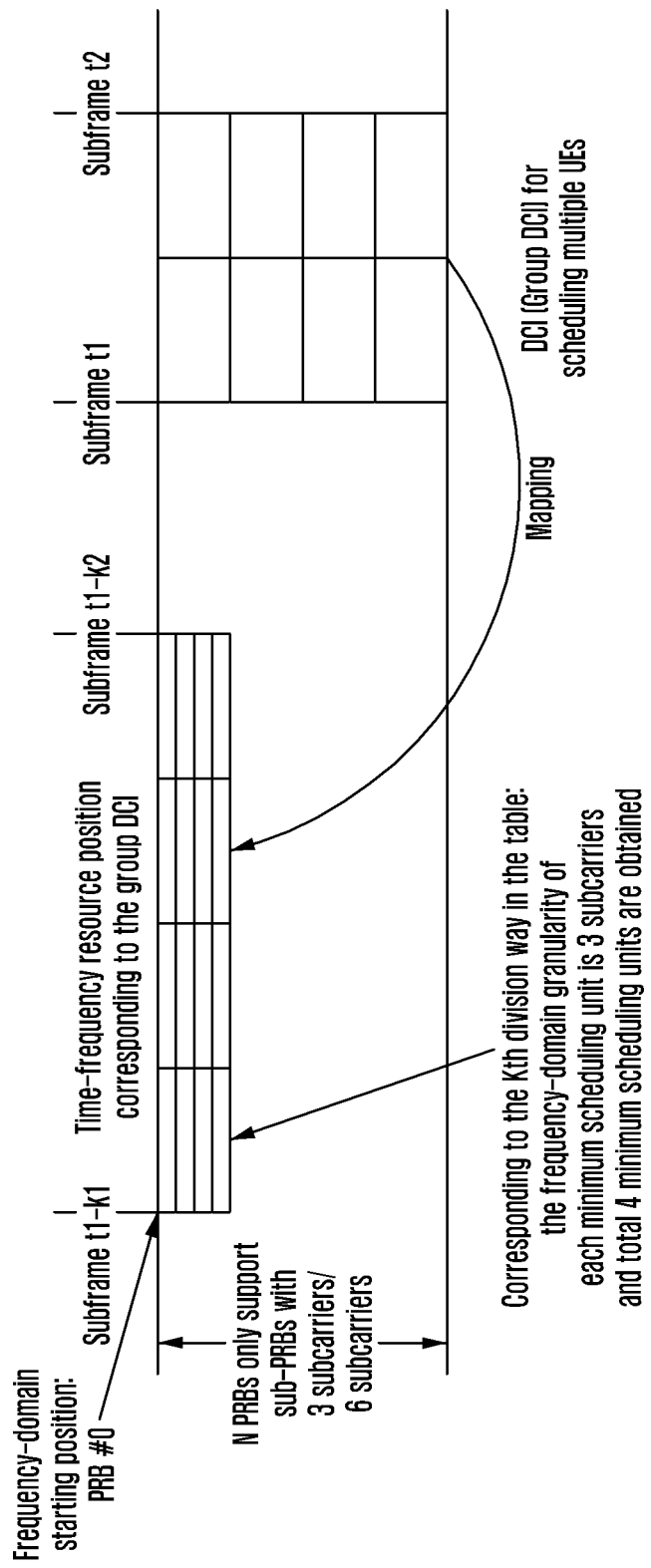
FIG. 4 is a schematic view of a second correspondence between the DCI and the scheduled time-frequency resources according to Embodiment 4 of the present invention.

Referring to FIG. 4, the base station transmits the group DCI for UL A/N feedback, and the group DCI contains a sub-PRB identifier field and the value of the field is 1, that is, it carriers information in the sub-PRB level. The frequency-domain starting PRB index carried in the group DCI is 0, and the minimum scheduling unit division pattern is K. According to pre-configured content, N PRBs in the lowest frequency-domain position in the transmission bandwidth only support sub-PRB resources with the granularity of 3 subcarriers and 6 subcarriers, and it is determined according to the group-RNTI of the group DCI that the group-RNTI supports sub-PRB resources with the granularity of 1/2/3 subcarriers. Therefore, the $K^{th}$ division way in the minimum scheduling unit division pattern table having sub-PRB resources with the granularity of 3 subcarriers is finally used.

Embodiment 5

Figure 5:
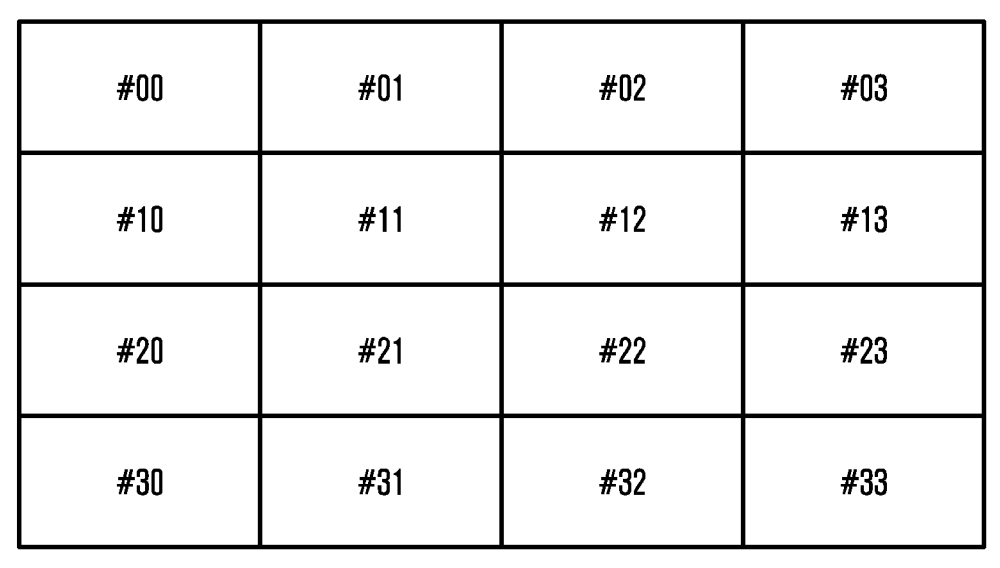

The base station transmits the group DCI in a subframe n for the UL A/N feedback. According to a predefined mapping relationship, the time-frequency resource position corresponding to the group DCI is from a subframe n−k−3 to a subframe n-k in the time domain and the top 4M PRBs in the transmission bandwidth in the frequency domain. The time-frequency resources are divided into 16 minimum scheduling units according to the predefined time-domain and frequency-domain minimum scheduling unit granularity. The resource size of each minimum scheduling unit is 1 subframe in the time domain and M successive PRBs in the frequency domain, as shown in FIG. 5. It is noted that labels with # in FIG. 5 are not the number of the minimum scheduling unit and are merely used for describing each minimum scheduling unit.

Figure 6:
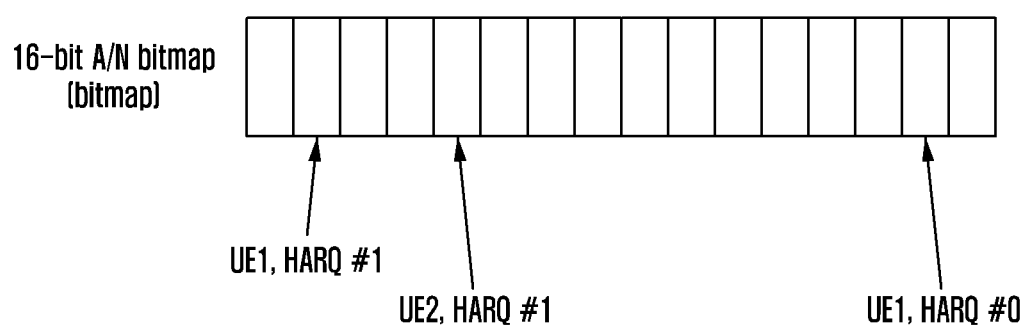
FIG. 6 is a schematic view of a second correspondence between the minimum scheduling units in the time-frequency resource region and the UE/HARQ processes according to Embodiment 5 of the present invention.

Scenario 1:

Referring to FIG. 6, minimum scheduling units are numbered according to the order where the frequency domain is prior to the time domain, that is, the number #00 is the minimum scheduling unit 0, the number #10 is the minimum scheduling unit 1, the number #23 is the minimum scheduling unit 15, and the number #33 is the minimum scheduling unit 16. When the base station sends the A/N feedback of the HARQ process to the UEs by the group DCI, the 16-bit bitmap in the group DCI corresponds to the A/N feedback of the 16 minimum scheduling units.

For example, when the UE1 transmits the HARQ process #1 in the minimum scheduling unit 1 (#10) and transmits the HARQ process #0 in the minimum scheduling unit 15 (#23), and the UE2 transmits the HARQ process #1 in the minimum scheduling unit 4 (#01), the value in the second bit in the bitmap is the A/N feedback result for the HARQ process #1 for the UE1, the value in the fifth bit in the bitmap is the A/N feedback result for the HARQ process #1 for the UE2, and the value in the fifteenth bit in the bitmap is the A/N feedback result for the HARQ process #0 for the UE1. Specifically, NACK may be represented by "0" and ACK may be represented by "1" in the bitmap.

Figure 7:
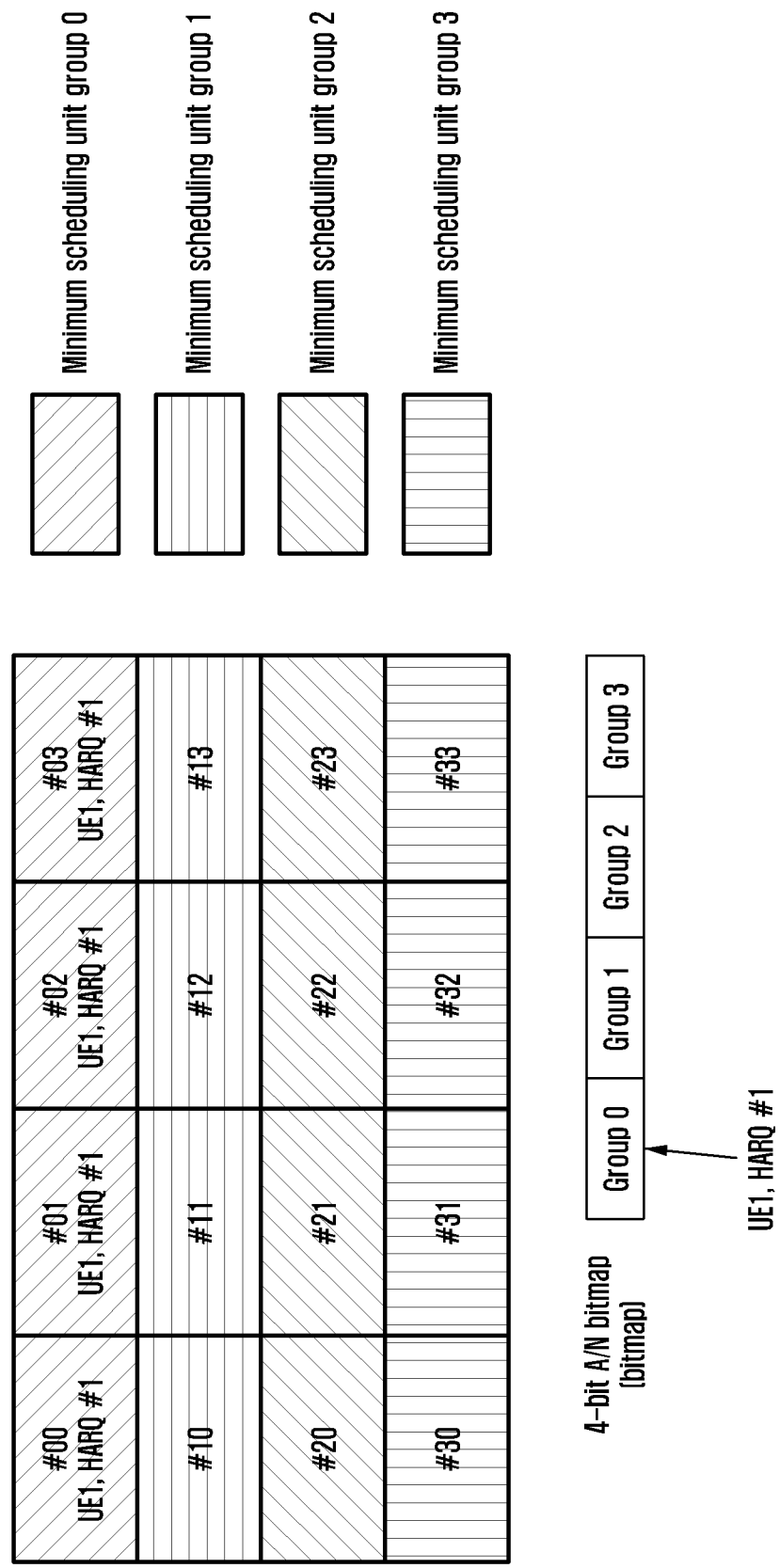
FIG. 7 is a schematic view of a third correspondence between the minimum scheduling units in the time-frequency resource region and the UE/HARQ processes according to Embodiment 5 of the present invention.

Scenario 2:

Referring to FIG. 7, minimum scheduling units are grouped again in this scenario, and minimum scheduling units are divided into group 0/1/2/3 in the way described in the drawing. The UE1/2/3/4 performs PUSCH transmission in the group 0/1/2/3, respectively. When the base station sends the A/N feedback of the HARQ process to the UEs by the group DCI, the 4-bit bitmap in the group DCI corresponds to the A/N feedback of the 4 minimum scheduling units.

Or, the minimum scheduling unit group is not used in this scenario. When the base station sends the A/N feedback of the HARQ process to the UEs by the group DCI, the 16-bit bitmap in the group DCI corresponds to the A/N feedback of the 4 UEs, and feedback is performed in a DCI field corresponding to the minimum scheduling unit in the transmission starting position for each UE. For example, the feedback result for the UE1, 2, 3, 4 is carried at the first, fifth, ninth, thirteenth bits in the bitmap, respectively.

Figure 8:
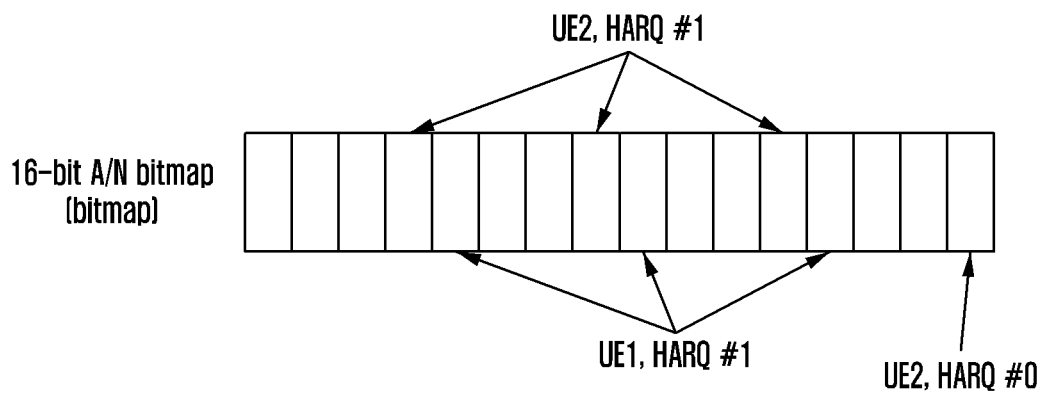
FIG. 8 is a schematic view of a fourth correspondence between the minimum scheduling units in a time-frequency resource region and UE/HARQ processes according to Embodiment 5 of the present invention.

Scenario 3:

Referring to FIG. 8, minimum scheduling units are numbered according to the order where the frequency domain is prior to the time domain, that is, the number #00 is the minimum scheduling unit 0, the number #10 is the minimum scheduling unit 1, the number #23 is the minimum scheduling unit 15, and the number #33 is the minimum scheduling unit 16. When the base station sends the A/N feedback of the HARQ process to the UEs by the group DCI, the 16-bit bitmap in the group DCI corresponds to the A/N feedback of the 16 minimum scheduling units.

For example, when the UE1 transmits the HARQ process #1 in #01/02/03, and the UE2 transmits the HARQ process #1 in #30/31/32 and transmits the HARQ process #0 in #33, the values in the fifth, ninth and thirteenth bits in the bitmap are the A/N feedback result for the HARQ process #1 for the UE1, the values in the fourth, eighth and twelfth bits in the bitmap are the A/N feedback result for the HARQ process #1 for the UE2, and the value in the sixteenth bit in the bitmap is the A/N feedback result for the HARQ process #0 for the UE2. The base station allocates a same value to multiple bits in the bitmap corresponding to a same HARQ process for a same UE. If the UE obtains different values, it is considered as false detection.

Scenario 4:

Minimum scheduling units are numbered according to the order where the frequency domain is prior to the time domain, that is, the number #00 is the minimum scheduling unit 0, the number #10 is the minimum scheduling unit 1, the number #23 is the minimum scheduling unit 15, and the number #33 is the minimum scheduling unit 16. It is assumed that one minimum scheduling unit supports at most 2 codewords which are distinguished by DMRSs. When the base station sends the A/N feedback of the HARQ process to the UEs by the group DCI, the 32-bit bitmap in the group DCI corresponds to the A/N feedback of the 16 minimum scheduling units, as shown in Table 4.

TABLE 4

| | One minimum scheduling unit supports two types of codewords | | | | | | |
|---|---|---|---|---|---|---|---|
| | Bitmap digit | | | | | | |
| | 1 | 2 | 3 | 4 | 5 | 6 | ... |
| Mapping | Minimum scheduling unit 0 | Minimum scheduling unit 0 | Minimum scheduling unit 1 | Minimum scheduling unit 1 | Minimum scheduling unit 2 | Minimum scheduling unit 2 | ... |

TABLE 4-continued

One minimum scheduling unit supports two types of codewords

| Bitmap digit | | | | | | |
|---|---|---|---|---|---|---|
| 1 | 2 | 3 | 4 | 5 | 6 | ... |
| Codeword 1 | Codeword 2 | Codeword 1 | Codeword 2 | Codeword 1 | Codeword 2 | |

For example, when both the UE1 and the UE2 perform transmission in the minimum scheduling unit 1 (#10) and DMRSs for the UE1 and the UE2 correspond to the codeword 1 and the codeword 2 respectively, the value in the third bit in the bitmap is the A/N feedback result for the UE1, and the value in the fourth bit in the bitmap is the A/N feedback result for the UE2.

Scenario 5:

Minimum scheduling units are numbered according to the order where the frequency domain is prior to the time domain, that is, the number #00 is the minimum scheduling unit 0, the number #10 is the minimum scheduling unit 1, the number #23 is the minimum scheduling unit 15, and the number #33 is the minimum scheduling unit 16. It is assumed that one minimum scheduling unit supports at most 8 codewords which are distinguished by DMRSs. When the base station sends the A/N feedback of the HARQ process to the UEs by the group DCI, 16 scheduling fields in the group DCI correspond to the A/N feedback of the 16 minimum scheduling units, and each scheduling field comprises 1-bit A/N and 3-bit codeword number. Information bits in each scheduling field may be successive or non-successive, for example, the A/N for 16 scheduling fields uses a 16-bit bitmap, and the codeword number for 16 scheduling fields uses successive 48 bits.

For example, when the UE1 performs transmission in the minimum scheduling until 1 (#10) and DMRSs correspond to the codeword 011, the A/N value in the second scheduling field is the A/N feedback result for the UE1 and the codeword number field is 011. In the method, when there are multiple UEs performing transmission in a same minimum scheduling unit, feedback for only one UE can be provided every time.

Scenario 6:

Minimum scheduling units are numbered according to the order where the frequency domain is prior to the time domain, that is, the number #00 is the minimum scheduling unit 0, the number #10 is the minimum scheduling unit 1, the number #23 is the minimum scheduling unit 15, and the number #33 is the minimum scheduling unit 16. It is assumed that one minimum scheduling unit supports at most 8 codewords which are distinguished by DMRSs.

When the base station sends the A/N feedback of the HARQ process to the UEs by the group DCI, N scheduling fields in the group DCI correspond to A/N information of HARQ processes for at most N UEs, and each scheduling field comprises 4-bit minimum scheduling unit number and 3-bit codeword number.

When the UEs perform transmission unsuccessfully, the base station will not provide A/N feedback to the UEs; when the transmission of the UEs is received by the base station successfully, the base station carries the ACK feedback information for the UEs in the sent group DCI. If the UEs fail to receive the A/N feedback message sent by the base station during UL transmission, it is considered that the UL transmission is unsuccessful.

For example, when the UE1 performs transmission in the minimum scheduling until 1 (#10) and DMRSs correspond to the codeword 011, if transmission of the UE1 is received successfully when the base station sends the group DCI, the minimum scheduling unit number field 0001 and the codeword number field 011 are carried in any one of N scheduling fields. In the method, when there are multiple UEs performing transmission in a same minimum scheduling unit, feedback for multiple UEs can be provided every time.

Scenario 7:

Minimum scheduling units are numbered according to the order where the frequency domain is prior to the time domain, that is, the number #00 is the minimum scheduling unit 0, the number #10 is the minimum scheduling unit 1, the number #23 is the minimum scheduling unit 15, and the number #33 is the minimum scheduling unit 16. It is assumed that multiple UEs are supported to perform transmission simultaneously in a minimum scheduling unit, and multiple UEs have different RNTIs.

When the base station sends the A/N feedback of the HARQ process to the UEs by the group DCI, the UEs decode the DCI by their own RNTIs, and it is considered that a corresponding DCI field carries the A/N feedback sent to them only when the DCI can be decoded.

For example, when both the UE1 and the UE2 perform transmission in the minimum scheduling unit 0 (#00), if the UE1 decodes the DCI successfully by RNTIs, it is considered that the value in the first bit in the 16-bit bitmap in the DCI is the A/N feedback result for the UE1; if the UE2 decodes the DCI unsuccessfully by RNTIs, it is considered that there is no A/N feedback result for the UE2 in the DCI. In the method, when there are multiple UEs performing transmission in a same minimum scheduling unit, feedback for only one UE can be provided every time.

Scenario 8:

The base station configures one number when configuring group-RNTIs for the UEs, and the UEs acquire scheduling content for the UEs themselves from $N^{th}$ scheduling field of the DCI which can be decoded by the group-RNTIs, according to the number N.

Embodiment 6

Figure 9:
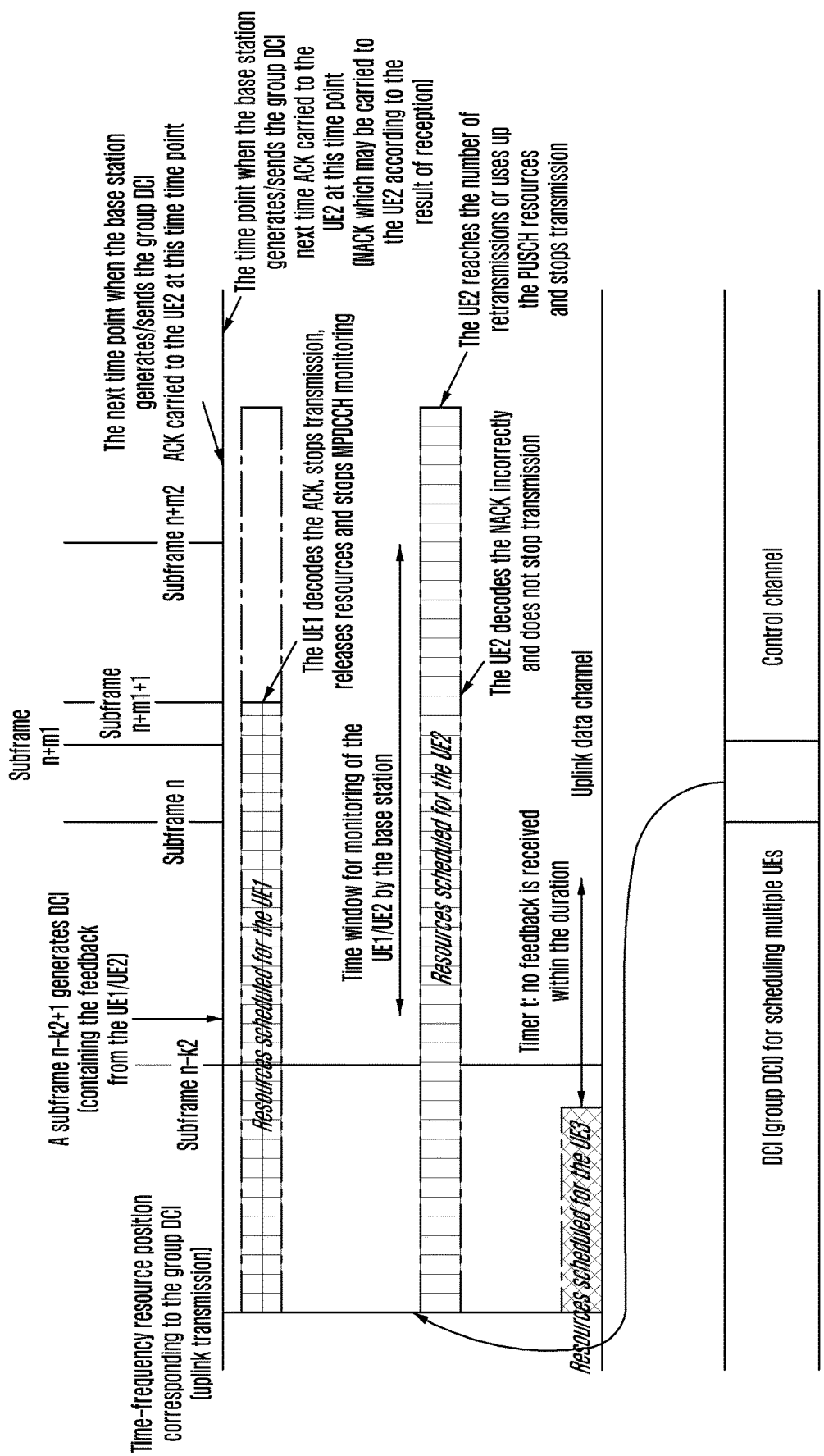
FIG. 9 is a schematic view of using HARQ-ACK to schedule ETSs by the DCI according to Embodiment 6 of the present invention.

In the MTC scenario, the group DCI carries the A/N feedback as the ETS, as shown in FIG. 9.

The base station generates a piece of group DCI in a subframe n−k2+1 and sends the group DCI in a subframe [n, n+m1]. An ACK message sent to the UE1 and the UE2 is carried in the group DCI.

The UE1 receives the group DCI sent by the base station and decodes the ACK message sent to the UE1 itself. The PUSCH transmission is ended in a subframe n+m1+1, the remaining part of PUSCH resources scheduled to the UE1 are released, and the PDCCH monitoring is ended.

The UE2 receives the group DCI sent by the base station and incorrectly decodes the NACK message sent to the UE2 itself. The PDCCH monitoring is continued, and the PUSCH transmission is continued or the PUSCH retransmission is triggered by the NACK.

The base station keeps monitoring of all UEs scheduled by the group DCI within a time window subframe [n−k2+1, n+m2] (m2>m1+1). After a subframe n+m1+1, PUSCH transmission by the UE1 will not be received in time-frequency resources scheduled for the UE1, so it is considered that the UE1 receives the group DCI correctly and the remaining resources scheduled for the UE1 are re-scheduled for other UEs for UL transmission. After the subframe n+m1+1, PUSCH transmission by the UE2 is still received in time-frequency resources scheduled for the UE2, so it is considered that the UE2 receives the group DCI incorrectly. The base station sends a piece of single DCI carrying the ACK message to the UE2; or, the base station carries, when generating the group DCI next time, the ACK message sent to the UE2 again in the group DCI, since the UE2 still performs PUSCH transmission in time-frequency resources corresponding to the DCI; or, the base station will not carry, when generating the group DCI next time, the ACK message sent to the UE2 or will carry the NACK message sent to the UE2, since the UE2 does not perform PUSCH transmission in time-frequency resources corresponding to the DCI or since the PUSCH transmission by the UE2 is finished in the time-frequency resources.

The UE3 starts a timer with a duration of t after finishing the UL transmission, and keeps monitoring of the PDCCH. If the feedback message sent by the base station is not received after the timer expires, the UE3 uses the default feedback state. If the default feedback state is ACK, the UE3 finishes the UL transmission. If the default feedback state is NACK, the UE3 performs a limited number of UL retransmission attempts or a limited number of sending UL retransmission requests.

Embodiment 7

The group DCI is transmitted in the CSS defined in the current MTC and distinguished from other DCI in the same search space by RNTIs.

Or, a group CSS special for the group DCI is newly defined in the MTC. If other DCI used for scheduling multiple UEs are supported subsequently in the group CSS, DCIs with different purposes are distinguished by RNTIs.

Or, the group DCI is transmitted in the USS defined in the current MTC. Specifically, for a given piece of group DCI, the group DCI is transmitted in the USS of all or some of UEs associated with the DCI; in addition, when the group DCI transmitted in a subframe [n1, n2] indicates the A/N feedback for the UEs transmitting the PUSCH in a subframe [n1−k1, n1−k2], if the USS configuration range for a certain UE does not comprise [n1, n2] or any subframe n, where n1<=n<=n2, the A/N feedback for the UE should be fed back in another piece of DCI according with the transmission timing; if there is no suitable n and k by which the DCI accords with the transmission timing, the feedback can be performed by a way of indicating a single UE/HARQ process in one piece of DCI, or the A/N feedback for the UE is cancelled.

Wherein, the method of newly defining a group CSS special for the group DCI in the MTC specifically comprises:

introducing a newly-defined search space configured to listen to the group DCI by the UEs. The newly-defined search space is configured to a set of UEs by the base station. For all UEs in the set, configuration information of the newly-defined search space for the used group DCI is identical. There may be one or more UEs in the set. When there is one UE in the set, the search space is a USS; and when there are multiple UEs in the set, the search space is a CSS for the set of UEs.

The UEs obtain configuration information of a newly-defined search space additionally by a higher-layer signaling or broadcast message when acquiring configuration information of the search space from the base station. The time-domain position for the newly-defined search space is different from the time-domain position for other UE-specific Search Spaces (USSs) and/or Common Search Spaces (CSSs) configured for the UEs by the base station; or, there is complete or partial superposition between the time-domain positions.

The method for configuring time-domain resources for the newly-defined search space utilizes the legacy mechanism, with the following modifications to the method for calculating the starting subframe: the starting subframe is $k'=k+\alpha T$, where k is the starting subframe of a search space calculated according to the legacy mechanism in the MTC (in the MTC, the legacy mechanism is $k=k_b$, where $k_b$ is the $b^{th}$ downlink low coverage/coverage enhancement subframe successively starting from a subframe $k_0$, and $k_0$ and b are preset parameters or parameters configured by a higher layer), T is cycles of the search space, and α is a base station configuration parameter which is provided additionally in the system.

Figure 10:
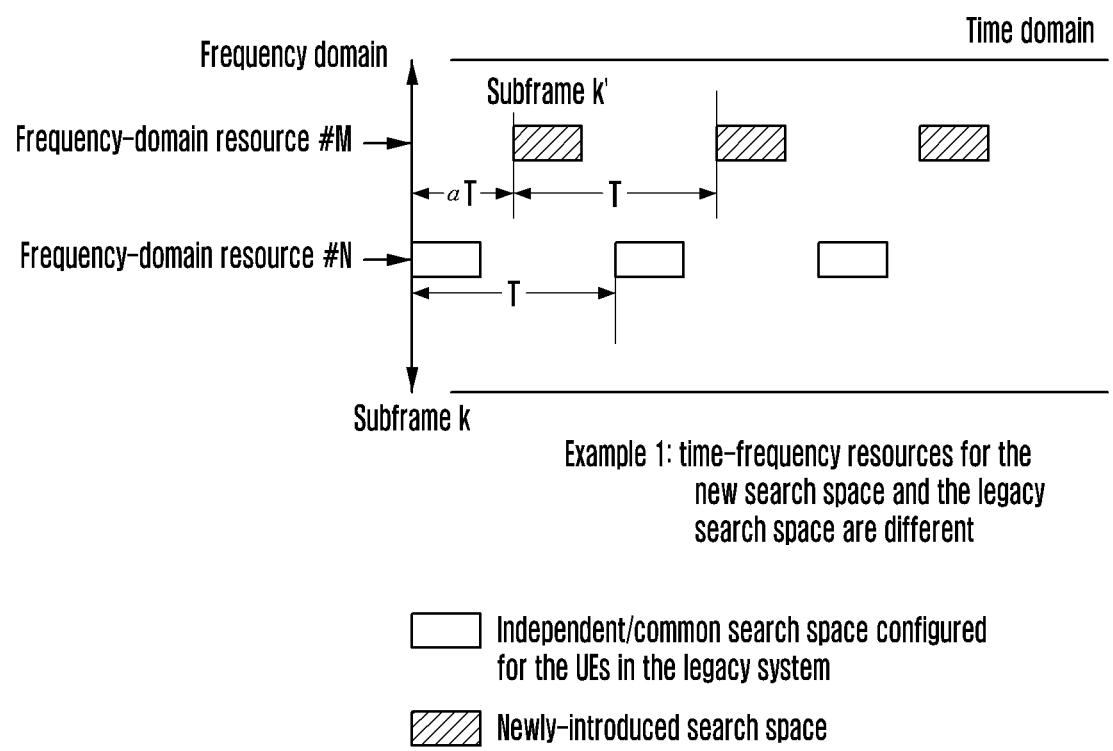
FIG. 10 is a schematic view of a first example of configuration of a newly-defined search space according to Embodiment 7 of the present invention.
Figure 11:
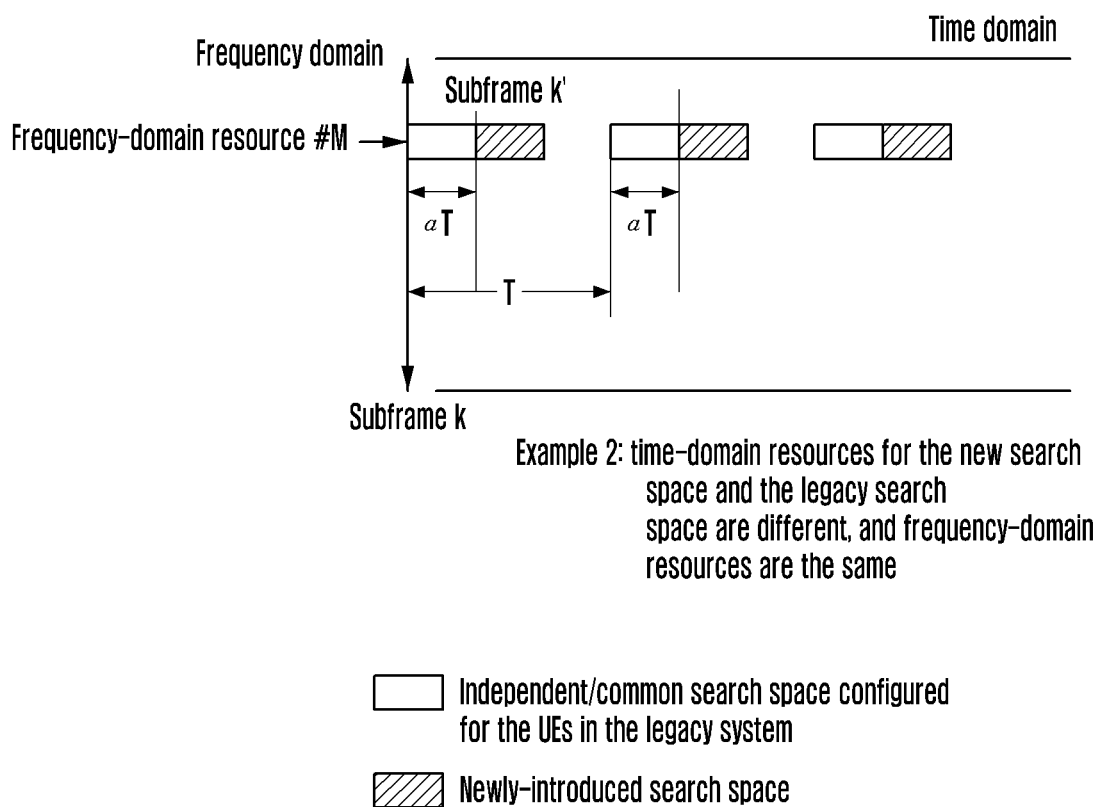
FIG. 11 is a schematic view of a second example of the configuration of the newly-defined search space according to Embodiment 7 of the present invention.

In the scenario where the time-domain position for the newly-defined search space is different from the time-domain position for other search spaces for the UEs, the frequency-domain position for the newly-defined search space is the same as or different from the frequency-domain position for other search spaces for the UEs. In this scenario, when the legacy search space for the UEs and the newly-defined search space are configured with the same starting subframe parameter k, $\alpha T$ is greater than or equal to the time-domain length of other legacy search spaces for the UEs. Referring to the example 1 in FIG. 10 and the example 2 in FIG. 11, in the example 1, the legacy search space for the UEs and the newly-defined search space use different frequency-domain resources, and $\alpha T$ is greater than the time-domain length of other legacy search spaces for the UEs; and in the example 2, the legacy search space for the UEs and the newly-defined search space use the same frequency-domain resources, and $\alpha T$ is equal to the time-domain length of other legacy search spaces for the UEs.

Figure 12:
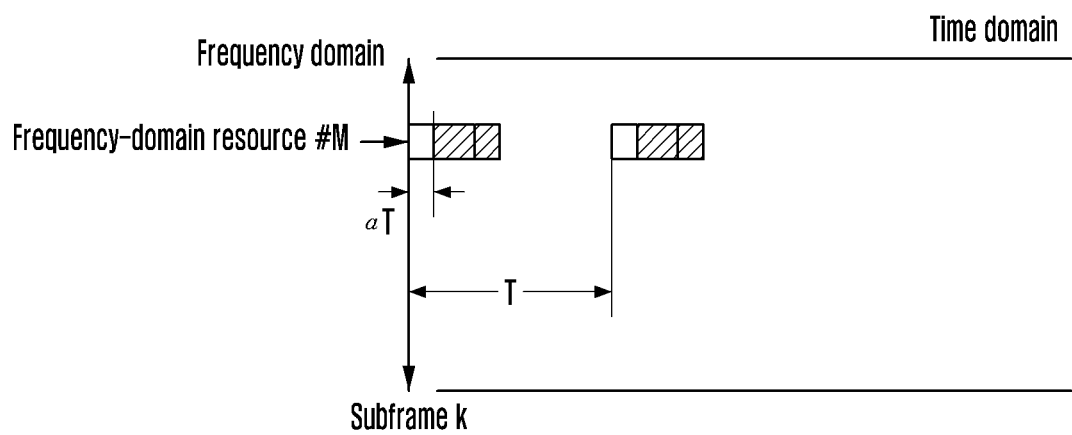
FIG. 12 is a schematic view of a third example of the configuration of the newly-defined search space according to Embodiment 7 of the present invention.
Figure 13:
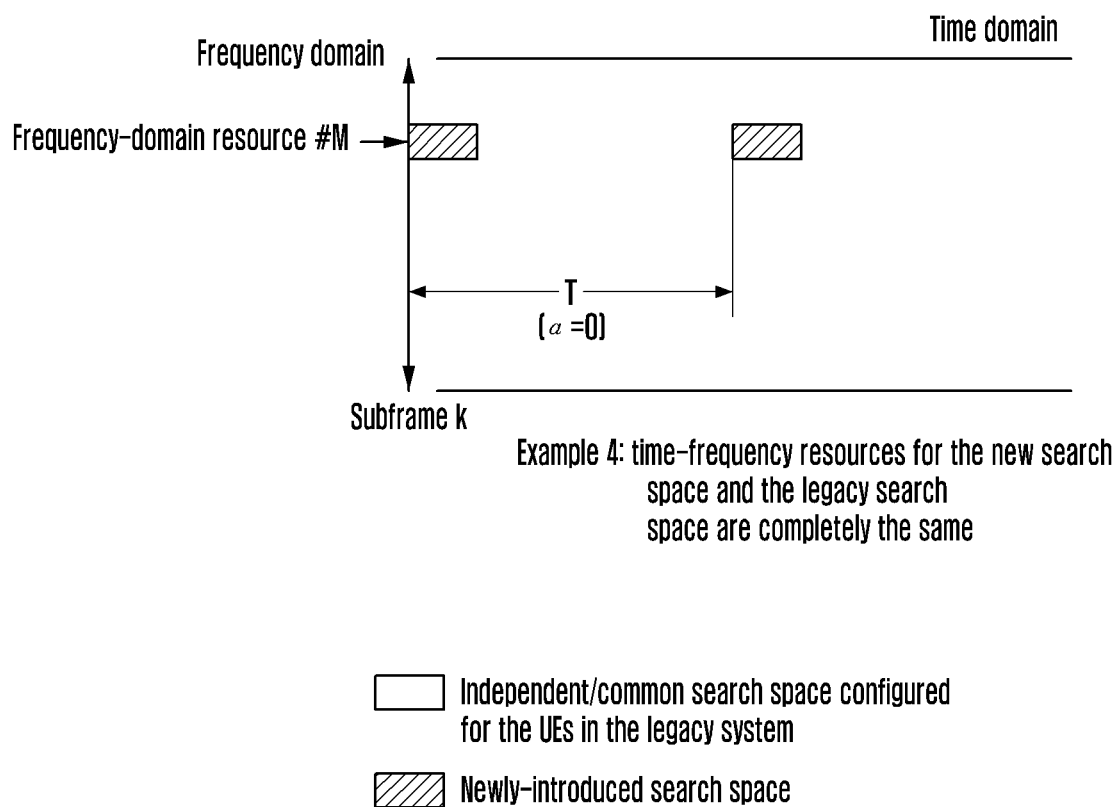
FIG. 13 is a schematic view of a fourth example of the configuration of the newly-defined search space according to Embodiment 7 of the present invention.

In the scenario where there is superposition between the time-domain position for the newly-defined search space and the time-domain position for other search spaces for the UEs, the frequency-domain position for the newly-defined search space is the same as the frequency-domain position for other search spaces for the UEs. In this scenario, when the legacy search space for the UEs and the newly-defined search space are configured with the same starting subframe parameter k, $\alpha T$ is greater than or equal to 0 and is less than the time-domain length of other legacy search spaces for the UEs. Referring to the example 3 in FIG. 12 and the example 4 in FIG. 13, in the example 3, $\alpha T$ is less than the time-domain length of other legacy search spaces for the UEs, and time-domain resources of the legacy search space for the UEs and the newly-defined search space are partially superposed and they use the same frequency-domain resources; and in the example 4, $\alpha T$ is equal to 0, and time-domain and frequency-domain resources in the legacy search space for the UEs and the newly-defined search space are completely superposed.

Or, in the scenario where there is superposition between the time-domain position for the newly-defined search space and the time-domain position for other search spaces for the UEs, the frequency-domain position for the newly-defined search space is adjacent to the frequency-domain position for other search spaces for the UEs in the frequency domain.

Figure 14:
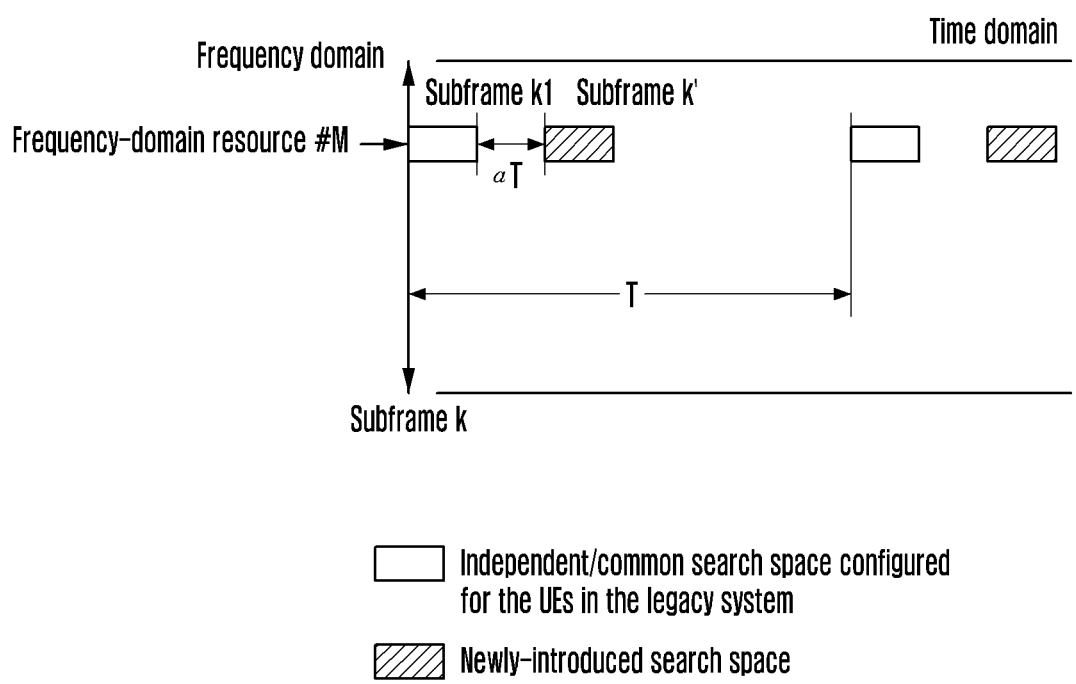
FIG. 14 is a schematic view of a fifth example of the configuration of the newly-defined search space according to Embodiment 7 of the present invention.

In addition, in the scenario where the time-domain position for the newly-defined search space is different from the time-domain position for other search spaces for the UEs, another method for calculating the starting subframe of the newly-defined search space is used: referring to FIG. 14, the starting subframe is k'=k1+αT, where k1 is the first subframe or the first downlink valid subframe after the completion of the legacy search space for the UEs, T is cycles of the search space, α is a base station configuration parameter which is provided additionally in the system, and α is greater than or equal to 0.

Figure 15:
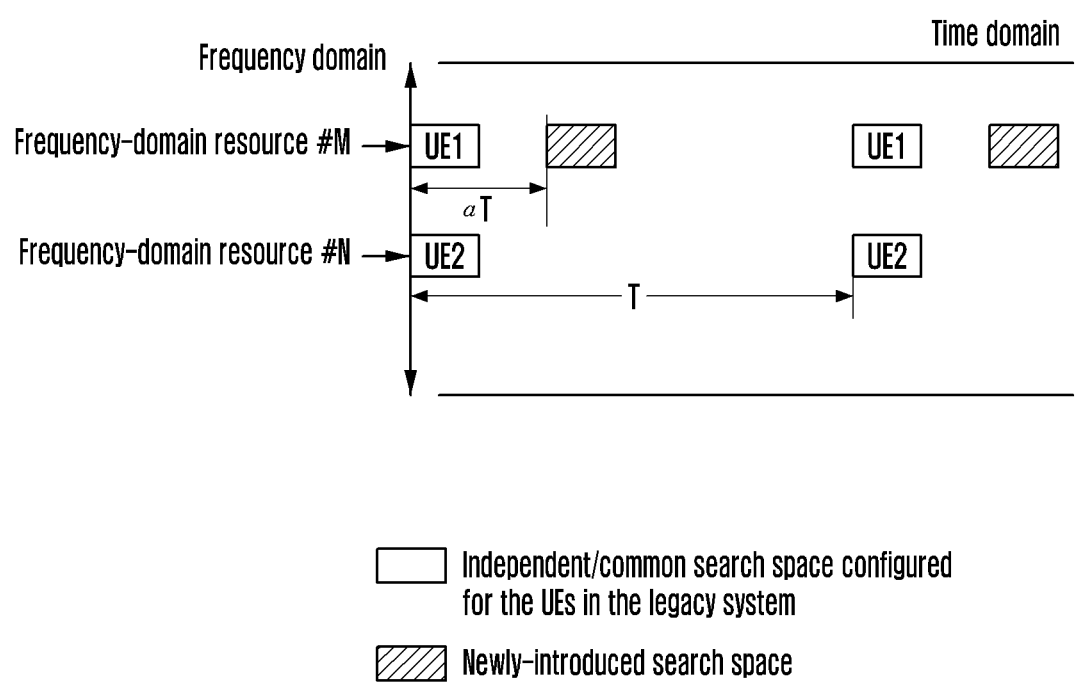
FIG. 15 is a schematic view of a sixth example of the configuration of the newly-defined search space according to Embodiment 7 of the present invention.

When the newly-defined search space is configured, as a CSS, for a set of UEs containing multiple UEs, a search space resource allocation example provided in FIG. 15 is referred to, wherein the newly-defined CSS is configured in the frequency-domain resource #M, and the starting subframe is k'=k+αT; the legacy search space for the UE1 is configured in the frequency-domain resource #M, the starting subframe is k, and time-domain resources for the newly-defined CSS and the legacy search space for the UE1 are different and frequency-domain resources thereof are the same; and the legacy search space for the UE2 is configured in the frequency-domain resource #N, the starting subframe is k, and both time-domain and frequency-domain resources for the newly-defined CSS and the legacy search space for the UE2 are different.

In the newly-defined search space introduced in the system, Downlink Control Information (DCI) sent by the base station comprises the group DCI shared by a set of UEs configured with the newly-defined search space and may comprise DCI special for the UEs in the set of UEs. The length of the group DCI in the search space may be equal to the length of the DCI in the legacy USS and/or CSS in the system, or, the length of the DCI is less than the length of the DCI in the legacy USS and/or CSS.

The UEs keep monitoring of all USSs and CSSs configured by the base station, decide whether the received DCI is the group DCI by the type of the search space and/or the position of the DCI in the search space and/or RNTIs used by the DCI, and may determine scheduling functions specifically carried in the received DCI, for example, the A/N feedback.

Wherein, in the method for newly defining a group CSS special for group DCI in the MTC, the UEs monitoring of the newly-defined search space configured by the base station comprises: by the UEs, acquiring configuration information of the newly-defined search space from the base station, and starting monitoring of the search space when the condition for activating the monitoring is satisfied. The condition for activating the monitoring comprises any combinations of the following: the UE is performing on-going PUSCH transmission or on-going PDCCH monitoring at present; in scheduling information acquired from the base station, the number of repetitions of the on-going PUSCH transmission by the UE exceeds a threshold K1; and the number of repetitions of the on-going PUSCH transmission by the UE, which has been sent, exceeds a threshold K2. For example, when K1=0 and K2=0, the UEs always listen to the newly-defined search space, that is, the monitoring covers the resource position of each cycle of the search space.

When there is collision between the configured search spaces (a CSS, a group CSS and a USS), the UEs determine the type of the search space listened currently in a priority order predefined/configured by a higher layer, or perform blind decoding on the DCI received in the collision position by all possible RNTIs. Wherein, determining the type of the search space listened currently in a priority order predefined/configured by a higher layer by the UEs comprises: determining the resource position for the search space listened currently according to the priority predefined/configured by the higher layer by the UEs, when there is collision between the configured resource position for the search space and the UEs cannot listen to the resource position for all search spaces simultaneously.

When there is collision between the configured search space and other channels (for example, PDSCHs), the UEs listen to or transmit a channel or search space with a higher priority according to priority of the search space and other channels acquired from the base station, and give up monitoring of or transmitting a channel or search space with a lower priority. For example, the priority of the PDSCH configured for the UEs by the base station is higher than the priority of the newly-defined search space. Meanwhile, when it is needed to receive the PDSCH and listen to the newly-defined search space simultaneously, the UEs give up monitoring of the search space and select to receive the PDSCH.

The methods in this embodiment may be utilized in the NB-IoT. The method for calculating the starting subframe will be described below. Similarly, the starting subframe is k'=k+αT, where k is the starting subframe of a search space calculated according to the legacy mechanism in the NB-IoT (in the NB-IoT, the legacy mechanism is k=$k_b$, where $k_b$ is the $b^{th}$ NB-IoT downlink subframe successively starting from a subframe $k_0$, and $k_0$ satisfies the condition that $(10n_f+\lfloor n_s/2 \rfloor) \mod T=\lfloor \alpha_{offset} \cdot T \rfloor$, where $n_f$ is the frame number of k0, $n_s$ is the subframe number of k0, and $\alpha_{offset}$ and b are preset parameters or parameters configured by a higher layer), T is cycles of the search space (which is obtained by multiplying a parameter Rmax configured by the higher layer with G), and α is a base station configuration parameter which is provided additionally in the system.

Embodiment 8

In typical scenarios such as grant-free uplink transmission, the base station configures successive UL time-frequency resources for several UEs to perform contention-based UL transmission. In the grant-free scenario, different users can use different codewords, pilot signals, Multiple Access (MA) signatures to perform transmission in the same time-frequency resources.

In a specific example, the base station put multiple UEs into a group. In the group, the UE1, the UE2 and the UE3 select time-frequency resources for transmission of multiple HARQ processes by themselves, specifically as shown in FIG. 16.

Figure 16:
FIG. 16 is a schematic view of applying the method for receiving scheduling information to a grant-free communication scenario according to Embodiment 7 of the present invention.

Referring to FIG. 16, the UE1/2/3 starts a timer1 for the A/N feedback when finishing the transmission of the HARQ process 1 and continues to transmit the HARQ process 2. The base station sends the group DCI carrying the A/N information to the group of UEs before the expiration of the timer1, and the UE1/2/3 obtains the HARQ 1 feedback sent by the base station in 3 corresponding bits in the bitmap for the A/N, respectively.

The UE1/2/3 starts a timer2 for the A/N feedback after finishing the transmission of the HARQ process 2, and determines subsequent actions according to the feedback result for the HARQ1. The UE1 receives the ACK feedback and stops subsequent transmission; the UE2 receives the ACK feedback and sends new data in subsequent resources by the HARQ1; and the UE3 receives the NACK feedback and performs retransmission in the subsequent resources by the HARQ1. Meanwhile, the base station sends the group DCI carrying the A/N information to the group of UEs before the expiration of the timer2, and the UE1/2/3 obtains the HARQ 2 feedback sent by the base station in 3 corresponding bits in the bitmap for the A/N, respectively.

In this scenario, there may be other UEs performing transmission in resources which are the same as the UE1/2/3. For example, the base station can configure different group-RNTIs and same successive time-frequency resources for the UE4 and the UE1. When the UE4 selects the same resources as the UE1 in the successive time-frequency resources, the feedback for the UE4 can be distinguished from the UE1 by group-RNTIs. For example, the base station can configure same group-RNTIs and same successive time-frequency resources for the UE5 and the UE1. When the UE5 selects the same resources as the UE1 in the successive time-frequency resources, if the UE5 and the UE1 use different codewords, or different reference signals such as different DMRS sequences or different DMRS time-frequency resource positions, or different MA signatures, the base station can distinguish transmission of the UE5 from the UE1, and the feedback from the base station for the UE5 can be distinguished from the feedback for the UE1 by directly or indirectly carrying corresponding codewords/reference signals/MA signatures in the DCI.

Figure 17:
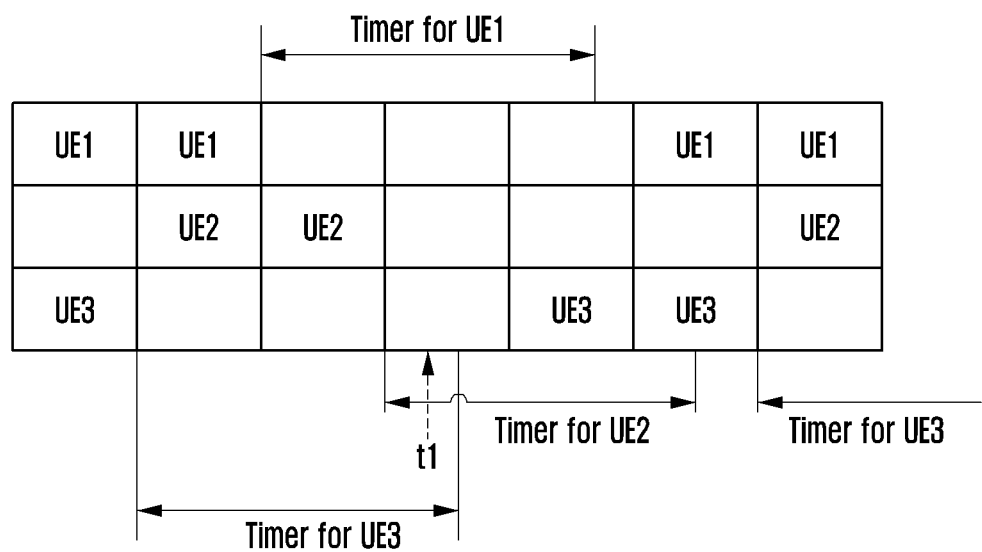
FIG. 17 is a schematic view of applying the method for receiving scheduling information to a Semi-Persistently Scheduling (SPS) scenario according to Embodiment 8 of the present invention.

Referring to FIG. 17, in typical scenarios such as SPS (Semi-Persistent Scheduling), the base station regularly allocates successive resources to one UE for UL transmission. In a specific example, the base station performs SPS on the UE1, the UE2 and the UE3, which is specifically described in the below drawing. In the drawing, the starting position of the SPS cycle for the UE1/2/3 and/or the transmission starting position within each SPS cycle is not aligned. Therefore, there is no fixed feedback time point. The base station just needs to perform A/N feedback respectively or together according to the real-time received state for the UE1/2/3.

As shown in FIG. 17, the UE1/2/3 starts a timer-UE1/2/3 for the A/N feedback when finishing SPS transmission within a cycle and starts SPS transmission again within the next cycle. The base station sends the group DCI carrying the A/N information to the UE1/2/3 at a time point t1, and the UE1/2/3 obtains the SPS feedback sent by the base station in 3 corresponding bits in the bitmap for the A/N, respectively. The SPS feedback is considered as feedback content for the transmission in the last SPS cycle.

In this scenario, there may be other UEs performing transmission in resources which are the same as the UE1/2/3. Similarly, the UEs can be distinguished by code division modes such as DMRSs or group-RNTIs.

Figure 18:
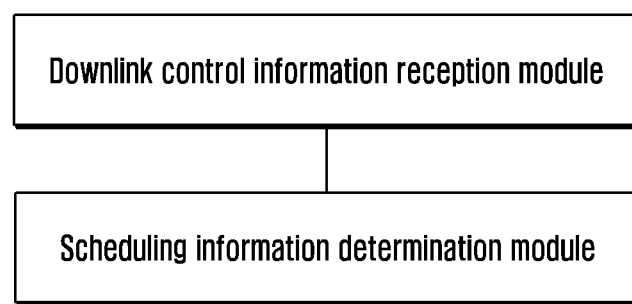
FIG. 18 is a block diagram of modules of a user equipment used in the method for receiving scheduling information according to the present invention.

Referring to FIG. 18, a user equipment used for receiving scheduling information according to the embodiments of the present invention comprises:

a downlink control information acquisition module configured to acquire Downlink Control Information (DCI); and a scheduling information determination module configured to determine, according to a mapping relationship between configured transmission resources used for a Physical Uplink Shared Channel (PUSCH) and scheduling information in the DCI, scheduling information corresponding to the PUSCH in the DCI.

The operations of the downlink control information acquisition module and the scheduling information determination module correspond to the steps 101 and 102 in the method for receiving scheduling information according to the embodiments of the present invention, respectively, and will not be described here.

It can be known from the detailed description of the embodiments of the present invention that, compared with the prior art, the embodiments of the present invention have at least the following beneficial technical effects:

1. Scheduling information in DCI is determined by a mapping relationship between configured transmission resources used for transmitting a PUSCH by a UE and the scheduling information in the DCI, so that a base station can schedule all UEs for which there is a mapping relationship between PUSCH configured transmission resources and the scheduling information in the DCI by sending only one piece of DCI. The scheduling overhead is reduced, the resource waste is reduced, and the efficiency of scheduling terminals by a communication system is significantly improved.

2. The base station schedules UEs by two types of DCI, i.e., DCI for which a piece of DCI carries scheduling information for one UE and DCI for which a piece of DCI carries scheduling information for multiple UEs. Therefore, the technical solutions of the embodiments of the present invention are highly flexible and compatible.

3. A relation between time-frequency resource positions used for transmitting the PUSCH by the UE and a specific time-frequency resource region is mapped to the DCI to determine the scheduling information in the DCI, and the time-frequency resource region used for determining the scheduling information is determined directly by the time-frequency resource positions for the received DCI. The spare signaling overhead of transmitting the time-frequency resource region is reduced and the transmission efficiency is improved.

4. The specific time-frequency resource region is divided and mapped to a scheduling field in the DCI. One division unit may correspond to multiple UEs, or one UE may correspond to multiple division units. It is highly flexible and extendable.

5. Corresponding operations may be executed within a preset time window or at a preset time point according to ACK/NACK after the scheduling information is acquired. It is highly flexible.

6. It is applicable to typical scenarios such as grant-free and SPS. In these scenarios, the base station configures a same resource pool for multiple UEs and the UEs select transmission resources in a competitive way. Scheduling ways according to the embodiments of the present invention are more efficient and reliable in these scenarios.

The next generation of machine type communication systems provides higher requirements for the coverage enhancement. In the next eMTC Release 15 standardization project, the introduction of scheduling of partial PRBs supporting the PUSCH is proposed, that is, the PUSCH only needs to be transmitted on several subcarriers in one PRB, so as to further increase the uplink (UL) transmit power spectral density and enhance the coverage capability.

The embodiment of the present invention is directed to the eMTC technology, and aims to further improve the coverage capability of the eMTC and support subcarrier level scheduling. The present invention relates to the design of downlink control information (DCI) and the design of user behavior flow.

Figure 19:
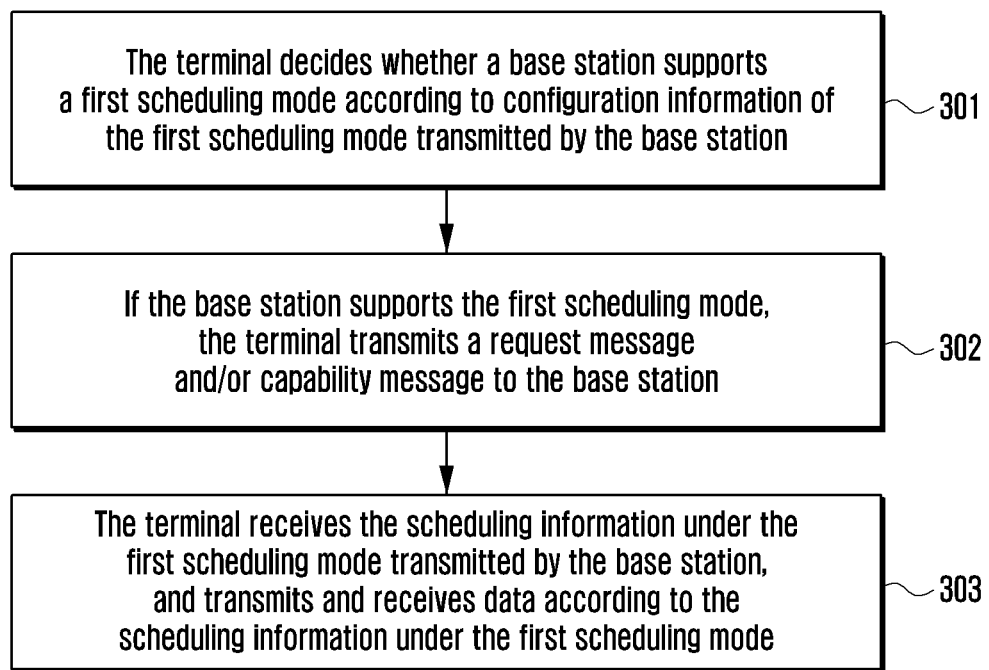
FIG. 19 is a schematic flowchart of a method for transmitting data by a terminal according to an embodiment of the present invention.

FIG. 19 is a schematic flowchart of a method for transmitting data according to an embodiment of the present invention.

Step 301: The terminal decides whether the base station supports the first scheduling mode according to configuration information of a first scheduling mode transmitted by the base station.

Wherein, the first scheduling mode and the second scheduling mode employs different frequency-domain scheduling granularities, and the frequency-domain scheduling granularity employed by the first scheduling mode is less than the frequency-domain scheduling granularity employed by the second scheduling mode.

Wherein, the frequency-domain scheduling granularity employed by the first scheduling mode is a subcarrier level scheduling.

Step 302: if the base station supports the first scheduling mode, the terminal transmits a request message and/or capability message to the base station.

Wherein, the request message is used for requesting the base station to configure a first scheduling mode, wherein, the capability message is used for reporting the scheduling mode supported by the terminal.

Step 303: the terminal receives the scheduling information under the first scheduling mode transmitted by the base station, and transmits or receives data according to the scheduling information under the first scheduling mode.

Figure 20:
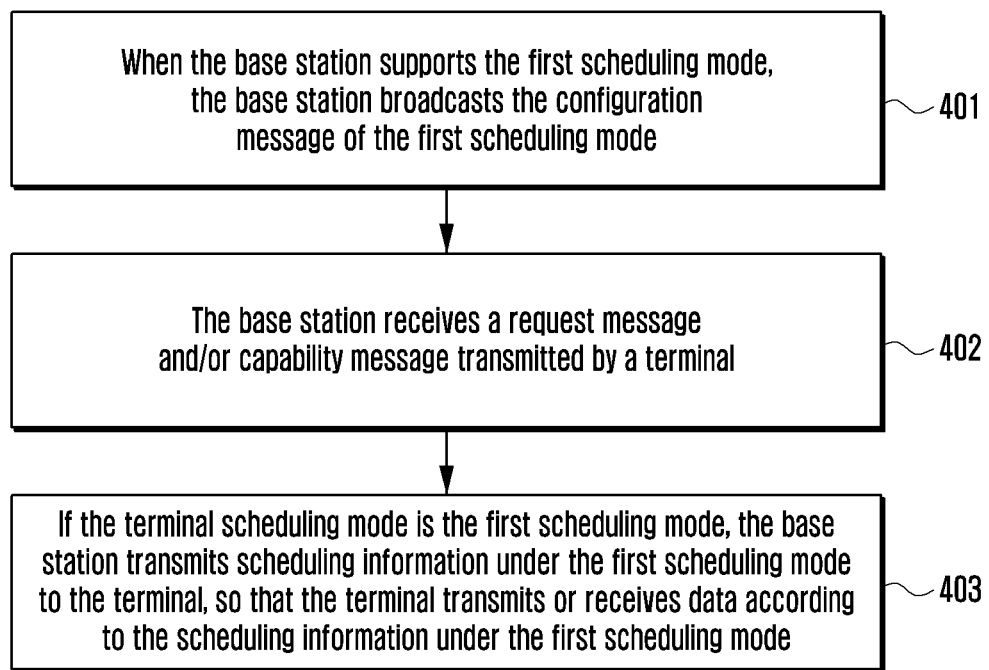
FIG. 20 is a schematic flowchart of a method for transmitting data by a base station according to an embodiment of the present invention.

FIG. 20 is a schematic flowchart of a method for transmitting data according to another embodiment of the present invention.

Step 401: When the base station supports the first scheduling mode, the base station broadcasts the configuration message of the first scheduling mode.

Wherein, the first scheduling mode and the second scheduling mode employ different frequency domain scheduling granularities, and the frequency domain scheduling granularity employed by the first scheduling mode is smaller than the frequency domain scheduling granularity employed by the second scheduling mode.

Wherein, the frequency scheduling granularity employed by the first scheduling mode is a subcarrier level scheduling.

Step 402: The base station receives a request message and/or capability message transmitted by a terminal.

Wherein, the request message is used for requesting the base station to configure a first scheduling mode for the terminal, wherein, the capability message is used for reporting the scheduling mode supported by the terminal.

Step 403: If the scheduling mode of the terminal is the first scheduling mode, the base station transmits scheduling information under the first scheduling mode to the terminal, so that the terminal transmits or receives data according to the scheduling information under the first scheduling mode.

Figure 21:
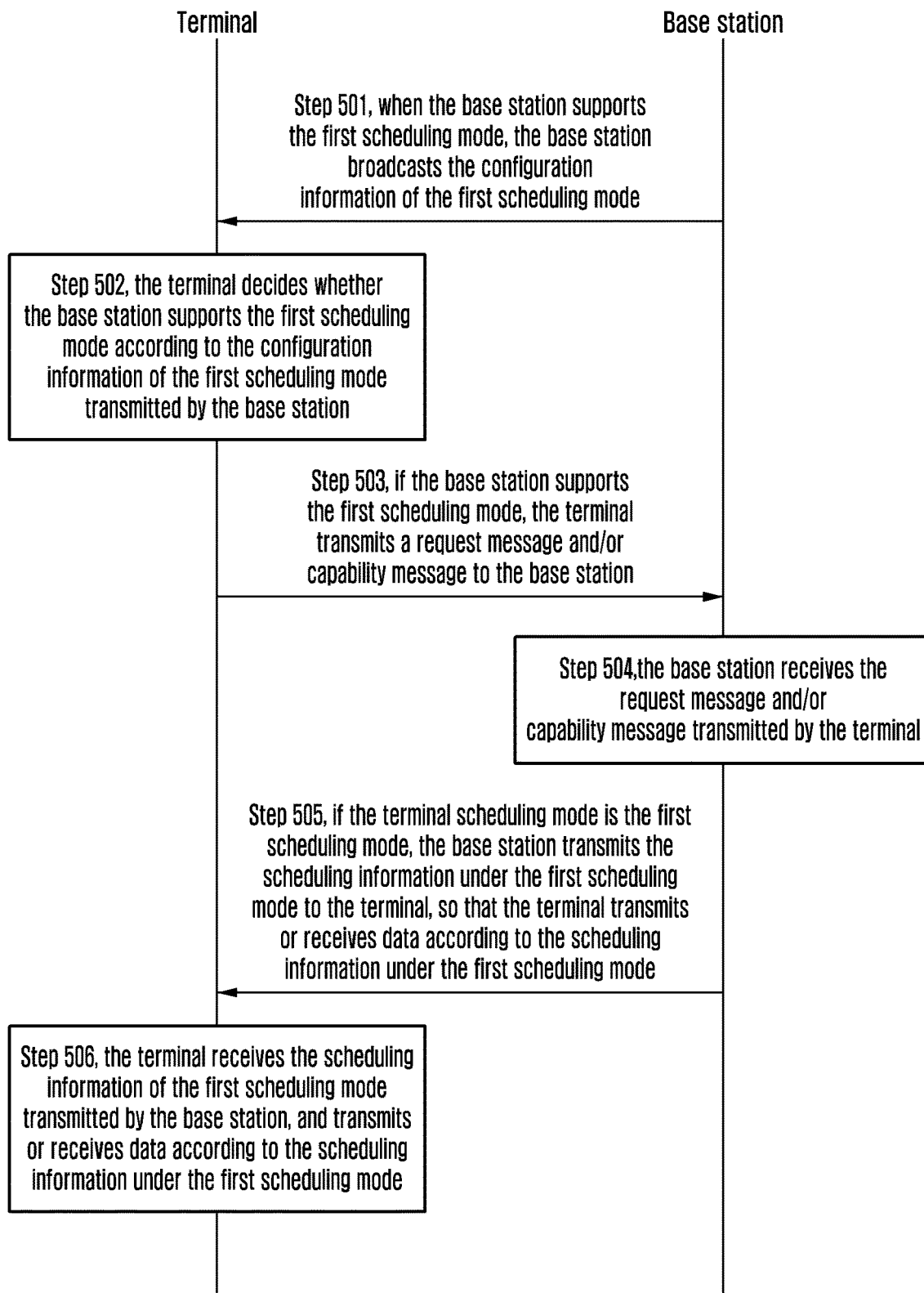
FIG. 21 is a schematic diagram of an interactive flow of data transmission performed by a base station and a terminal according to an embodiment of the present invention.

FIG. 21 is an interactive flowchart of data transmission between a terminal and a base station according to an embodiment of the present invention.

Step 501: When the base station supports the first scheduling mode, the base station broadcasts the configuration information of the first scheduling mode; Step 502: The terminal decides whether the base station supports the first scheduling mode according to the configuration information of the first scheduling mode transmitted by the base station; Step 503: If the base station supports the first scheduling mode, the terminal transmits a request message and/or capability message to the base station, wherein, the request message is used for requesting the base station to configure a first scheduling mode for the terminal, and the capability message is used for reporting the scheduling mode supported by the terminal; Step 504: The base station receives the request message and/or capability message transmitted by the terminal, wherein, the request message is used for requesting the base station to configure a first scheduling mode for the terminal, and, the capability message is used for reporting the scheduling mode supported by the terminal; Step 505: If the terminal scheduling mode is the first scheduling mode, the base station transmits the scheduling information under the first scheduling mode to the terminal, so that the terminal transmits or receives data according to the scheduling information under the first scheduling mode; Step 506, the terminal receives the scheduling information under the first scheduling mode transmitted by the base station, and transmits or receives data according to the scheduling information under the first scheduling mode.

Wherein, the frequency-domain scheduling granularity employed by the first scheduling mode is a subcarrier level scheduling.

Further, the scheduling mode includes the coverage enhancement mode (CE mode).

Further, the configuration information of the first scheduling mode includes:

an indication message that the base station supports the first scheduling mode; and/or a physical random access channel (PRACH) coverage enhancement level (CE level) configuration message corresponding to the first scheduling mode;

wherein, the PRACH CE level configuration message corresponding to the first scheduling mode includes at least one of the following:

PRACH transmission repetition number, Preamble index, PRACH frequency modulation offset, Machine Type Communication Physical Downlink control channel (MPDCCH) search space offset, and Reference Signal Receiving power (RSRP) threshold corresponding to PRACH CE level.

Further, before step 505, the method further includes: the terminal receives an acknowledgement (ACk) message transmitted by the base station which is used for notifying the terminal, and then schedules by employing the first scheduling mode; and/or, the terminal receives the scheduling mode configuration information transmitted by the base station, and determines the scheduling mode subsequently employed according to the scheduling mode configuration information.

Further, step 506 includes: the terminal monitors downlink control information (DCI) under the first scheduling mode transmitted by the base station, wherein, the DCI includes DCI in a first format and DCI in a second format, wherein, the DCI in the first format is used for carrying UL grant information, and the DCI in the second format is used for carrying the DL grant information; the terminal performs UL transmission according to the DCI in the first format, and/or the terminal performs DL reception according to the DCI in the second format.

Further, in step 503, the step that the terminal transmits a configuration request message and/or capability message to the base station includes: the terminal determines a PRACH CE level; if the scheduling mode corresponding to the PRACH CE level is the first scheduling mode, the terminal carries the configuration request message and/or the capability message in the random access request message transmitted to the base station; if the scheduling mode corresponding to the PRACH CE level includes at least two scheduling modes, the connection setup request message transmitted to the base station carries the configuration request message and/or capability message.

Wherein, the at least two scheduling modes includes the first scheduling mode.

Specifically, the terminal determines the PRACH CE level. If the scheduling mode corresponding to the PRACH CE level is the first scheduling mode, the step of carrying the configuration request message and/or the capability message in the random access request message transmitted to the base station includes: the terminal determines the PRACH CE level of the first scheduling mode and the second scheduling mode in the at least two scheduling modes according to the DL measurement result, receives and reads the content of the random access response (RAR) message according to the second CE mode, wherein, at least one PRACH CE level of the second CE mode is the same as the PRACH CE level of the first CE mode; the terminal transmits a connection setup request message to the base station, and carries the configuration request message and/or the capability message in the random access request message transmitted to the base station.

Specifically, the terminal determines the PRACH CE level. If the scheduling mode corresponding to the PRACH CE level includes at least two scheduling modes, the step of the step of carrying the configuration request message and/or the capability message in the random access request message transmitted to the base station includes:

The terminal determines the PRACH CE level of the first scheduling mode according to the DL measurement result, and transmits a random access request message to the base station according to the configuration information of the PRACH CE level, and carries the configuration request message and/or the capability message in the random access request message.

Further, in step 503, the step that the terminal transmits the configuration request message and/or capability message to the base station specifically includes: the terminal transmits the connection setup request message to the base station, and carries the configuration request message and/or the capability message in the random access request message; or, if the terminal has established a connection with the base station, the terminal transmits the configuration request message and/or capability message to the base station.

Further, the step that the terminal performs the UL transmission according to the DCI of the first format includes: acquiring resource assignment from the DCI in the first format, and performing UL transmission according to the resource assignment.

Wherein, the resource assignment includes at least one of the following:

narrowband index indication; PRB index indication; subcarrier index indication; resource unit number indication.

Further, if the resource assignment acquired from the DCI in the first format includes the subcarrier index indication and does not include the PRB index indication, the terminal determines the subcarriers and the PRBs corresponding to the scheduled UL transmission according to the subcarrier index indication; and/or, if the resource assignment acquired from the DCI in the first format includes the subcarrier index indication and does not include the resource unit number indication, the terminal determines the subcarrier index/indices and the resource unit number corresponding to the scheduled UL transmission according to the subcarrier index indication.

Further, the terminal determines at least one of the narrowband index, the PRB index, the subcarrier index/indices and the resource unit number for the UL transmission according to predetermined value and/or Radio Resource Control (RRC) signaling.

Further, the step that the terminal performs the UL transmission according to the resource assignment includes:

the terminal determines the transport block size (TBS) according to the subcarrier index/indices and the resource unit number acquired from the resource assignment; and performs UL transmission based on the TBS.

Further, the terminal acquires Hybrid Automatic Repeat Request-Acknowledgment (HARQ-ACK) resource information from the DCI in the second format, and performs ACK UL transmission according to the HARQ-ACK resource information; or, the terminal acquires HARQ ACK resource information from the DCI in the second format, and performs Non-Acknowledgment (NACK) UL transmission according to the HARQ-ACK resource information.

Wherein, the HARQ-ACK resource information includes at least one of the following: HARQ-ACK resource offset information; HARQ-ACK transmission repetition number indication information; HARQ-ACK scheduling delay indication information; HARQ-ACK transmission subcarrier index indication.

The embodiment of the present invention provides a method for transmitting data. Compared with the prior art, in the embodiment of the present invention, the terminal decides whether the base station supports the first scheduling mode according to the configuration information of the first scheduling mode transmitted by the base station, and if the base station supports the first scheduling mode, the terminal transmits the request message and/or the capability message to the base station to request the base station to configure a first scheduling mode for the terminal or report one or more scheduling modes supported by the terminal. When the base station receives the request message and/or capability message transmitted by the terminal and determines that the terminal scheduling mode is the first scheduling mode, the base station transmits the scheduling information under the first scheduling mode to the terminal, and the terminal transmits or receives data according to the scheduling information under the first scheduling mode. That is, in the present invention, compared with the prior art, a new scheduling mode is the first scheduling mode. When both the terminal and the base station support the first scheduling mode, the base station can transmit the scheduling information under the first scheduling mode to the terminal. Therefore, the terminal and the base station can transmit or receive data in the new scheduling mode.

Specifically, the scheduling mode can include a CE mode, and the second scheduling mode can be a scheduling mode supported by the prior art corresponding to the present application, for example, a CE mode B and/or a CE mode A, a new scheduling mode appearing in the embodiments of the present invention, that is, the first scheduling mode, can be a user CE mode scheduled supporting the subcarrier level scheduling, for example, a CE mode C.

In order to achieve the purpose of the present application, the present application proposes a method for implementing an eMTC system supporting subcarrier level scheduling. The method includes the following steps 601 to 603 (not shown).

Step 601: The terminal reads the configuration information of the CE mode supporting subcarrier level scheduling of the system.

Step 602: After acquiring the configuration information of the CE mode supporting subcarrier level scheduling of the system, the terminal reports a configuration request or capability.

Step 603: The terminal acquires the CE mode which is the CE mode supporting subcarrier level scheduling, monitors the DCI format of the CE mode, and performs the UL and DL transmission.

Wherein, the way in which the terminal acquires the CE mode is that the terminal receives an ACK for reporting a configuration request or capability; or, the terminal receives the CE mode scheduling information of the base station.

Embodiment 9

In order to achieve the purpose of the present application, the following describes the design scheme of the DCI of the eMTC system supporting the UL subcarrier level scheduling.

Denote that the user CE mode different from that of the existing CE mode A and the CE mode B scheduling granularity is the CE mode C. For users in the CE mode A and/or the CE mode B, configuring the CE mode C means that a smaller scheduling granularity can be supported, for example, the subcarrier level scheduling. Therefore, the CE mode C can be regarded as an extended CE mode based on the existing CE mode A and/or the CE mode B. Note that the format of the DCI of the CE mode C is 6-0C. When the users in the CE mode A and CE mode B can configure the CE mode C, the CE mode C can support two different DCI format of the UL grant, which are respectively used for supporting the smaller scheduling granularity transmission of the users in CE mode A and the smaller scheduling granularity transmission of the users in the CE mode B.

In order to support the subcarrier level scheduling of the PUSCH, the terminal needs to acquire the following scheduling information, as shown in Table 5:

and/or the CE mode B, and can also be used for the CE mode supporting the subcarrier level scheduling in which the CE mode C is configured independently. Meanwhile, the method for indicating scheduling information described below can also be used for RAR so as to support the subcarrier level scheduling of a connection setup request message (which can be an Message 3) in a random access process.

1) Narrowband Index Indication

The content and the bit number can reuse the way of indicating in the existing DCI format 6-0B. In addition to indicating in the DCI, the narrowband index indication can also be indicated through RRC signaling or the system arranges that the UL transmission of the user in the CE mode C uses a fixed narrowband (an implicit indication without indicating the bit).

2) PRB Index Indication

The content and the bit number can reuse the way of indicating in the existing DCI format 6-0B, or can jointly indicate in combination with the subcarriers. For the specific mode, the following subcarrier index indication part can be seen. Wherein, in addition to indicating in the DCI, the PRB index indication can also be indicated through the RRC signaling or the system arranges that the UL transmission of the user in the CE mode C uses a fixed PRB (an implicit indication without indicating the bit).

3) Subcarrier Index Indication

The content of the subcarrier index indication can include only the subcarrier index used by the PUSCH channel transmission, the index of the PRB where the subcarrier is located is configured by the PRB index indication, or is

TABLE 5

| Name | Content |
| --- | --- |
| Narrowband index indication | Indicating the eMTC narrowband index used for PUSCH transmission |
| PRB index indication | Indicating the PRB index (locates within the indicated narrow band) used for PUSCH transmission |
| Subcarrier index indication | Indicating the subcarrier index used for PUSCH transmission (located within the indicated PRB) |
| Resource unit indication | Indicating the resource unit number occupied by a single transport block during PUSCH transmission, wherein, the resource units of the subcarrier level scheduling define a reusable NB-IoT, that is occupy several consecutive subframes in the time domain, the terminal acquires the transport block size (TBS) according to the resource unit number |
| MCS indication | Indicating the MCS index, and the terminal acquires the number of transport block bits according to the MCS index |
| Repetition number indication transmission subframe number indication | Indicating the number of repeated transmissions by a single transport block indicating the subframe number used by the repeated transmission of a signal transport block |

In the embodiment of the present invention, since the bit width of the DCI is limited, all of the above information cannot be indicated in the resource assignment information, some of the information can be indicated in the DCI and the rest of the messages which cannot be indicated in the DCI needs semi-static indication through RRC signaling indication or indicated implicitly under certain system rules. The specific contents and signaling transmission modes of the configuration information are respectively given below in Table 5. The scheduling parameter configuration mode can be used for the subcarrier level scheduling of the configuration in which the CE mode C supports the CE mode A predetermined within the indicated narrowband. More specifically, if the number of PRBs configured through the PRB index indication can be one or more, the terminal determines whether to further read the subcarrier index indication field according to a certain rule. For example, only when the number of assigned PRBs is 1, the terminal reads the subcarrier index indication field, and determines the position of the subcarrier assigned to the PUSCH for transmission on the assigned PRB according to the subcarrier index indication. Table 6 gives several examples of contents of the subcarrier index indication in this case:

TABLE 6(a)

| Subcarrier index indication field ($I_{sc}$) | Assignable subcarrier set ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |

TABLE 6(b)

| Subcarriers index indication field ($I_{sc}$) | Assignable subcarrier set ($n_{sc}$) |
|---|---|
| 0-9 | $I_{sc} + 1$ |
| 10-13 | $3(I_{sc} - 10) + \{0, 1, 2\}$ |
| 14-15 | $6(I_{sc} - 14) + \{0, 1, 2, 3, 4, 5\}$ |

TABLE 6(c)

| Subcarrier index indication field ($I_{sc}$) | Assignable subcarrier set ($n_{sc}$) |
|---|---|
| 0-3 | $3(I_{sc}) + \{0, 1, 2\}$ |
| 4-5 | $6(I_{sc} - 4) + \{0, 1, 2, 3, 4, 5\}$ |
| 6 | $(0, 1, \ldots, 11\}$ |

TABLE 6(d)

| Subcarrier index indication field ($I_{sc}$) | Assignable subcarrier set ($n_{sc}$) |
|---|---|
| 0-11 | $I_{sc}$ |
| 12-15 | $3(I_{sc} - 12) + \{0, 1, 2\}$ |
| 16-17 | $6(I_{sc} - 16) + \{0, 1, 2, 3, 4, 5\}$ |
| 18 | $(0, 1, \ldots, 11\}$ |
| 19 | $\{0, 1, \ldots, 11\} \cup \{12, 13, \ldots, 23\}$, Wherein, $0 \leq n_{sc} \leq 11$ is the $(n_{sc})^{th}$ subcarrier assigned on the PRB; $12 \leq n_{sc} \leq 23$ is $(n_{sc} - 12)^{th}$ subcarrier on the subcarrier which is increased by 1 compared to the assigned PRB index |

TABLE 6(e)

| Subcarriers index indication field ($I_{sc}$) | Assignable subcarrier set ($n_{sc}$) |
|---|---|
| 0-3 | $3(I_{sc}) + \{0, 1, 2\}$ |
| 4-5 | $6(I_{sc} - 4) + \{0, 1, 2, 3, 4, 5\}$ |
| 6 | $\{0, 1, \ldots, 11\}$ |
| 7 | $\{0, 1, \ldots, 11\} \cup \{12, 13, \ldots, 23\}$, Wherein, $0 \leq n_{sc} \leq 11$ is the $(n_{sc})^{th}$ subcarrier assigned on the PRB; $12 \leq n_{sc} \leq 23$ is $(n_{sc} - 12)^{th}$ subcarrier on the subcarrier which is increased by 1 compared to the assigned PRB index |

Table 6 (a) and Table 6 (b) respectively use 5 bits and 4 bits to indicate several states of the single subcarrier scheduling, 3 subcarrier scheduling and 6 subcarriers scheduling; Table 6 (c) use 3 bits to indicate the states of 3 subcarrier scheduling, the 6 subcarrier scheduling and 12 subcarrier scheduling; Table 6 (d) use 5 bits to indicate several states of the 3 subcarrier scheduling, 6 subcarrier scheduling and 12 subcarrier scheduling (single PRB) and 2 PRB scheduling; table 6 (e) use 3 bits to indicate several states of the 3 subcarrier scheduling, 6 subcarrier scheduling and 12 subcarrier scheduling and 2 PRB scheduling. Compared to 3 (a), 3 (b) does not include the single-subcarrier allocation cases where the subcarrier is located at the edge of PRB, which suffers from poor performance.

For the embodiment of the present invention, the subcarrier index and the PRB index assigned to the PUSCH transmission can also be jointly indicated without additional indicating the PRB index. For example, Table 7 shows an example of indication content in this case. The example uses 6 bits to jointly indicate several states of a single-subcarrier scheduling, 3 subcarrier scheduling, 6 subcarriers scheduling, 12 subcarrier scheduling and 2PRB scheduling, the position of the scheduled subcarriers can be located on any PRB within a narrowband according to the indication. Wherein, Table 7 can also reserve only the subcarrier index indication fields 0 to 35, and only serve to jointly indicate several states of a single subcarrier scheduling, 3 subcarrier scheduling, 6 subcarrier scheduling and 12 subcarrier scheduling.

TABLE 7

| Subcarrier index indication field ($I_{sc}$) | Assignable subcarrier set ($n_{sc}$) |
|---|---|
| 0-13 | $3(I_{sc}) + \{0, 1, 2\}$, wherein, $n_{sc}$ denotes the $(mod(n_{sc}, 12))^{th}$ subcarrier on the $(\lfloor n_{sc}/12 \rfloor)^{th}$ PRB in the assigned narrowband |
| 24-35 | $6(I_{sc} - 24) + \{0, 1, 2, 3, 4, 5\}$, wherein, $n_{sc}$ denotes the $(mod(n_{sc}, 12))^{th}$ subcarrier on the $(\lfloor n_{sc}/12 \rfloor)^{th}$ PRB in the assigned narrowband |
| 36-41 | $12(I_{sc} - 36) + \{0, 1, \ldots, 11\}$, wherein, $n_{sc}$ denotes the $(mod(n_{sc}, 12))^{th}$ subcarrier on the $(\lfloor n_{sc}/12 \rfloor)^{th}$ PRB in the assigned narrowband |
| 42-44 | $24(I_{sc} - 42) + \{0, 1, \ldots, 23\}$ wherein, $n_{sc}$ denotes the $(mod(n_{sc}, 12))^{th}$ subcarrier on the $(\lfloor n_{sc}/12 \rfloor)^{th}$ PRB in the assigned narrowband |

The specific states contained in each scheduling case of each example in Table 6 and Table 7 can be increased or decreased according to the bit number.

For the embodiment of the present invention, in addition to indicating in the DCI, the subcarrier index indication can also be indicated through RRC signaling.

4) Resource Unit Number Indication and MCS Indication

The terminal needs to acquire the resource unit number, the MCS and the bit number of the transport block, wherein, the terminal can acquire the bit number of the transport block acquired through the resource unit number and/or the TBS index; the resource unit number can be acquired through the DCI configuration or the TBS index.

Specifically, the way of implementing the acquiring the TBS and the resource unit number, preferably, can be that the user acquires the TBS index by using a look-up table according to the MCS index indicated by the DCI, and acquires the bit number of the TBS and the resource unit number according to the TBS index. One example is shown in Table 8, in which 16 types of MCSs are indicated by 4 bits in the DCI, which corresponds to 16 types of TBSs, and the configured resource unit number can be acquired according to the correspondence between the MCS index and/or transport block index and the resource unit number.

TABLE 8

| MCS | Modulation | TBS index | TBS | Resource unit number $N_{RU}$ |
|---|---|---|---|---|
| 0 | QPSK | 0 | 56 | 1 |
| 1 | QPSK | 1 | 88 | |
| 2 | QPSK | 2 | 144 | |
| 3 | QPSK | 3 | 176 | |
| 4 | QPSK | 4 | 208 | |
| 5 | QPSK | 5 | 224 | |
| 6 | QPSK | 6 | 256 | 2 |
| 7 | QPSK | 7 | 328 | |
| 8 | QPSK | 8 | 392 | |
| 9 | QPSK | 9 | 456 | |
| 10 | QPSK | 10 | 504 | |
| 11 | QPSK | 11 | 600 | 4 |
| 12 | QPSK | 12 | 712 | |
| 13 | QPSK | 13 | 808 | |
| 14 | QPSK | 14 | 936 | |
| 15 | QPSK | 15 | 1000 | |

Preferably, the implementation way of acquiring the TBS can be that the user acquires the MCS index and the resource unit number index respectively, and acquires the TBS index $I_{TBS}$ according to the MCS index by a look-up table, and acquires the transport block according to the TBS index $I_{TBS}$ and the configured resource unit number, wherein, the MCS index can be indicated explicitly, for example, reusing the current indication way of the DCI format 6-0B; the way of indicating the resource number index can be indicating explicitly in the DCI, the terminal can acquire the configured resource unit number according to the resource unit number in a look-up table manner. For example, using 3 bits to indicate 6 types of configurable resource unit number {1, 2, 3, 4, 5, 6}, the TBS supported by all the CE modes A (when the user's bandwidth capacity is 1.4 MHz) can be supported with the same coding efficiency by using 3 bits to configure the resource unit number; or, by using 2 bits to indicate 4 type of configurable resources unit number {1,2,4,6}, the TBS supported by all the CE modes A (when the user's bandwidth capacity is 1.4 MHz) can be supported with the same coding efficiency by using 2 bits to configure the resource unit number, and maintains the granularity of the subcarrier level scheduling transmission duration equivalent to that of the CE mode A; or, using 1 bit to indicate that the resource unit number is 2, for example, using bit 0 to indicate that the resource unit number is 1, using bit 1 to indicate that the resource unit number is 2, then the TBS supported by all the CE modes A can be supported with the same coding efficiency by using 1 bit to configure the resource unit number; or, the terminal acquires the resource unit number configuration according to the correspondence between the scheduled subcarrier number and the resource unit number, for example, a single subcarrier scheduling/3 subcarrier scheduling/6 subcarrier scheduling use the resource unit number which is 2, and a signal PRB scheduling/2 PRB scheduling scenarios both use the resource unit number which is 1.

For the embodiment of the present invention, the terminal acquires the TBS according to the subcarrier index indication and the resource unit number index indication. If the DCI format 6-0C includes the scheduling of 2PRBs and/or a single PRB, the indication that indicates that the resource unit number is greater than 1 is agreed as a valid indication (resource unit number in the 2PRB scheduling can be defined as 1 ms), the TBS can be acquired according to the indication way of the DCI format 6-0B.

For the embodiment of the present invention, in addition to indicating in the DCI, the resource unit number index indication can be indicated through RRC signaling.

5) Repetition Number Indication/Transmission Subframe Number Indication

The terminal needs to acquire the PUSCH transmission repetition number configuration; or, acquires the transmission subframe number configuration, the terminal can acquire the repetition number according to the configured transmission subframe number.

The way of indicating the repetition number can be that the terminal acquires the configured repetition numbers according to the repetition number index and other configuration parameters, wherein, the other configuration parameters at least include one of the following information: the maximum PUSCH repetition number, the subcarrier number and the resource unit number. The maximum PUSCH repetition number can be configured by a higher layer. For example, in the prior art, the higher layer configuration parameter in the CE mode B is "pusch-maxNumRepetitionCEmodeB", and the higher layer configuration parameter in the CE mode A is "pusch-maxNumRepetitionCEmodeA". The CE mode C can use the configuration parameters in CE mode A and/or CE mode B, or can define unique high level parameters.

Preferably, the way that the terminal acquires the repetition numbers can be that the terminal acquires the repetition number according to the repetition number index, the maximum PUSCH repetition number, the subcarrier number and/or the resource unit number. Specifically, the terminal can acquire a repetition number set according to the configured maximum PUSCH repetition number, which can be set as $\{n_0, n_1, \ldots, n_k\}$, and determines the correction factor β of the repetition number according to the subcarrier number and/or resource unit number; the repetition number index acquired by the terminal is set as i ∈[0, K], then the terminal acquires the configured repetition number ⌈β·$n_i$⌉, preferably, the correction factor β can be jointly determined by the subcarrier number and the resource unit number, the formula for calculating β is $$\beta = \frac{1}{N_{RU} \cdot L_{RU}},$$

wherein, $N_{RU}$ is the resource unit number, and $L_{RU}$ is the length of the resource unit (using millisecond (ms) as a unit), for example, for 3 subcarriers, the length of the resource unit is 4 ms, when the assigned resource unit number is 2, a signal transport block occupies 2×4=8 ms in time domain, which is equivalent to that the PRB level frequency domain scheduling granularity transmission is expanded by 8 times in the time domain, therefore, β=1/8. Table 9 (a) shows the several typical values of the correction factor by the combination of the subcarrier number and the resource unit number. Preferably, the value of the correction factor β can also be determined by the subcarrier number, wherein, the formula for calculating β can be $$\beta = \frac{1}{L_{RU}},$$

wherein, $L_{RU}$ is the length of the resource unit (using ms as a unit). Table 9 (b) shows the several typical values of the correction factor according to the subcarrier number. Or, specifically, the way of acquiring the repetition number according to the repetition number index, the maximum PUSCH repetition number, the subcarrier number and the resource unit number by the terminal can be: after acquiring the configuration parameter of the maximum PUSCH repetition number, the terminal then acquires the correction factor β according to the subcarrier number and/or the resource unit number, and corrects the acquired maximum repetition number, the correction method and the method for acquiring the correction factor is identical to those of the previous examples, as shown in table 9 (a) and table 9 (b). After acquiring the repetition number set according to the corrected maximum PUSCH repetition number, the terminal then acquires the elements in the repetition number set used for the current PUSCH transmission repetition number according to the repetition number index.

TABLE 9(a)

| | Subcarrier number | | | | | |
|---|---|---|---|---|---|---|
| | 3 | | | 6 | | |
| Resource unit number | 1 | 2 | 4 | 1 | 2 | 4 |
| β | 1/4 | 1/8 | 1/16 | 1/2 | 1/4 | 1/8 |

TABLE 9(b)

| | Subcarrier number | |
|---|---|---|
| | 3 | 6 |
| β | ¼ | ½ |

Preferably, the method for acquiring the repetition number by the terminal can be that, the repetition number can be acquired according to the repetition number index, the subcarrier number and/or the resource unit number. Specifically, the terminal can acquire the repetition number set according to the subcarrier number and/or the resource unit number, which can be set as $\{n_0, n_1, \ldots, n_k\}$, and the repetition number index acquired by the terminal is set as $i \in [0, K]$, then the configured repetition number acquired by the terminal is $n_i$. Wherein, preferably, the repetition number set can be acquired according to the correspondence between the repetition number set and the combination of the subcarrier number and the resource unit number, for example, when subcarrier number is 3 and the resource unit number is 2, the repetition number set is $\{1, 4, 8, 16, 32, 64, 128, 256\}$; when the subcarrier number is 3 and the resource unit number is 4, the repetition number set is $\{1, 2, 4, 8, 32, 64, 96, 128\}$. Or, preferably, the method for determining the repetition number set can be that, the repetition number set can be acquired according to the correspondence of the subcarrier number and the repetition number set, for example, when the subcarrier number is 3, the repetition number set is $\{1, 2, 4, 8, 32, 64, 96, 128\}$; when the subcarrier number is 6, the repetition number set is $\{1, 4, 8, 16, 32, 64, 128, 256\}$.

The above two indication ways can combine each other, for example, the terminal determines the way of acquiring the repetition number according to the values of the subcarrier number and/or the resource unit number. As shown in Table 10, when the subcarrier number is 3 and the resource unit number is 1 or when the subcarrier number is 6 and the resource unit number is $\{1, 2\}$, the terminal acquires the repetition number according to the repetition number index, the maximum PUSCH repetition number, the subcarrier number and the resource unit number; in other cases, the repetition number is acquired according to the repetition number index, subcarrier number and resource unit number, and the specific methods are as described above.

TABLE 10

| Maximum PUSCH repetition number | Repetition number set $\{n_1, n_2, \ldots, n_3\}$ | 3 subcarriers | | | 6 subcarriers | | |
|---|---|---|---|---|---|---|---|
| | | Resource unit number is 1 | Resource unit number is 2 | Resource unit number is 4 | Resource unit number is 1 | Resource unit number is 2 | Resource unit number is 4 |
| Default configuration | {4, 8, 16, 32, 64, 128, 256, 512} | $\{n_1, n_2, \ldots, n_3\} \times$ β, β = 1/4 | {1, 4, 8, 16, 32, 64, 128, 256} | {1, 2, 4, 8, 32, 64, 96, 128} | $\{n_1, n_2, \ldots, n_3\}$ β, β = 1/2 | $\{n_1, n_2, \ldots, n_3\} \times$ β, β = 1/4 | {1, 4, 8, 16, 32, 64, 128, 256} |
| 192 | {1, 4, 8, 16, 32, 64, 128, 192} | | | | | | |
| 256 | {4, 8, 16, 32, 64, 128, 192, 256} | | | | | | |
| 384 | {4, 16, 32, 64, 128, 192, 256, 384} | | | | | | |
| 512 | {4, 16, 64, 128, 192, 256, 384, 512} | | | | | | |
| 768 | {8, 32, 128, 192, 256, 384, 512, 768} | | | | | | |
| 1024 | {4, 8, 16, 64, 128, 256, 512, 1024} | | | | | | |

TABLE 10-continued

| Maximum PUSCH repetition number | Repetition number set $\{n_1, n_2, \ldots, n_3\}$ | 3 subcarriers | | | 6 subcarriers | | |
|---|---|---|---|---|---|---|---|
| | | Resource unit number is 1 | Resource unit number is 2 | Resource unit number is 4 | Resource unit number is 1 | Resource unit number is 2 | Resource unit number is 4 |
| 1536 | {4, 16, 64, 256, 512, 768, 1024, 1536} | | | | | | |
| 2048 | {4, 16, 64, 128, 256, 512, 1024, 2048} | | | | | | |

The other configuration method for achieving the same purpose is: the terminal acquires the PUSCH transmission subframe number indication, wherein, the configured transmission subframe number can be the integer or non-integer multiple of the subframe number used in one time of PUSCH transmission.

The method for acquiring the PUSCH transmission subframe number indication by the terminal can be: the terminal acquires the configured PUSCH transmission subframe number according to the transmission subframe number index configuration and the maximum PUSCH repetition number configuration, wherein, the configured transmission subframe number can be the integer or non-integer multiple of the subframe number used in one time of PUSCH transmission. The transmission subframe number index can share the same indication field of the DCI with the repetition number index, that is, when the CE mode of the terminal is the CE mode C and/or when the subcarrier number assigned by the PUSCH resource acquired by the terminal is less than the subcarrier number of one PRB, the indication acquired by the terminal through this indication field is the transmission subframe number indication; or, the indication acquired by the terminal through this indication field is the repetition number index. For the same reason, the maximum transmission subframe number indication can share the same RRC indication field with the maximum repetition number indication, or the maximum transmission subframe number indication refers to an independent RRC information unit for the subcarrier level transmission. When the maximum transmission subframe number indication shares the RRC indication field with the maximum repetition number indication and if the CE mode of the terminal is the CE mode C and/or when the subcarrier number assigned by the PUSCH resource acquired by the terminal is less than the subcarrier number of one PRB, the indication acquired by the terminal through this RRC indication field is the maximum transmission subframe number indication; or, the indication acquired by the terminal through this indication field is the maximum repetition number.

The PUSCH transmission subframe number acquired by the terminal can be the integer or non-integer multiple of the subframes number used in one time of PUSCH transmission. The process of performing the physical resources mapping according to the transmission subframe number configuration by the terminal are illustrated below. The PUSCH can be mapped on one or more resource units, which represents as $N_{RU}$, each resource unit at least is transmitted repeatedly for $M_{rep}^{PUSCH}$ times.

$$M_{rep}^{NPUSCH} = \lfloor M_{sf}^{PUSCH} / (N_{RU} \cdot N_{slots}^{UL}/2) \rfloor$$

Wherein, $M_{sf}^{PUSCH}$ is the PUSCH transmission subframe number acquired by the terminal, $N_{slots}^{UL}$ is the slot number contained in the resource unit, [*] represents rounding down function. The way for physical resource mapping in which the PUSCH is repeatedly transmitted for $M_{rep}^{PUSCH}$ times is identical to those of the NB-IoT terminal, or identical to the mapping way of the BL/CE UE in the current protocol. Then, after transmitting repeatedly for $M_{rep}^{PUSCH}$ times, the first $M_{sf,partial}^{PUSCH}$ subframes of the PUSCH are transmitted repeatedly for one time, wherein, $$M_{sf,partial}^{PUSCH} = M_{sf}^{PUSCH} - M_{rep}^{NPUSCH} \cdot N_{RU} \cdot N_{slots}^{UL}/2.$$

Figure 23:
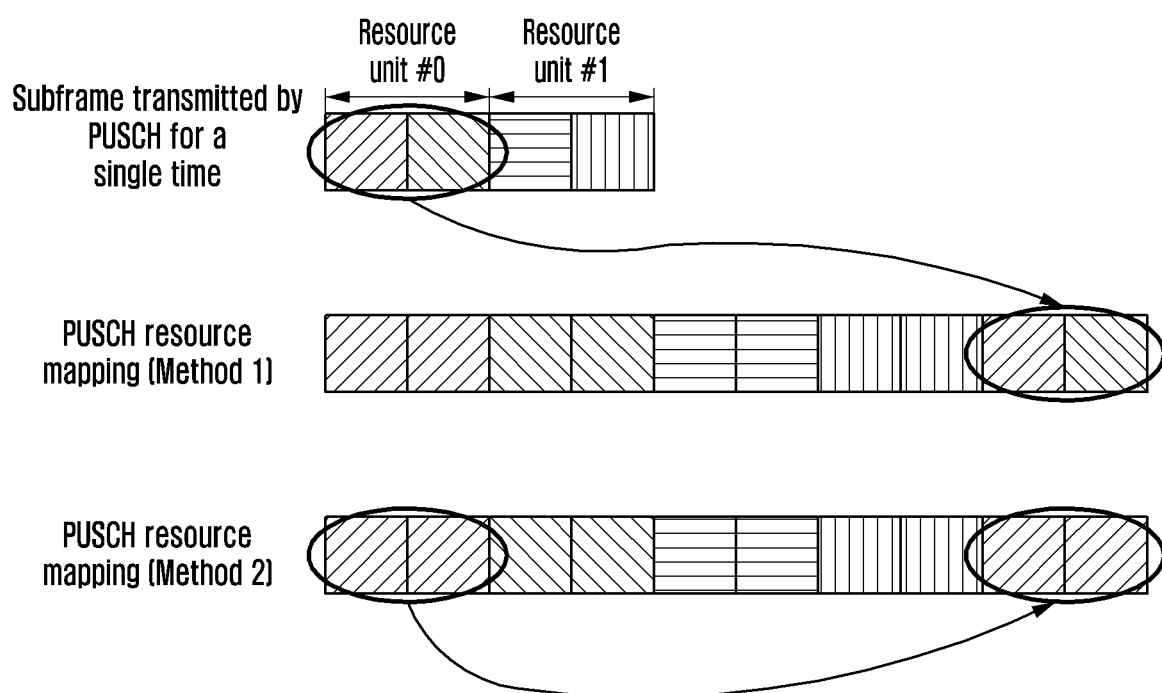
FIG. 23 is a schematic diagram of a physical resource mapping of the PUSCHs according to an embodiment of the present invention.

As shown in the PUSCH resource mapping method 2 of FIG. 23; or, after transmitting repeatedly for $M_{rep}^{PUSCH}$ times, the first $M_{rep}^{PUSCH}$ subframes which are transmitted by the PUSCH for a signal time are transmitted repeatedly for one time, as shown in the PUSCH resource mapping method 1 of FIG. 23. When the $M_{sf,partial}^{PUSCH}$ times of the repeated transmission of the PUSCH employs a cycle repetition, that is, after each subframe which is transmitted by the PUSCH for a signal time is transmitted repeatedly for several times in succession, the next repetition is performed (NB-IoT NPUSCH physical resource mapping method), the above two PUSCH resource mapping methods have different effect. FIG. 23 shows schematic diagrams of the two resource mapping methods.

For the embodiment of the present invention, if the bit width of the DCI format 6-1C (for DL grant) is expanded, additional bits can be used for indicating other HARQ-ACK resource configuration besides HARQ-ACK resource offset, which includes one or more pieces of the configuration information in table 11.

TABLE 11

| Name | Content |
|---|---|
| Repetition number indication | Indicating repetition number of HARQ-ACK transmission |
| Scheduling delay indication | Indicating time interval between the ending subframe of HARQ-ACK transmission and the ending subframe of PDSCH transmission |
| Subcarrier Index indication | Indicating the subcarrier index used by the HARQ-ACK transmission, subcarrier level scheduling which can be used for supporting the PUCCH format 1a/1b |

Wherein, the specific indication contents of the three pieces of configuration information can reuse the existing eMTC signaling content or the configuration content in the NB-IoT DCI format N1.

The following provides examples of several sets of complete configuration messages of the DCI format 6-0C.

An example is provided in Table 12, wherein the control information format in the format 6-0C has a fixed total bit number which is the same as the maximum bit number of the UL grant information in CE mode B (when the system bandwidth is 20 MHz) so as to use for supporting the subcarrier level scheduling of the user in CE mode B. The DCI indicates the PRB index and the subcarrier index in a joint indication way, and the indication of the narrowband index needs to be quasi-statically notified through RRC signaling. In this example, the UL scheduling of the terminal in the CE mode C can cover the subcarrier level scheduling and cover the single-PRB scheduling and the 2-PRB scheduling in CE mode B at the same time. In this case, the CE mode C can be used as an extended CE mode B under the new protocol version. When the base station and the terminal support the CE mode C, the terminal does not need to be configured to be in the CE mode B. Meanwhile, since the UL grant information of the CE mode C, that is, the DCI format 6-0C no longer indicates the narrowband index, the total bit number no longer changes according to the LTE system bandwidth. Although the DL grant information of the CE mode C, that is, the signaling content of the DCI format 6-1C can reuse the CE mode B, its total bit number needs to be complemented according to the LTE system bandwidth, as shown in Table 13.

TABLE 12

| Name | Bit number | Content |
| --- | --- | --- |
| DCI format 6-0C or format 6-1C indication ID | 1 | Distinguishing the UL and DL grant information which is similar to the DCI format 6-0B |
| HARQ process number | 1 | Similar to the DCI format 6-0B |
| Indication of newly transmitted data | 1 | Similar to the DCI format 6-0B |
| DCI subframe repetition number | 2 | Similar to the DCI format 6-0B |
| Repetition number | 5 | Similar to the DCI format 6-0B, or similar to the DCI format N0, or using the above method for indicating the repetition number |
| MCS | 4 | Similar to the DCI format 6-0B, or similar to the DCI format N0, or using the above method for indicating the MCS |
| Resource assignment | 7 | 6 bits jointly indicates the PRB index and the subcarrier index, as shown in Table 7; and/or, 1 bit indicates that the resource unit number is 1 or 2 |

TABLE 13

| LTE system bandwidth | Bit number for narrowband index indication | Zero-padding bit |
| --- | --- | --- |
| 3 MHz | 1 | 3 |
| 5 MHz | 2 | 1 |
| 10 MHz | 3 | 1 |
| 15 MHz | 4 | 0 |
| 20 MHz | 4 | 0 |

Wherein, in the resource assignment configuration in Table 12, the less bit number can also be used for indicating the subcarrier index, for example, Table 6 (e). In this case, both the PRB index indication and the narrowband index indication can be quasi-statically configured through RRC signaling. In this case, if the DCI format 6-1C can still use exactly the same configuration parameters as the format 6-1B, the total bit number of the DCI format 6-0C is the same as the minimum bit number of the format 6-1C (when the system bandwidth is 3 MHz), and when the system bandwidth is greater than 3 MHz, the DCI format 6-0C needs to be bit-complemented so that the total bit number of the UL and DL grant information is the same.

For the embodiments of the present invention, another example of the DCI format 6-0C configuration message is given below to support the subcarrier level scheduling of the user in CE mode B. Except the resource assignment, the rest contents in the DCI can reuse Table 12. For the embodiments of the present invention, the resource assignment configuration information of this example is provided in Table 14 below. In this example, additional 3 or 4 bits are introduced for the CE mode C for respectively indicating the subcarrier index and/or resource units number in the UL grant information (DCI Format 6-0C), for indicating the HARQ-ACK resource in the DL grant information (DCI Format 6-1C), wherein the indication content can reuse the configuration content in the DCI format N1 of NB-IoT, and/or for indicating the repetition number of HARQ-ACK transmission.

TABLE 14(a)

| Name | Bit number | Content |
| --- | --- | --- |
| Resource configuration | $\lceil \log[N_{RB}^{UL}/6] \rceil + 7$ | $\lceil \log[N_{RB}^{UL}/6] \rceil$ bits are used for narrowband index indication, which is the same as the DCI format 6-0B, wherein, the $N_{RB}^{UL}$ is the PRB number contained in the UL system bandwidth 6 bits jointly indicates the PRB index and the subcarrier index, as shown in Table 7 1 bit indicates that the resource unit number is 1 or 2 |

TABLE 14(b)

| Name | Bit number | Content |
| --- | --- | --- |
| Resource configuration | $\lceil \log\lfloor N_{RB}^{UL}/6 \rfloor \rceil + 6$ | $\lceil \log\lfloor N_{RB}^{UL}/6 \rfloor \rceil$ bits are used for narrowband index indication, which is the same as the DCI format 6-0B, wherein, the $N_{RB}^{UL}$ is the PRB number contained in the UL system bandwidth |

TABLE 14(b)-continued

| Name | Bit number | Content |
|------|-----------|---------|
|  |  | 6 bits jointly indicates the PRB index and the subcarrier index, as shown in Table 7 |

For the embodiments of the present invention, another example of the DCI format 6-0C configuration message is provided below to support the subcarrier level scheduling of a user in the CE mode A. The CE mode C indication identifier (ID) is introduced to indicate that the current CE mode is the CE mode A or the CE mode C. The ID is used for parsing other indication fields of the DCI format 6-0C. The bit number in each indication field and the details are as shown in Table 15 below.

TABLE 15

| Name | Bit number | Content |
|------|-----------|---------|
| DCI format 6-0C or format 6-1C distinguishing ID | 1 | Distinguishing LT and DL grant information, which is similar to the DCL format 6-0A |
| CE mode C indication ID | 1 | If the ID is 1, it represents that the current CE mode is the CE mode C. if the ID is 0, it represents that the current CE mode is the CE mode A, and parse other indication fields of the DCI format 6-0C according to the ID |
| Frequency hopping ID | 1 | Similar to the DCL format 6-0A |
| HARQ process number | 3 | Similar to the DCL format 6-CA |
| Indication of newly transmitted data | 1 | Similar to the DCL format 6-0A |
| DCI subframe repetition number | 2 | Similar to the DCL format 6-0A |
| Redundancy version | 4 | Similar to the DCL format 6-0A |
| Repetition number | 2~3 | Similar to the DCL format 6-0A, or similar to the DCL format N0, or using the above method for indicating the repetition number |
| MCS | 4 | Similar to the DCL format 6-0A, or using the above method for indicating the repetition number |
| PCSCH transmission power control command character | 4 | Similar to the DCL format 6-0A, If the CE mode C indication ID is 1, the indication field is reserved or no indication field; if the CE mode C indication ID is. 0, the indication content is the same as the DCI format 6-0A |
| Resource assignment | $\lceil \log\lfloor N_{RB}/6 \rfloor \rceil + 5$ or $\lceil \log\lfloor N_{RB}/6 \rfloor \rceil + 6$ | $\lceil \log\lfloor N_{RB}^{UL}/6 \rfloor \rceil$ bits are used for the narrowband index indication, which is similar to the DCI format 6-0B, wherein, $N_{RB}^{UL}$ is the PRB number contained in the CI, system bandwidth If the CE mode C indication ID is 1, 6 bits axe used for jointly indicating the PRB index and the subcarrier index, as shown in Table 7; if the CE mode C indication ID is 0, 5 bits are used for indicating the PRB index, the indication content is similar to the DCI format 6-0A |
| UL index | 1 | Similar to the DCL format 6-0A |
| DL assignment index | 2 | If the CE mode C indication ID is 1, the indication field is reserved or no indication field; if the CE mode C. indication ID is 0, the indication content is the same 23 the DCI format 6-0A |
| CSI request (Channel State information request) | 1 | Similar to the DCL format 6-0A |
| UL SRS request (Sounding Reference Signal request) | 1 | If the CE mode C indication ID is 1, the indication field is reserved or no indication field; if the CE mode C indication ID is 0, the indication content is the same as the DCI format 6-0A |
| Modulation order override | 1 | If the CE mode C indication ID is 1, the indication field is |

TABLE 15-continued

| Name | Bit number | Content |
| --- | --- | --- |
| | | reserved or no indication field; if the CE mode C indication ID is 0, the indication content is the same as the DCI format 6-0A |

In order to achieve the purpose of the present application, UL subcarrier level scheduling of the user in CE mode C is supported. The following describes a flow design scheme for supporting the user in CE mode C for DL reception and UL transmission according to the CE mode C. When multiple CE modes supporting subcarrier level scheduling exist simultaneously in the system, for example, the CE mode C (which can be the extended CE mode B for supporting the subcarrier level scheduling) and a CE mode D (which can be the extended CE mode A for supporting the subcarrier level scheduling), the following description can be replaced with the CE mode D to form a corresponding flow. Users working in the different CE modes read different DL control channel formats.

Step 1: The terminal reads the configuration information of the CE mode C.

For the embodiment of the present invention, the configuration message at least includes one of the following contents: 1) the indication message that the system supports the CE mode C, which can be carried in the system message, for example, in the Master Information Block (MIB) or System Information Block (SIB), wherein, the indication message can be an enable message of 1 bit or the indication message implicitly indicates that the cell supports the CE mode C through indicating the protocol version; 2) the PRACH CE level configuration (NPRACH Coverage Enhancement Level) corresponding to the CE mode C includes, but not limited to, PRACH transmission repetition number, preamble index, PRACH frequency hopping offset, MPDCCH search space offset and RSRP threshold corresponding to the PRACH CE level.

Wherein, the correspondence between the PRACH CE level and the CE mode C is an one-to-one correspondence, that is, when a certain PRACH CE level corresponds to the CE mode C, it no longer corresponds to another CE mode; or, the correspondence between the PRACH CE level and the CE mode C can be an one-to-many correspondence, that is, when a certain PRACH CE level corresponds to the CE mode C, it can still correspond to other CE modes, such as the CE mode A or the CE mode B.

Step 2: After acquiring the configuration information of the CE mode C, the terminal reports a request for configuring the CE mode C or reports the capability for supporting the CE mode C.

For the embodiment of the present invention, the reporting process can include at least one of the following ways: 1) The terminal performs an explicit reporting through RRC signaling, for example, 1 bit is carried through the connection setup request message (MSG3), which is used for indicating that the terminal supports the CE mode C or requesting for CE mode C configuration; or, the terminal carries a message when reporting a capability, indicating that the terminal supports the CE mode C or indicate to configure a CE mode C request; 2) the terminal reports a request for configuring the CE mode C to the base station or reports the capability for supporting the CE mode C in an implicit behavior way according to system rules, for example, the system rules can be: the base station configures the PRACH CE level for the CE mode C, the terminal transmits the PRACH according to the parameters configured by the PRACH CE level, that is, representing that the terminal reports a request for configuring the PRACH CE level or reports the capability for supporting the CE mode C.

Step 3: The terminal performs data transmission or reception according to the parameters of the CE mode C configured by the system; or, after receiving the CE mode C configuration signaling, the terminal performs UL transmission and DL reception according to the parameters of the CE mode C configured by the system. The UL transmission performed according to the parameters of the CE mode C at least includes: transmitting the PRACH according to the PRACH CE level corresponding to the CE mode C, transmitting PUCCH according to the PUCCH configured or transmitting PUSCH scheduled by the CE mode C, configuring according to the CE mode C, acquiring scheduling information by reading a corresponding DCI format or an RAR message, and transmitting the PUSCH.

For the embodiment of the present invention, the CE mode C configuration signaling can be a user-specific signaling or a contention resolution message (MSG4); and the CE mode C parameter configured by the system includes at least the configuration parameters for a Bandwidth Limited/Coverage enhanced (BL/CE) UE in a Release 14 version specification in CE mode B, and the involved configuration parameters can possibly include a narrowband index indication, and/or a PRB index indication, and/or a resource unit number indication. The data transmission performed by the terminal according to the CE mode C includes at least one of the following: transmission of the PUSCH channel, transmission of the HARQ-ACK, and reception of the MPDCCH.

Wherein, the transmission content of the PUSCH channel includes service data and/or an RAR; and the reception of the MPDCCH at least includes: receiving the DCI of the corresponding format, i.e., the DCI format 6-0C/6-1C.

Some flow examples that the user supporting the CE mode C performs the DL reception and UL transmission according to CE mode C are given below.

Figure 22:
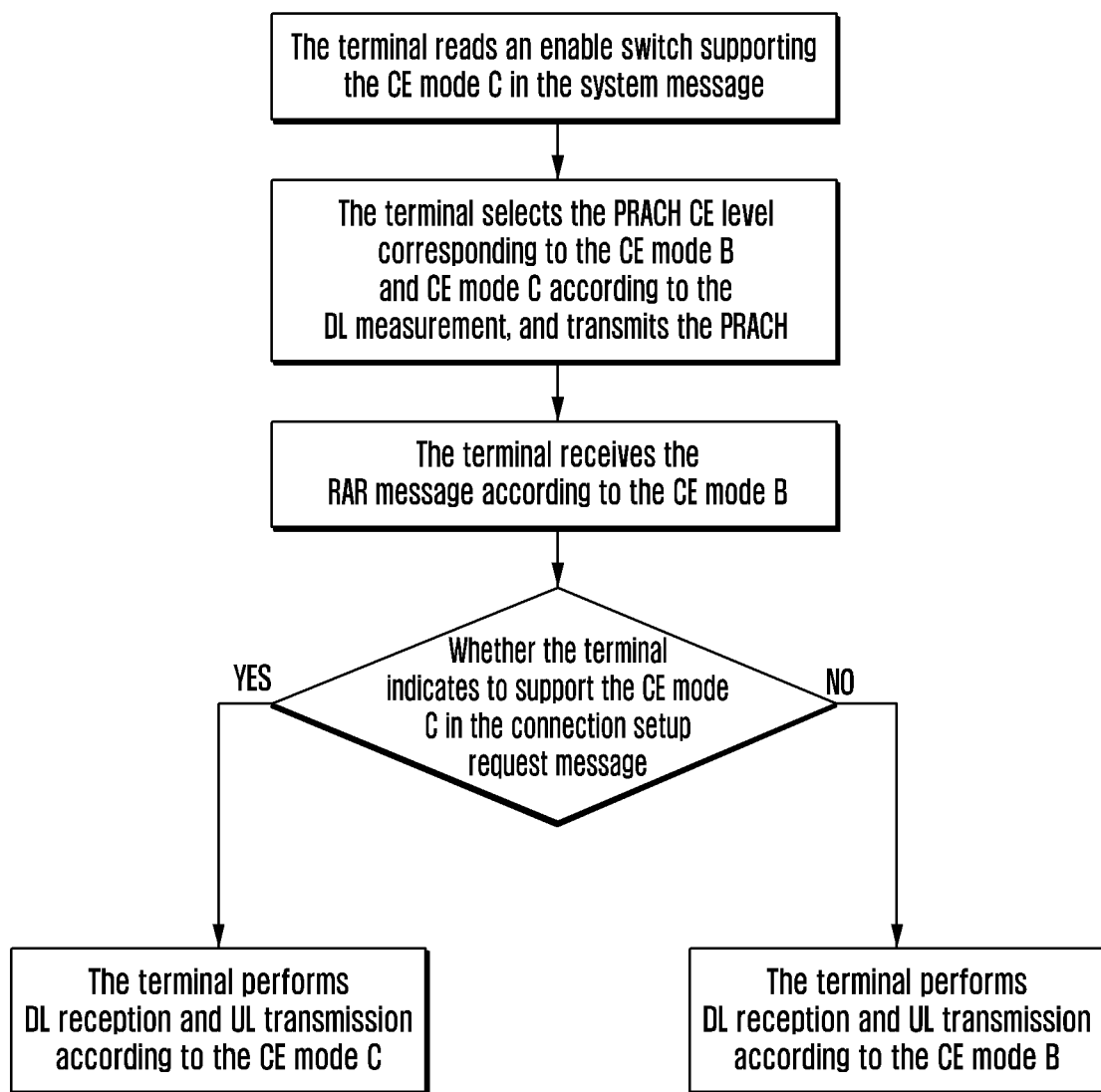
FIG. 22 is a schematic diagram of an exemplary terminal flow of reporting a CE mode C request (or capability) by a terminal implicitly and explicitly according to an embodiment of the present invention.

FIG. 22 shows an example of the terminal behavior flow. In this embodiment, the CE mode B can be replaced with the CE mode A to form a new example.

In this example, the terminal reports the CE mode C requests (or capabilities) in a combination of implicit and explicit indications. First, the terminal learns whether the cell supports to configure the CE mode C by reading a system message. If the cell supports the CE mode C configuration, the terminal selects the PRACH CE level corresponding to the CE mode B/CE mode C according to the DL measurement and transmits the PRACH according to the configuration parameter of this CE level, and receives the RAR message according to the CE mode B. Wherein, the PRACH CE level of the corresponding CE mode B/CE mode C is fixed by the system, used for defining one or more PRACH CE level of the CE mode B in Release 14 version specification to support the CE mode C simultaneously, for example, defining the PRACH CE level 2 and level 3 corresponding to the CE mode B, wherein the level 3 is used for supporting the CE mode B and the CE mode C simultaneously; subsequently, the terminal reports to the base station whether the terminal supports or uses the CE mode C in the connection setup request message. When reporting the information supporting or using the CE mode C, after succeeds (i.e. the terminal receives the ACK feedback of the connection setup request message), the terminal can perform UL transmission and DL reception according to the CE mode C; or, the terminal performs UL transmission and DL reception according to the CE mode B.

For the embodiment of the present invention, in this example, it is required that the UL resource scheduling result of the CE mode C can cover all the UL resource scheduling results of the CE mode B in the prior art, and the DCI design in Table 12 can be used. In this case, when the terminal needs to select the CE mode B or the CE mode C according to the DL measurement result and both the cell and the terminal support the CE mode C, the terminal configures the CE mode C; when one party does not support the CE mode C configuration, the terminal will configure CE mode B.

Figure 24:
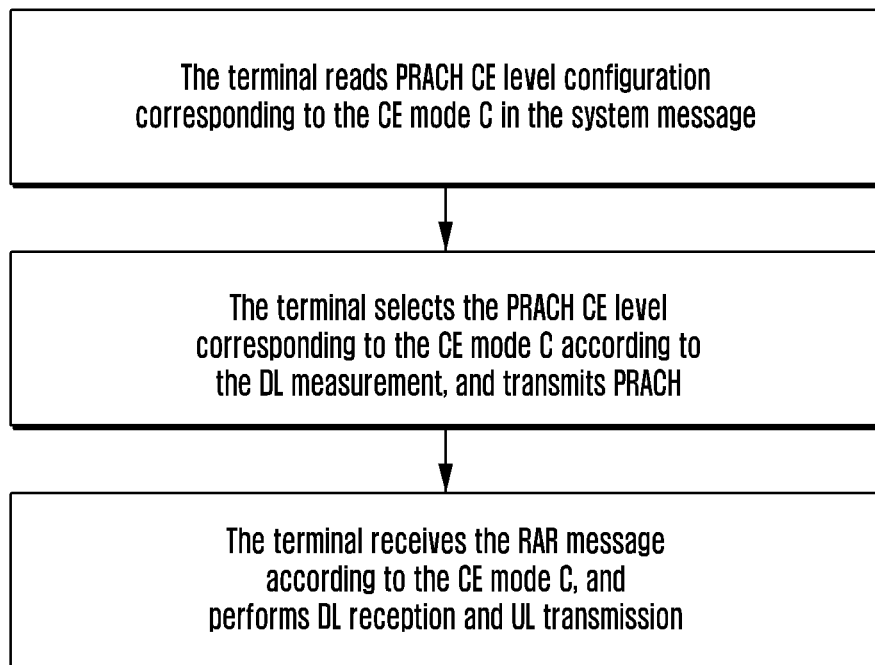
FIG. 24 a schematic diagram of a terminal flow that a terminal reports a CE mode C request (or capability) in an implicit manner according to an embodiment of the present invention.

Another example of the terminal behavior flow is provided in FIG. 24.

For the embodiment of the present invention, in this example, the terminal reports the capability (or request) for CE mode C in an implicit way according to a certain rule, and the system needs to define a PRACH CE level dedicated to support the CE mode C.

First, the terminal reads the system message to learn the PRACH CE level configuration parameter corresponding to the CE mode C. Then, when the DL measurement result of the terminal satisfies the RSRP threshold requirement of the PRACH CE level corresponding to the CE mode C, the terminal transmits the PRACH according to the PRACH CE level configuration corresponding to the CE mode C; the base station can determine the CE mode of the terminal according to the PRACH CE level selected by the terminal; in this case, the terminal can perform the following DL reception and UL transmission processes according to the CE mode C. If the system defines to receiving the RAR message in the CE mode C (including the format, the scheduled time-frequency resource and the like), the terminal can perform the UL and DL physical process according to the CE mode C hereafter.

Figure 25:
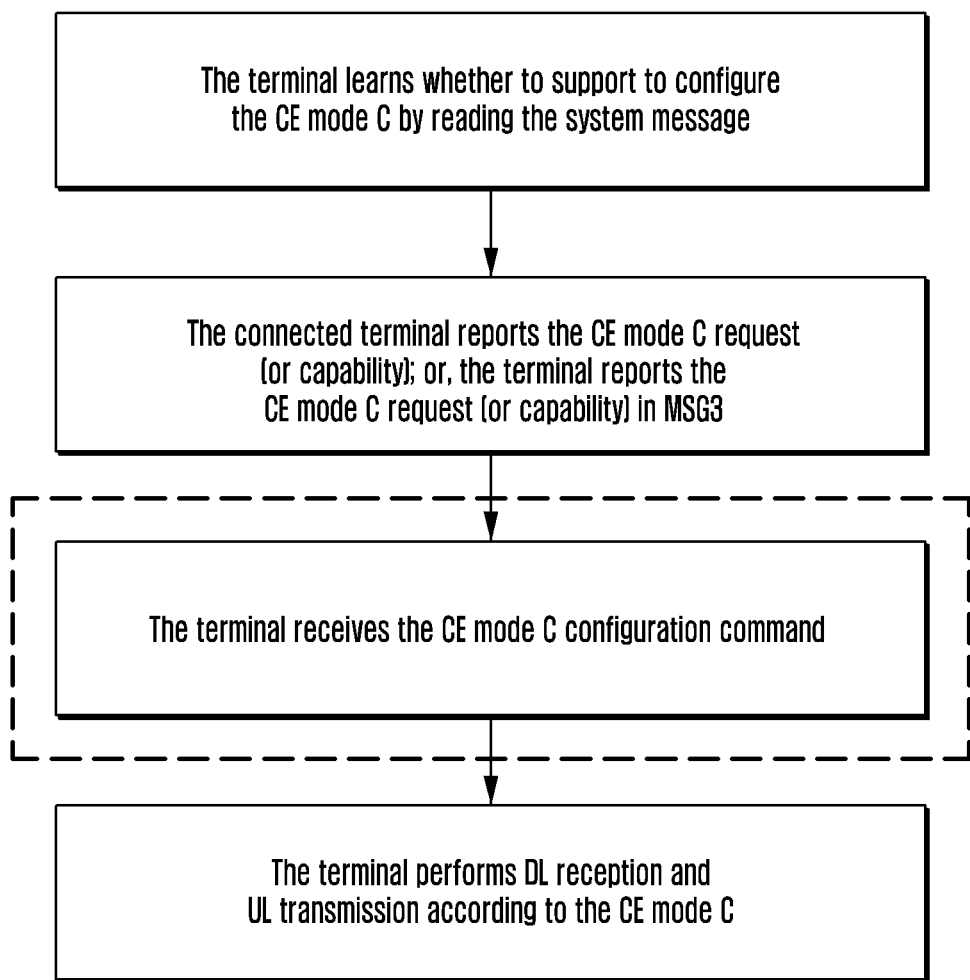
FIG. 25 is a schematic diagram of a terminal flow of a terminal that reports a CE mode C request (or capability) in an explicit signaling manner according to an embodiment of the present invention.

FIG. 25 shows a third example of the terminal behavior flow.

For the embodiment of the present invention, in this example, the terminal reports the CE mode C request (or capability) in an explicit way according to a certain rule.

First, the terminal learns whether the cell supports to configure the CE mode C by reading the system message; then, the terminal can report the CE mode C request (or capability) in the connection setup request message (MSG3); or, the connected terminal can report the CE mode C request (or capability) through the terminal capability report process; at this time, the terminal can perform DL reception and UL transmission according to the CE mode C; or, the terminal can perform the UL and DL physical process according to the CE mode C after receiving the user-specific signaling for indicating the CE mode C of the base station.

In order to realize the purpose of the present application, a method for designing a channel interleaver for UL subcarrier level scheduling is described below. The function of the channel interleaver is to input the encoded bit sequence into the channel interleaver to ensure to achieve the mapping first in the time domain then in the frequency domain on the transmission waveform while the interleaved bit sequence which passes through the flow such as scrambling, modulation, layer-mapping, transform precoding and precoding and more is finally mapped onto the resource particle. For the UL subcarrier level scheduling, the time domain length of a single transport block UL transmission across multiple subframes. When the conventional channel interleaver is designed for the transmission of UL subcarrier level scheduling, the data bits transmitted in the same subframe are not consecutive bits in the coded bit sequence, so that the base station is required to decode only after receiving all the subframes occupied by one transport block which is not conducive to reducing the receiving delay, and will affect the existing eMTC base station receiver implementation.

A channel interleaver which is used for UL subcarrier level scheduling transmission includes an interleaving matrix partitioning. Preferably, when the interleaved coded bit sequence is output after the interleaving matrix partitioning, the interleaved coded bit sequence is sequentially output according to the index order of the partitioned interleaving matrix. In a specific embodiment, the number of the channel interleaving matrix columns is denoted as $C_{mux}$, the value of $C_{mux}$ is $C_{mux}=N_{symb}^{PUSCH}$, wherein, $N_{symb}^{PUSCH}$ is the number of single-carrier FDMA symbols for the PUSCH transmission in one subframe or the number of single-carrier FDMA symbols for the PUSCH transmission in the UL pilot configured by the higher-layer signaling. According to the existing protocol (TS36.212, Release 14) designed to generate a channel interleaving matrix, the number of rows and columns were recorded as $R_{mux}$ and $C_{mux}$, the channel interleaving matrix is denoted as:

$$\begin{bmatrix} y_0 & y_1 & y_2 & \Lambda & y_{C_{mux}-1} \\ y_{C_{mux}} & y_{C_{mux}+1} & y_{C_{mux}+2} & \Lambda & y_{2C_{mux}-1} \\ M & M & M & O & M \\ y_{(R_{mux}-1)\times C_{mux}} & y_{(R_{mux}-1)\times C_{mux}+1} & y_{(R_{mux}-1)\times C_{mux}+2} & \Lambda & y_{(R_{mux}\times C_{mux}-1)} \end{bmatrix}$$

Wherein, the sequence $y_0, y_1, \ldots y_{(R_{MUX}\times C_{MUX}-1)}$ is a bit sequence passing through the channel sequence encoding, and at least includes one of the following: a data transport block bit, a CSI bit, a rank information bit, and a HARQ response message bit. Further, the channel interleaving matrix with the above dimension ($R_{mux}\times C_{mux}$) is divided into several channel interleaving matrices with dimensions ($\overline{R}_{mux}\times C_{mux}$), wherein, $\overline{R}_{mux}=Q_m \cdot N_L \cdot N_{SC}^{RU}$, and $N_{sc}^{RU}$ is the number of the UL transmission subcarrier indicated in the DCI, wherein the transmission subcarrier number can be the same as or different from the subcarrier number assigned in the DCI, the method for assigning the subcarrier in the DCI is as shown in Table 6/Table 7. Each $\overline{R}_{mux}$ row of the above channel interleaving matrix with the dimension ($R_{mux}\times C_{mux}$) forms a channel interleaving matrix with the dimension ($\overline{R}_{mux}\times C_{mux}$), the channel interleaving matrix in which the $i^{th}$ dimension is ($\overline{R}_{mux}\times C_{mux}$) is:

$$\begin{bmatrix} y_{i\times \overline{R}_{mux}\times C_{mux}} & y_{i\times \overline{R}_{mux}\times C_{mux}-1} & y_{i\times \overline{R}_{mux}\times C_{mux}-2} & \Lambda & y_{(i\times \overline{R}_{mux}-1)\times C_{mux}-1} \\ y_{(i\times \overline{R}_{mux}-1)\times C_{mux}} & y_{(i\times \overline{R}_{mux}-1)\times C_{mux}-1} & y_{(i\times \overline{R}_{mux}-1)\times C_{mux}-2} & \Lambda & y_{(i\times \overline{R}_{mux}-2)\times C_{mux}-1} \\ M & M & M & O & M \\ y_{(i\times \overline{R}_{mux}+\overline{R}_{mux}-1)\times C_{mux}} & y_{(i\times \overline{R}_{mux}+\overline{R}_{mux}-1)\times C_{mux}-1} & y_{(i\times \overline{R}_{mux}+\overline{R}_{mux}-1)\times C_{mux}-2} & \Lambda & y_{(i\times \overline{R}_{mux}+\overline{R}_{mux})\times C_{mux}-1} \end{bmatrix}$$

Wherein, i=0, ... $N_m-1$ and $$N_m = \frac{R_{MUX}}{\overline{R}_{MUX}}.$$

The output of the channel interleaver is that according to the index order of the channel interleaving matrix with the dimension ($\overline{R}_{mux} \times C_{mux}$), each interleaving sequence of the channel interleaving matrix with the dimension ($\overline{R}_{mux} \times C_{mux}$) is output according to an ascending order; the way that each channel interleaving matrix with the dimension ($\overline{R}_{mux} \times C_{mux}$) outputs the interleaving sequence is to read the elements in the interleaving matrix according to the rows. The cascading interleaving sequences output by $N_m$ channel interleaving matrixes with the dimension ($\overline{R}_{mux} \times C_{mux}$) forms a complete interleaving bit sequence output by the channel interleaver. According to the bit sequence output by the channel interleaver design, after the mapping of the resource particles is completed, the data information carried in the same subframe can be ensured to be a contiguous segment in the channel encoding bit sequence, so that the base station can start to decode upon receiving a part of subframe of a transport block.

Figure 26:
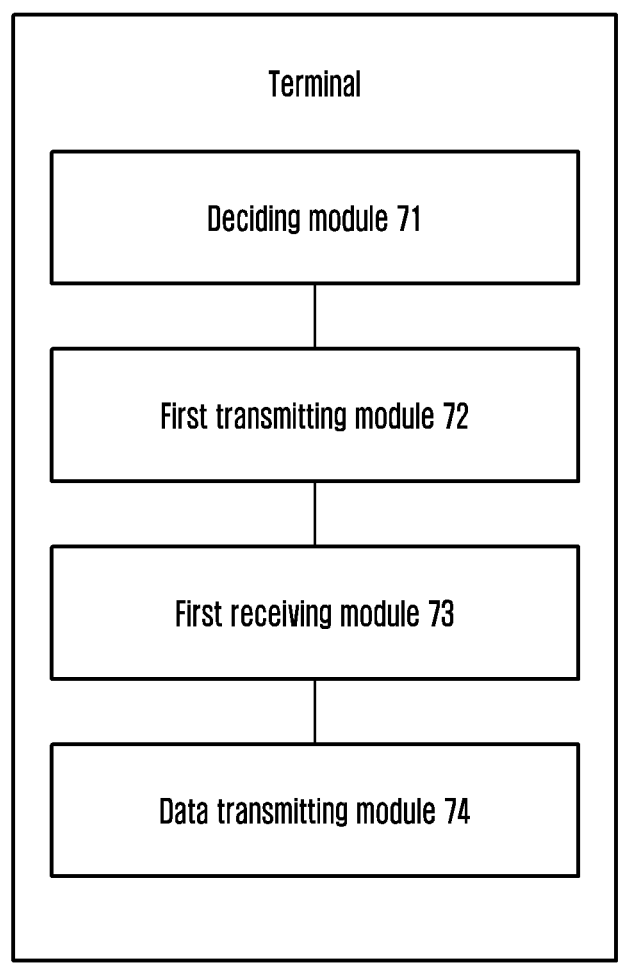
FIG. 26 is a schematic apparatus structural diagram of a terminal according to an embodiment of the present invention.

An embodiment of the present invention provides a terminal. As shown in FIG. 26, the terminal includes a deciding module 71, a first transmitting module 72, a first receiving module 73, and a data transmitting module 74, wherein, the deciding module 71, for deciding, according to configuration information of a first scheduling mode transmitted by a base station, whether the base station supports the first scheduling mode;

the first transmitting module 72, for transmitting a request message and/or a capability message to the base station when the base station supports the first scheduling mode, wherein, the request message is used for requesting the base station to configure the first scheduling mode for the terminal, the capability message is used for reporting a scheduling mode supported by the terminal;

the first receiving module 73, for receiving scheduling information of a first scheduling mode transmitted by the base station; and the data transmitting module 74, for transmitting or receive data according to the scheduling information under the first scheduling mode which is received by the first receiving module.

The embodiment of this invention provides a terminal, compares with the prior art, the terminal in the embodiment of the present invention decides whether the base station support the first scheduling mode according to the configuration information of a first scheduling mode transmitted by the base station. If the base station supports the first scheduling mode, the terminal transmits a request message and/or capability message to the base station to request the base station to configure the first scheduling mode for the terminal or to report a scheduling mode supported by the terminal. When the base station receives the request message and/or capability message transmitted by the terminal and determines that the terminal scheduling mode is the first scheduling mode, the base station transmits the scheduling information under the first scheduling mode to the terminal, and the terminal transmits or receives data according to the scheduling information under the first scheduling mode. That is, in the embodiments of the present invention, a new scheduling mode, that is, a first scheduling mode, appears in the embodiments of the present invention. When both the terminal and the base station support the first scheduling mode, the base station can transmit the first scheduling mode to the terminal so that the terminal and the base station can transmit or receive data in the new scheduling mode.

Figure 27:
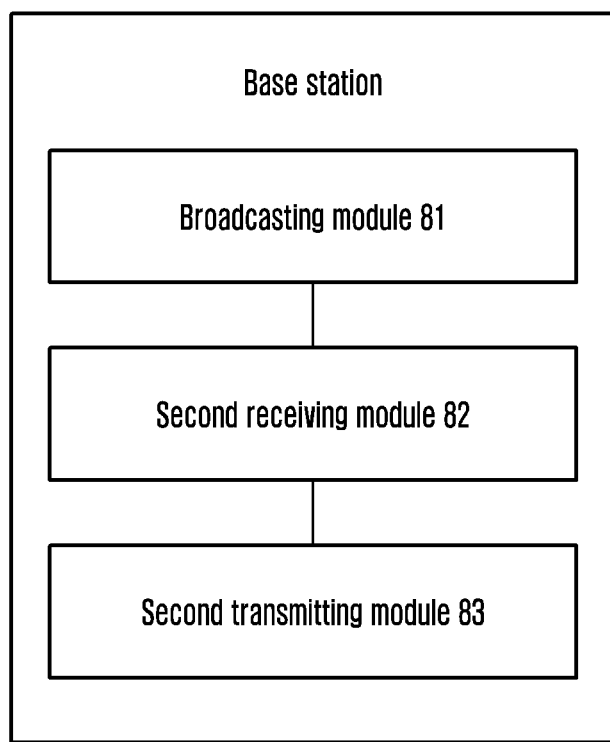
FIG. 27 is a schematic apparatus structural diagram of a base station according to an embodiment of the present invention.

An embodiment of the present invention provides a base station. As shown in FIG. 27, the base station includes a broadcasting module 81, a second receiving module 82, and a second transmitting module 83, wherein, the broadcasting module 81, for broadcasting a configuration message in a first scheduling mode when the base station supports the first scheduling mode;

the second receiving module 82, for receiving a request message and/or capability message transmitted by a terminal, where the request message is used for requesting the base station, to configure the first scheduling mode for the terminal, wherein, the capability message for reporting A scheduling mode supported by the terminal; and the second transmitting module 83, for transmitting scheduling information of a first scheduling mode to the terminal when the terminal scheduling mode is the first scheduling mode, so that the terminal transmits or receives data according to the scheduling information under the first scheduling mode.

The embodiment of the present invention provides a base station. Compared with the prior art, in the embodiment of the present invention, the terminal determines whether the base station supports the first scheduling mode according to the configuration information of the first scheduling mode transmitted by the base station, and if the base station supports the first scheduling mode, the terminal transmits a request message and/or capability message to the base station to request the base station to configure a first scheduling mode for the terminal or to report a scheduling mode supported by the terminal. When the base station receives the request message and/or capability message transmitted by the terminal and determines that the terminal scheduling mode is the first scheduling mode, the base station transmits the scheduling information under the first scheduling mode to the terminal, and the terminal transmits or receives data according to the scheduling information under the first scheduling mode. That is, in the embodiments of the present invention, a new scheduling mode, that is, a first scheduling mode, appears in the embodiments of the present invention. When both the terminal and the base station support the first scheduling mode, the base station can transmit the scheduling information under the first scheduling mode to the terminal so that the terminal and the base station can transmit or receive data in the new scheduling mode.

The terminal and the base station provided in the embodiments of the present invention can implement the above method embodiments. For a specific function implementation, please refer to the explanation in the method embodiments, and details are not described herein again.

It should be understood by those skilled in the art that the embodiments of the present invention involve devices for carrying out one or more of operations as described in the embodiments of the present invention. Those devices can be specially designed and manufactured as intended, or can comprise well known devices in a general-purpose computer. Those devices have computer programs stored therein, which are selectively activated or reconstructed. Such computer programs can be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. In other words, the readable media comprise any media storing or transmitting information in a device (for example, computer) readable form.

It should be understood by those skilled in the art that computer program instructions can be used to realize each block in structure diagrams and/or block diagrams and/or flowcharts as well as a combination of blocks in the structure diagrams and/or block diagrams and/or flowcharts. It should be understood by those skilled in the art that these computer program instructions can be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

It should be understood by those skilled in the art that the steps, measures and solutions in the operations, methods and flows already discussed in the embodiments of the present invention may be alternated, changed, combined or deleted. Further, other steps, measures and solutions in the operations, methods and flows already discussed in the embodiments of the present invention can also be alternated, changed, rearranged, decomposed, combined or deleted. Further, the steps, measures and solutions of the prior art in the operations, methods and flows disclosed in the embodiments of the present invention can also be alternated, changed, rearranged, decomposed, combined or deleted.

The foregoing descriptions are merely some implementations of the embodiments of the present invention. It should be pointed out that, to a person of ordinary skill in the art, various improvements and modifications can be made without departing from the principle of the embodiments of the present invention, and these improvements and modifications shall be regarded as falling into the protection scope of the embodiments of the present invention.

What is claimed is:

1. A method performed by a terminal in a communication system, the method comprising:
   receiving, from a base station, high layer signaling including information indicating a coverage enhanced (CE) mode, an index of a physical resource block (PRB) for the CE mode associated with a sub-PRB allocation, and information on a repetition number for the CE mode associated with the sub-PRB allocation;
   receiving, from the base station, Downlink Control Information (DCI) including resource allocation information, the resource allocation information indicating a set of subcarriers in the PRB; and
   transmitting, to the base station, data based on the set of subcarriers in the PRB and the repetition number.

2. The method of claim 1, wherein receiving the information indicating the CE mode and the index of the PRB for the CE mode further comprises:
   transmitting, to the base station, a capability message including information indicating whether the terminal supports the CE mode associated with the sub-PRB allocation.

3. The method of claim 1, wherein the resource allocation information indicates indices of the set of subcarriers in the PRB,
   wherein the resource allocation information includes 4 bits, and
   wherein the DCI includes information on a number of resource units.

4. A method performed by a base station in a communication system, the method comprising:
   transmitting, to a terminal, high layer signaling including information indicating a coverage enhanced (CE) mode, an index of a physical resource block (PRB) for the CE mode associated with a sub-PRB allocation, and information on a repetition number for the CE mode associated with the sub-PRB allocation;
   transmitting, to the terminal, downlink control information (DCI) including resource allocation information, the resource allocation information indicating a set of subcarriers in the PRB; and
   receiving, from the terminal, data based on the set of subcarriers in the PRB and the repetition number.

5. The method of claim 4, wherein transmitting the information indicating the CE mode and the index of the PRB for the CE mode further comprises:
   receiving, from the terminal, a capability message including information indicating whether the terminal supports the CE mode associated with the sub-PRB allocation.

6. The method of claim 4, wherein the resource allocation information indicates indices of the set of subcarriers in the PRB,
   wherein the resource allocation information includes 4 bits, and
   wherein the DCI includes information on a number of resource units.

7. A terminal in a communication system, the terminal comprising:
   a transceiver; and
   a controller coupled with the transceiver and configured to:
      receive, from a base station, high layer signaling including information indicating a coverage enhanced (CE) mode, an index of a physical resource block (PRB) for the CE mode associated with a sub-PRB allocation, and information on a repetition number for the CE mode associated with the sub-PRB allocation,
      receive, from the base station, downlink control information (DCI) including resource allocation information, the resource allocation information indicating a set of subcarriers in the PRB, and
      transmit, to the base station, data based on the set of subcarriers in the PRB and the repetition number.

8. The terminal of claim 7, wherein the controller is further configured to transmit, to the base station, a capability message including information indicating whether the terminal supports the CE mode associated with the sub-PRB allocation.

9. The terminal of claim 7, wherein the resource allocation information indicates indices of the set of subcarriers in the PRB,
   wherein the resource allocation information includes 4 bits, and
   wherein the DCI includes information on a number of resource units.

10. A base station in a communication system, the base station comprising:
    a transceiver; and
    a controller coupled with the transceiver and configured to:

transmit, to a terminal, high layer signaling including information indicating a coverage enhanced (CE) mode, an index of a physical resource block (PRB) for the CE mode associated with a sub-PRB allocation, and information on a repetition number for the CE mode associated with the sub-PRB allocation, transmit, to the terminal, downlink control information (DCI) including resource allocation information, the resource allocation information indicating a set of subcarriers in the PRB, and receive, from the terminal, data based on the set of subcarriers in the PRB and the repetition number.

11. The base station of claim 10, wherein the controller is further configured to:

receive, from the terminal, a capability message including information indicating whether the terminal supports the CE mode associated with the sub-PRB allocation, wherein the resource allocation information indicates indices of the set of subcarriers in the PRB, wherein the resource allocation information includes 4 bits, and wherein the DCI includes information on a number of resource units.

\* \* \* \* \*